United States Patent
Takenaka et al.

(10) Patent No.: US 8,155,852 B2
(45) Date of Patent: Apr. 10, 2012

(54) VEHICLE CONTROL DEVICE

(75) Inventors: Toru Takenaka, Wako (JP); Takayuki Toyoshima, Wako (JP); Hiroyuki Urabe, Wako (JP); Hiroshi Kono, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 828 days.

(21) Appl. No.: 12/095,406

(22) PCT Filed: Dec. 21, 2006

(86) PCT No.: PCT/JP2006/325537
§ 371 (c)(1),
(2), (4) Date: May 29, 2008

(87) PCT Pub. No.: WO2007/074718
PCT Pub. Date: Jul. 5, 2007

(65) Prior Publication Data
US 2009/0012669 A1  Jan. 8, 2009

(30) Foreign Application Priority Data

Dec. 27, 2005 (JP) ................. 2005-376539

(51) Int. Cl.
G06F 19/00 (2006.01)
G06F 7/70 (2006.01)
B60T 8/24 (2006.01)
B60T 8/1761 (2006.01)
B60T 8/1764 (2006.01)

(52) U.S. Cl. ............. 701/70; 701/72; 701/74; 701/90

(58) Field of Classification Search .......... 701/1, 29, 701/36, 37, 48, 69, 70, 72, 73, 78–81, 71, 701/74, 75, 82, 90; 180/197; 303/113.1, 303/113.2, 113.4, 113.5
See application file for complete search history.

(56) References Cited

U.S. PATENT DOCUMENTS

| 6,453,226 B1 | 9/2002 | Hac et al. |
| 6,547,343 B1 | 4/2003 | Hac |

FOREIGN PATENT DOCUMENTS

| DE | 4030704 A1 | 4/1992 |
| EP | 0 995 656 | 4/2000 |
| EP | 1527970 A | 5/2005 |

(Continued)

*Primary Examiner* — Jack W Keith
*Assistant Examiner* — Edward Pipala
(74) *Attorney, Agent, or Firm* — Rankin, Hill & Clark LLP

(57) ABSTRACT

A driving/braking force manipulation control input of a k-th wheel, which denotes one or more specific wheels among a plurality of wheels of a vehicle, is determined such that a required condition concerning a relationship among a road surface reaction force that may act from a road surface on the k-th wheel on the basis of the detected values or estimated values of a side slip angle and a friction characteristic of the k-th wheel, a feedback control input related to the driving/braking force of the k-th wheel for bringing a difference between a state amount of the vehicle and a reference state amount close to zero, a driving/braking force feedforward control input based on a drive manipulated variable supplied by a driver of the vehicle, and a k-th wheel driving/braking force manipulation control input is satisfied. This arrangement makes it possible to properly control a motion of an actual vehicle to a desired motion while properly considering the characteristics of a road surface reaction force acting from a road surface on a wheel.

13 Claims, 23 Drawing Sheets

FOREIGN PATENT DOCUMENTS

| | | |
|---|---|---|
| EP | 1775188 A1 | 4/2007 |
| JP | 08-310366 | 11/1996 |
| JP | 2000-041386 | 2/2000 |
| JP | 2001-047999 | 2/2001 |
| JP | 2003127850 | 5/2003 |
| JP | 2003-170822 | 6/2003 |
| JP | 2003-291840 | 10/2003 |
| JP | 2005-041386 | 2/2005 |
| JP | 2005-145256 | 6/2005 |
| WO | 2006/013922 | 2/2006 |

$\beta f\_act = \beta f--$ $\beta f\_act = \beta f-$ $\beta f\_act = 0$ $\beta f\_act = \beta f+$ $\beta f\_act = \beta f++$ βr_act = βr--

βr_act = βr-

βr_act = 0

βr_act = βr+

βr_act = βr++

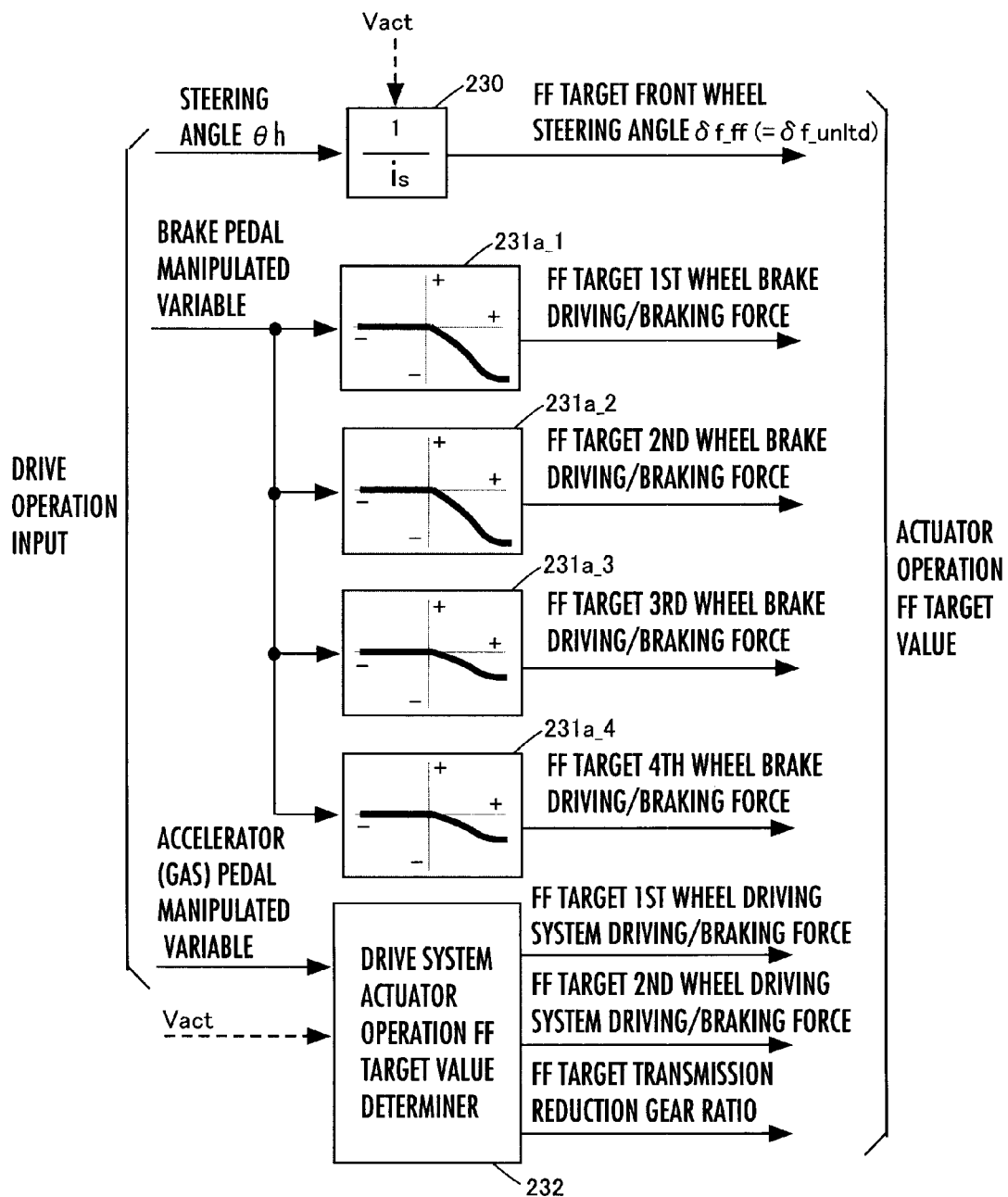

VEHICLE CONTROL DEVICE

TECHNICAL FIELD

The present invention relates to a control device for a vehicle having a plurality of wheels, such as an automobile (engine automobile), a hybrid car, and a two-wheeled motor vehicle.

BACKGROUND ART

A vehicle, such as an automobile, is provided with systems, including a driving/braking system that transmits a driving force from a propulsive force generating source, such as an engine, to wheels or imparts a braking force thereto, a steering system (steering control system) for controlling the steering control wheels of a vehicle, and a suspension system that elastically supports a vehicle body on wheels, as main mechanisms. Furthermore, in recent years, there has been known a vehicle provided with a variety of electric or hydraulic actuators to actively (positively) control the operations of the actuators according to a traveling condition of the vehicle or an environmental condition or the like as well as passively operating the systems in response to operations (man-caused operations) of a steering wheel (driver's wheel), an accelerator (gas) pedal, a brake pedal and the like performed by a driver, as shown in, for example, Japanese Patent Application Laid-Open No. 2000-41386 (hereinafter referred to as patent document 1).

Patent document 1 proposes a technique in which the feedforward target value of a rear wheel steering angle is determined on the basis of a front wheel steering angle, the feedback target value of the rear wheel steering angle is also determined on the basis of a difference between a reference state amount (a reference yaw rate and a reference lateral acceleration) and an actual state amount (a yaw rate detection value and a lateral acceleration detection value), and then the rear wheel steering angle follows the sum of the target values. In this case, the reference state amount is set on the basis of a front wheel steering angle. Further, the parameters or gains of transfer functions of a feedforward controller, a feedback controller, and a reference state amount determiner are adjusted on the basis of an estimated value of a friction coefficient of a road surface.

However, according to the technique disclosed in the above-mentioned patent document 1, the influences of the characteristics of a road surface reaction force acting on a wheel are not adequately taken into account although the friction characteristics of a road surface are taken into account. More specifically, the values that may be taken by a driving/braking force component and a lateral force component of a road surface reaction force acting on a wheel or a correlation therebetween is subjected to the influence of a side slip of a wheel in addition to the friction characteristic of a road surface. And, the influences of the side slip and the like are not fully considered in the technology disclosed in patent document 1. For this reason, there are cases where a proper road surface reaction force for bringing the actual state amount close to the reference state amount cannot be generated in a wheel even when a rear wheel steering angle is feedback-controlled.

Meanwhile, to control a motion of a vehicle to a desired motion, it is considered desirable to properly control a road surface reaction force as an external force acting on the vehicle. In this case, a moment in the yaw direction generated about the center-of-gravity point of the vehicle can be manipulated by manipulating, for example, a driving/braking force to be applied to each wheel from a road surface. Hence, the driving/braking force to be applied to each wheel from the road surface could be manipulated to control the behaviors of the vehicle such that an actual state amount related to a motion in the yaw direction approximates a reference state amount.

However, in this case, as described above, the driving/braking force component and the lateral force component of a road surface reaction force are subjected to the influences of not only the friction characteristics, such as the coefficient of friction between a wheel and a road surface, but also a side slip of the wheel. Therefore, it is desired to manipulate the driving/braking force to be applied to a wheel while properly considering such characteristics of a road surface reaction force.

The present invention has been made in view of the background described above, and it is an object thereof to provide a vehicle control device capable of properly controlling a motion of an actual vehicle to a desired motion while properly considering the characteristics of a road surface reaction force acting on a wheel from a road surface. Another object is to provide a vehicle control device capable of enhancing the robustness against disturbance factors or changes therein, allowing a vehicle motion to be properly controlled.

DISCLOSURE OF INVENTION

To fulfill the objects, according to the present invention, there is provided a vehicle control device equipped with a drive manipulated variable detecting means which detects a drive manipulated variable that indicates a drive operation state of the vehicle driven by a driver of the vehicle having a plurality of wheels, an actuator device provided in the vehicle so as to permit the manipulation of at least the driving/braking force of each wheel of the vehicle, and an actuator device control means which sequentially controls an operation of the actuator device, the vehicle control device comprising:

an actual state amount grasping means which detects or estimates a first actual state amount, which is the value of a predetermined first state amount related to a predetermined motion including at least a rotational motion in a yaw direction of an actual vehicle;

an actual side slip angle grasping means which detects or estimates a side slip angle of at least one wheel of the actual vehicle;

a friction characteristic estimating means which estimates the characteristic of friction between a wheel of the actual vehicle and a road surface;

a reference state amount determining means which determines a first reference state amount, which is a reference value of the first state amount, on the basis of at least the detected drive manipulated variable;

a state amount error calculating means which calculates a first state amount error, which is a difference between the detected or estimated first actual state amount and the determined first reference state amount; and an actual vehicle actuator operation control input determining means which determines an actual vehicle actuator operation control input, which is a control input for operating the actuator device and which includes a driving/braking force manipulation control input defining a target driving/braking force of each wheel of the actual vehicle, on the basis of at least the detected drive manipulated variable and the calculated first state amount error, wherein the actuator device control means is a means which controls the operation of the actuator device on the basis of the determined actual vehicle actuator operation control input.

Further, in the vehicle control device in accordance with the present invention, the actual vehicle actuator operation control input determining means comprises a means which determines a feedback control input for manipulating the driving/braking force of each wheel for bringing the first state amount error close to zero on the basis of at least the calculated first state amount error, a means which determines a feedforward control input defining a feedforward target value of the driving/braking force of each wheel on the basis of at least the detected drive operation input, and a means which determines the driving/braking force manipulation control input for a k-th wheel, which is one or more specific wheels of the plurality of wheels, such that a predetermined first required condition related to a relationship among a road surface reaction force that can be applied from a road surface to the k-th wheel under a precondition that at least the side slip angle of the k-th wheel agrees with the detected or estimated side slip angle and the characteristic of friction between the k-th wheel and the road surface agrees with the estimated friction characteristic, the feedforward control input of the k-th wheel, the feedback control input of the k-th wheel, and the driving/braking force manipulation control input of the k-th wheel is satisfied (a first invention).

Alternatively, the actual vehicle actuator operation control input determining means comprises a means which determines a feedback control input for manipulating the driving/braking force of each wheel for bringing the first state amount error close to zero on the basis of at least the calculated first state amount error, a means which determines a feedforward control input defining a feedforward target value of the driving/braking force of each wheel on the basis of at least the detected drive operation input, and a means which defines, for a k-th wheel, which is one or more specific wheels of the plurality of wheels, a predetermined required condition related to a relationship among a road surface reaction force that may act from a road surface on the k-th wheel under a precondition that at least the side slip angle of the k-th wheel agrees with the detected or estimated side slip angle and the characteristic of friction between the k-th wheel and the road surface agrees with the estimated friction characteristic, the feedforward control input of the k-th wheel, the feedback control input of the k-th wheel, and the driving/braking force manipulation control input of the k-th wheel as a first required condition, defines a predetermined required condition related to a relationship between a driving/braking force at the generation of a maximum moment, which is a driving/braking force component of a road surface reaction force that is maximized in the same direction as the direction of a moment in the yaw direction generated about the center-of-gravity point of the actual vehicle due to the manipulation of the driving/braking force of the k-th wheel based on the feedback control input of the k-th wheel by a moment in the yaw direction generated about the center-of-gravity point of the actual vehicle by a road surface reaction force, in the road surface reaction force that may act from the road surface on the k-th wheel under at least the precondition, and the driving/braking force manipulation control input of the k-th wheel as a second required condition, defines the second required condition out of the first required condition and the second required condition as a priority condition, and determines the driving/braking force manipulation control input of the k-th wheel such that at least either the first required condition or the second required condition is satisfied (a second invention).

Alternatively, the actual vehicle actuator operation control input determining means comprises a means which determines a feedback control input for manipulating the driving/braking force of each wheel for bringing the first state amount error close to zero on the basis of at least the calculated first state amount error; a means which determines a feedforward control input defining a feedforward target value of the driving/braking force of each wheel on the basis of at least the detected drive operation input; and a means which defines, for a k-th wheel, which is one or more particular wheels of the plurality of wheels, a predetermined required condition related to a relationship among a road surface reaction force that may act from a road surface on the k-th wheel under a precondition that at least the side slip angle of the k-th wheel agrees with the detected or estimated side slip angle and the characteristic of friction between the k-th wheel and the road surface agrees with the estimated friction characteristic, the feedforward control input of the k-th wheel, the feedback control input of the k-th wheel, and the driving/braking force manipulation control input of the k-th wheel as a first required condition, defines a predetermined required condition related to a relationship between the feedforward target value defined by the determined feedforward control input of the k-th wheel and the driving/braking force manipulation control input of the k-th wheel as a third required condition, defines the third required condition out of the first required condition and the third required condition as a priority condition, and determines the driving/braking force manipulation control input of the k-th wheel such that at least either the first required condition or the third required condition is satisfied (a third invention).

Alternatively, the actual vehicle actuator operation control input determining means comprises a means which determines a feedback control input for manipulating the driving/braking force of each wheel for bringing the first state amount error close to zero on the basis of at least the calculated first state amount error, a means which determines a feedforward control input defining the feedforward target value of the driving/braking force of each wheel on the basis of at least the detected drive operation input, and a means which defines, for a k-th wheel, which is one or more specific wheels of the plurality of wheels, a predetermined required condition related to a relationship among a road surface reaction force that may act from a road surface on the k-th wheel under a precondition that at least the side slip angle of the k-th wheel agrees with the detected or estimated side slip angle and the characteristic of friction between the k-th wheel and the road surface agrees with the estimated friction characteristic, the feedforward control input of the k-th wheel, the feedback control input of the k-th wheel, and the driving/braking force manipulation control input of the k-th wheel as a first required condition, defines a predetermined required condition related to a relationship between a driving/braking force at the generation of a maximum moment, which is a driving/braking force component of a road surface reaction force that is maximized in the same direction as the direction of a moment in the yaw direction generated about the center-of-gravity point of the actual vehicle due to the manipulation of the driving/braking force of the k-th wheel based on the feedback control input of the k-th wheel by a moment in the yaw direction generated about the center-of-gravity point of the actual vehicle by a road surface reaction force, in the road surface reaction force that can act from a road surface on the k-th wheel under at least the precondition, and the driving/braking force manipulation control input of the k-th wheel as a second required condition, defines a predetermined required condition related to a relationship between the feedforward target value specified by the determined feedforward control input of the k-th wheel and the driving/braking force manipulation control input of the k-th wheel as a third required condition, defines the third required condition out of the first required condition, the second required condition and the third required condition as a priority condition of the highest rank, defines the second required condition as the priority condition of the next rank, and determines the driving/braking force manipulation control input of the k-th wheel such that at least one of the first required condition, the second required condition, and the third required condition is satisfied (a fourth invention).

According to these first to fourth inventions, the actual vehicle actuator operation control input including the driving/braking force operation control input is determined on the basis of at least the detected drive manipulated variable and the calculated first state amount error.

At this time, according to the first invention, at least the driving/braking force manipulation control input of the k-th wheel is determined such that the predetermined first required condition concerning the relationship among the road surface reaction force that may be applied from the road surface to the k-th wheel under the precondition, the feedforward control input of the k-th wheel, the feedback control input of the k-th wheel, and the driving/braking force manipulation control input of the k-th wheel is satisfied.

Here, the feedback control input of the k-th wheel is a feedback control input for bringing the first state amount error to zero, that is, for bringing the difference between the first actual state amount of a predetermined motion including a rotational motion in the yaw direction of the vehicle and a first reference state amount to zero. Further, the feedforward control input of the k-th wheel is a control input based on at least a detected value or an estimated value of the drive manipulated variable (a control input not dependent on the first state amount error). Hence, basically, the operation of the actuator device may be controlled such that the driving/braking force obtained by adjusting, on the basis of a feedback control input, the feedforward target value of a driving/braking force defined by a feedforward control input of the k-th wheel is applied to the k-th wheel from a road surface.

Meanwhile, the road surface reaction force that may be applied from a road surface to the k-th wheel is subjected, of course, to an influence of the characteristic of the friction between the k-th wheel and the road surface and also to an influence of a side slip angle of the k-th wheel. In other words, even if the characteristic of the friction between the k-th wheel and the road surface remains constant, the range of values which may be taken by a driving/braking force component and a lateral force component of a road surface reaction force that may be applied from a road surface to the k-th wheel or the correlation between the driving/braking force component and the lateral force component changes according to the side slip angle of the k-th wheel. Further, the lateral force component of the road surface reaction force generates a moment in the yaw direction about the center-of-gravity point of a vehicle. Therefore, manipulating merely the driving/braking force component on the basis of the feedback control input does not necessarily make it possible to generate a proper moment in the yaw direction for approximating the first state amount error to zero.

Hence, the precondition according to the first invention is that at least the side slip angle of the k-th wheel agrees with the detected or estimated side slip angle and the characteristic of the friction between the k-th wheel and the road surface agrees with the estimated friction characteristic. Then, the driving/braking force manipulation control input of the k-th wheel is determined such that the predetermined first required condition related to the relationship among the road surface reaction force that may be applied from the road surface to the k-th wheel under the precondition, the feedforward control input of the k-th wheel, the feedback control input of the k-th wheel, and the driving/braking force manipulation control input of the k-th wheel is satisfied.

With this arrangement, according to the first invention, it is possible to determine the driving/braking force manipulation control input of the k-th wheel such that the requirement (control requirement) for the driving/braking force indicated by the feedforward control input and the feedback control input of the k-th wheel is satisfied as much as possible while considering the characteristics of a road surface reaction force that may actually act on the k-th wheel. As a result, the operation of an actuator device can be controlled so that a first state amount error is brought close to zero with high stability while taking the operation of the actuator device based on the detected or estimated drive manipulated variable as the reference.

Furthermore, the aforesaid second invention takes into account the second required condition in addition to the first required condition. More specifically, in the second invention, a predetermined required condition concerning a relationship between a driving/braking force at the generation of a maximum moment, which is a driving/braking force component of a road surface reaction force that is maximized in the same direction as the direction of a moment in the yaw direction generated about the center-of-gravity point of an actual vehicle due to the manipulation of the driving/braking force of the k-th wheel based on the feedback control input of the k-th wheel by a moment in the yaw direction generated about the center-of-gravity point of the actual vehicle by a road surface reaction force, in the road surface reaction force that may be applied from the road surface to the k-th wheel under at least the precondition, and the driving/braking force manipulation control input of the k-th wheel is defined as a second required condition. Further, the second required condition out of the first required condition, which is the same as that of the first invention, and the second required condition is defined as a priority condition (the required condition which takes priority over the first required condition), and the driving/braking force manipulation control input of the k-th wheel is determined such that at least one of the first required condition and the second required condition is satisfied. In other words, the driving/braking force manipulation control input of the k-th wheel is determined such that the first required condition is satisfied in a range in which the second required condition can be satisfied.

Here, the second required condition means that, regarding the direction of the moment in the yaw direction generated about the center-of-gravity point of an actual vehicle due to the manipulation of the driving/braking force of the k-th wheel by the feedback control input of the k-th wheel, the total moment in the yaw direction about the center-of-gravity point of the actual vehicle should be changed in that direction in order to approximate the first state amount error to zero. In this case, if the total driving/braking force including the manipulated variable of the driving/braking force of the k-th wheel attributable to a feedback control input of the k-th wheel is in the same direction as that of the driving/braking force at the generation of a maximum moment, and if the absolute value of the total driving/braking force exceeds the absolute value of the driving/braking force at the generation of the maximum moment, then the lateral force of the k-th wheel will be excessively small or the absolute value of a slip ratio of the k-th wheel will be excessively large.

Therefore, according to the second invention, the predetermined required condition related to the relationship between a driving/braking force at the generation of a maximum moment and a driving/braking force manipulation control input of the k-th wheel is defined as the second required condition, and the second required condition out of the first required condition and the second required condition is defined as a priority condition. Then, the driving/braking force manipulation control input of the k-th wheel is determined such that at least one of the first required condition and the second required condition is satisfied.

Thus, the second invention makes it possible to determine the driving/braking force manipulation control input of the k-th wheel such that a requirement related to a driving/braking force indicated by a feedforward control iinput and a feedback control input of the k-th wheel is satisfied as much as possible while preventing a lateral force actually acting on the k-th wheel from becoming excessively small or the absolute value of a slip ratio of the k-th wheel from becoming excessively large.

Further, the aforesaid third invention considers the third required condition in addition to the first required condition. More specifically, the third invention defines a predetermined required condition related to the relationship between a feedforward target value specified by a feedforward control input of the k-th wheel and a driving/braking force manipulation control input of the k-th wheel as the third required condition. Then, the third required condition out of the first required condition, which is the same as that of the first invention, and the third required condition is defined as a priority condition (a required condition which takes priority over the first required condition). Then, the driving/braking force manipulation control input of the k-th wheel is determined such that at least one of the first required condition and the third required condition is satisfied. In other words, the driving/braking force manipulation control input of the k-th wheel is determined such that the first required condition is satisfied in a range in which the third required condition is satisfied.

Here, regarding the third required condition, the feedforward control input of the k-th wheel is determined on the basis of at least the drive manipulated variable indicative of a driver's request. Therefore, especially when the feedforward target value of a driving/braking force of the k-th wheel specified by the feedforward control input is a driving/braking force in a braking direction, it is considered desirable to determine the driving/braking force manipulation control input of the k-th wheel such that a driving/braking force having a magnitude of the required driving/braking force or more acts on the k-th wheel.

Hence, the third invention defines a predetermined required condition related to a relationship between a feedforward target value specified by a feedforward control input of the k-th wheel and a driving/braking force manipulation control input of the k-th wheel as a third required condition, defines the third required condition out of the first required condition and the third required condition as a priority required condition, and then determines the driving/braking force manipulation control input of the k-th wheel such that at least one of the first required condition and the third required condition is satisfied.

Thus, the third invention makes it possible to determine the driving/braking force manipulation control input of the k-th wheel such that a requirement (control requirement) related to a driving/braking force indicated by a feedforward control input and a feedback control input of the k-th wheel is satisfied as much as possible while causing a driving/braking force (especially a driving/braking force in the braking direction) which conforms to a request of the driver of the vehicle as much as possible to act on the k-th wheel.

Further, the aforesaid fourth invention takes into account the second required condition and the third required condition in addition to the first required condition. More specifically, according to the fourth invention, the third required condition out of the first required condition, the second required condition, and the third required condition described above is defined as a priority condition of the highest rank, and the second required condition is defined as a priority condition of the next rank. Then, the driving/braking force manipulation control input of the k-th wheel is determined such that at least one of the first required condition, the second required condition, and the third required condition is satisfied.

Thus, the fourth invention makes it possible to determine the driving/braking force manipulation control input of the k-th wheel such that a requirement (control requirement) related to a driving/braking force indicated by a feedforward control input and a feedback control input of the k-th wheel is satisfied as much as possible while satisfying a requirement that a driving/braking force (especially a driving/braking force in the braking direction) which conforms to a request of the driver of the vehicle as much as possible act on the k-th wheel and that a lateral force which actually acts on the k-th wheel is prevented from becoming excessively small or the absolute value of a slip ratio of the k-th wheel is prevented from becoming excessively large as much as possible.

As explained above, according to the first to the fourth inventions described above, it is possible to properly control a motion of an actual vehicle to a desired motion, while properly considering the characteristics of a road surface reaction force acting from a road surface to a wheel.

In the first to the fourth inventions described above, the feedback control inputs include, for example, a control input that defines the target value of the manipulated variable of the driving/braking force of each wheel. In this case, in each of the first to the fourth inventions, in the case where the total sum of the target value of the manipulated variable of a driving/braking force specified by a feedback control input of the k-th wheel and the feedforward target value of a driving/braking force specified by a feedforward control input of the k-th wheel is defined as an unlimited k-th wheel required driving/braking force, the aforesaid first required condition is preferably a condition that the target driving/braking force specified by the driving/braking force manipulation control input of the k-th wheel takes a value in a range of the values of the driving/braking force components of the road surface reaction forces that may act from a road surface onto the k-th wheel under the aforesaid precondition and that the absolute value of a difference from the unlimited k-th wheel required driving/braking force is minimized (a fifth invention, a sixth invention, a seventh invention, and an eighth invention).

According to the fifth to the eighth inventions described above, the driving/braking force manipulation control input of the k-th wheel is determined such that the target driving/braking force specified by the driving/braking force manipulation control input of the k-th wheel takes a value in a range of the values of the driving/braking force components of the road surface reaction forces that may act from a road surface onto the k-th wheel under the aforesaid precondition and that the absolute value of a difference from the unlimited k-th wheel required driving/braking force, which corresponds to the total requirement of the feedback control input and the feedforward control input, is minimized. Hence, the driving/braking force manipulation control input of the k-th wheel can be determined such that the requirement (control requirement) related to a driving/braking force indicated by a feedforward control input and a feedback control input of the k-th wheel is ideally satisfied, while properly considering the characteristics of a road surface reaction force acting on the k-th wheel.

Alternatively, in the first to the fourth inventions described above, according to another example of the feedback control input, there is a control input that defines the target value of a moment in the yaw direction generated about the center-of-gravity point of the actual vehicle caused by the manipulation of the driving/braking force of each wheel by the feedback control input. In this case, in each of the first to the fourth inventions described above, in the case where the total sum of a moment in the yaw direction generated about the center-of-gravity point of an actual vehicle by a road surface reaction force which has a driving/braking force component in a road surface reaction force that may act from a road surface on the k-th wheel under the precondition and which leads to a minimum absolute value of the difference from the feedforward target value of a driving/braking force specified by a feedforward control input of the k-th wheel, and the target value of a moment in the yaw direction specified by a feedback control input of the k-th wheel is defined as an unlimited k-th wheel required moment, the first required condition is preferably a condition that the target driving/braking force specified by a driving/braking force manipulation control input of the k-th wheel takes a value in a range of the values of the driving/braking force components of road surface reaction forces that may act from a road surface on the k-th wheel under the precondition and that the absolute value of the difference between the moment in the yaw direction generated about the center-of-gravity point of an actual vehicle by a road surface reaction force having a driving/braking force component equivalent to a target driving/braking force of the k-th wheel among the road surface reaction forces that may act from a road surface on the k-th wheel under the precondition, and the unlimited k-th wheel required moment is minimum (a ninth invention, a tenth invention, an eleventh invention, and a twelfth invention).

According to the ninth to the twelfth inventions described above, the driving/braking force manipulation control input of the k-th wheel is determined such that the target driving/braking force specified by a driving/braking force manipulation control input of the k-th wheel takes a value in a range of the values of the driving/braking force components of road surface reaction forces that may act from a road surface on the k-th wheel under the precondition and that the absolute value of the difference between the moment in the yaw direction generated about the center-of-gravity point of an actual vehicle by a road surface reaction force having a driving/braking force component equivalent to a target driving/braking force of the k-th wheel among the road surface reaction forces that may act from a road surface on the k-th wheel under the precondition, and the unlimited k-th wheel required moment (this corresponds to the total requirement of the feedback control input and the feedforward control input) is minimum. Hence, the driving/braking force manipulation control input of the k-th wheel can be determined such that a requirement (control requirement) related to a driving/braking force indicated by a feedforward control input and a feedback control input of the k-th wheel is ideally satisfied, while properly considering the characteristics of a road surface reaction force acting on the k-th wheel.

Further, in the aforesaid second invention (or an invention which is subordinate thereto) using the second required condition, the second required condition is preferably a condition that the direction of a target k-th wheel driving/braking force, which is a target driving/braking force specified by a driving/ braking force manipulation control input of the k-th wheel and the direction of the k-th wheel driving/braking force at the generation of a maximum moment are opposite from each other, or the absolute value of the target k-th wheel driving/ braking force is not more than the absolute value of the k-th wheel driving/braking force at the generation of a maximum moment (a thirteenth invention). Further, in the fourth invention (or an invention subordinate thereto) also, a technical matter equivalent to the thirteenth invention is preferably adopted (a fourteenth invention).

According to the thirteenth invention and the fourteenth invention, a target driving/braking force specified by a driving/braking force manipulation control input of the k-th wheel is in the same direction as a k-th wheel driving/braking force at the generation of a maximum moment, and the absolute value of the target driving/braking force does not exceed the absolute value of the k-th wheel driving/braking force at the generation of a maximum moment, thus making it possible to determine the driving/braking force manipulation control input of the k-th wheel such that the first state amount error is approximated to zero, while preventing a lateral force which actually acts on the k-th wheel from becoming excessively small or the absolute value of a slip ratio of the k-th wheel from becoming excessively large.

Further, in the third invention (or an invention subordinate thereto) using the third required condition, the third required condition is preferably a condition that, in the case where a target k-th wheel driving/braking force, which is a target driving/braking force specified by the driving/braking force manipulation control input of the k-th wheel, is a driving/braking force in the braking direction, and a feedforward target value of a driving/braking force specified by a feedforward control input of the k-th wheel is a driving/braking force in the braking direction, the absolute value of the target k-th wheel driving/braking force is not less than the absolute value of a feedforward target value of a driving/braking force of the k-th wheel (a fifteenth invention). Further, preferably, the fourth invention (or an invention subordinate thereto) also adopts a technical matter equivalent to the fifteenth invention (a sixteenth invention).

According to the fifteenth invention and the sixteenth invention, the driving/braking force manipulation control input of the k-th wheel can be determined such that the absolute value of a driving/braking force in the braking direction that acts on the k-th wheel does not become smaller than the absolute value of a driving/braking force in the braking direction required by a driver.

Preferably, each of the first to the fourth inventions explained above (or an invention subordinate to each thereof) is equipped with a vehicle model established beforehand as a model that expresses the dynamic characteristics of the vehicle and a vehicle model operation control input determining means which determines a vehicle model operation control input for operating a motion which includes at least a rotational motion in the yaw direction of a vehicle on the vehicle model on the basis of at least the calculated first state amount error such that the first state amount error is approximated to zero, wherein the reference state amount determining means is a means which inputs at least the detected drive operation input and the determined vehicle model operation control input into the vehicle model to determine a first state amount related to the predetermined motion including the rotational motion in the yaw direction of the vehicle on the vehicle model as the first reference state amount (a seventeenth invention, an eighteenth invention, a nineteenth invention, and a twentieth invention).

The seventeenth to the twentieth inventions described above not only control the operation of an actuator device of an actual vehicle such that the first state amount error approximates to zero but also operate the vehicle on the vehicle model such that a first state amount error approximates to zero. Hence, even if the first actual state amount is indicative of moving away from a first reference state amount due to an estimation error of the friction characteristics, a detection error or an estimation error of a side slip angle of a wheel, or a modeling error of the vehicle model, or the restriction on the operation of an actuator device by a limiter, or the like, a first reference state amount can be brought close to an actual first state amount. This arrangement makes it possible to prevent the first state amount error from becoming excessively large due to a variety of disturbance factors or changes therein. As a result, the stability of the control of the operation of an actuator device of an actual vehicle can be enhanced. Therefore, the seventeenth to the twentieth inventions make it possible to enhance the robustness against disturbance factors or changes therein, thus properly controlling the motions of a vehicle.

Incidentally, in the seventeenth to the twentieth inventions, vehicle model operation control inputs include, for example, a virtual external force (a moment or a translational force) additionally applied to the vehicle on the vehicle model. If the first state amount includes a state amount related to a rotational motion in the yaw direction of a vehicle, then the virtual external force preferably includes a moment component in the yaw direction.

Further, in each of the first to the fourth inventions (or an invention subordinate to each thereof), the actual side slip angle grasping means may of course be a means which detects or estimates the side slip angle of each wheel of the vehicle, but may alternatively be a means which estimates the side slip angle at a predetermined position of the vehicle as the side slip angle of at least one wheel (a twenty-first invention, a twenty-second invention, a twenty-third invention, and a twenty-fourth invention). Incidentally, in this case, the predetermined position of the vehicle may be, for example, a position in the vicinity of a front wheel of the vehicle, a position in the vicinity of a rear wheel, or the position of the center-of-gravity point of the vehicle.

Moreover, in each of the seventeenth to the twentieth inventions, the state amount of the vehicle on the vehicle model and the state amount of the actual vehicle do not significantly move apart from each other. For this reason, the actual side slip angle grasping means may be a means which presumes either the side slip angle of at least one wheel of the vehicle on the vehicle model or the side slip angle at a predetermined position of the vehicle on the vehicle model as the side slip angle of at least one wheel of the actual vehicle (the twenty-fifth invention, the twenty-sixth invention, a twenty-seventh invention, and a twenty-eighth invention).

Further, the first state amount may include, for example, a state amount related to a lateral translational motion of a vehicle in addition to the state amount related to a rotational motion in the yaw direction of a vehicle.

BEST MODE FOR CARRYING OUT THE INVENTION

The following will explain embodiments of the vehicle control device in accordance with the present invention.

First, referring to FIG. 1, a schematic construction of a vehicle in the embodiments in the present description will be explained. FIG. 1 is a block diagram illustrating the schematic construction of the vehicle. A vehicle illustrated in the embodiments in the present description is a car provided with four wheels (two wheels each at the front and the rear of the vehicle). The construction itself of the car may be a publicly known one, so that detailed illustration and explanation will be omitted in the present description.

As shown in FIG. 1, a vehicle 1 (car) is provided with a driving/braking device 3A (a driving/braking system) that imparts a rotational driving force (a rotational force that provides an impelling force for the vehicle 1) to driving wheels among four wheels W1, W2, W3, and W4, or imparts a braking force (a rotational force that provides a braking force for the vehicle 1) to each of the wheels W1 to W4, a steering device 3B (a steering system) for controlling steering control wheels among the four wheels W1 to S4, and a suspension device 3C (a suspension system) that resiliently supports a vehicle body 1B on the four wheels W1 to W4, as with a publicly known regular car. The wheels W1, W2, W3, and W4 are a front left wheel, a front right wheel, a rear left wheel, and a rear right wheel, respectively, of the vehicle 1. Further, the driving wheel and the steering control wheel are the two front wheels W1 and W2 in the embodiments to be explained in the present description. Hence, the rear wheels W3 and W4 are driven wheels and non-steering-control wheels.

However, the driving wheels may alternatively be the two rear wheels W3 and W4 or both the front wheels W1, W2 and the rear wheels W3, W4 (the four wheels W1 through W4). Further, the steering control wheels may include not only the two front wheels W1 and W2 but the rear wheels W3 and W4 also.

These devices 3A, 3B and 3C have functions for manipulating the motions of the vehicle 1. For example, the driving/braking device 3A has a function for mainly manipulating the motions in advancing directions of the vehicle 1 (positions, velocities, accelerations and the like in the advancing directions of the vehicle 1). The steering device 3B has a function for mainly manipulating the rotational motions in the yaw direction of the vehicle 1 (postures, angular velocities, angular accelerations and the like in the yaw direction of the vehicle 1). The suspension device 3C has a function for primarily manipulating the motions in the pitch direction and the roll direction of a vehicle body 1B of the vehicle 1 (postures and the like in the pitch direction and the roll direction of the vehicle body 1B of the vehicle 1) or the motions in the vertical directions of the vehicle body 1B (mainly a height of the vehicle body 1B from a road surface (a vertical position of the vehicle body 1B relative to the wheels W1 to W4)). Incidentally, a "posture" of the vehicle 1 or the vehicle body 1B means a spatial orientation in the present description.

Supplementally, in general, side slips of the wheels W1 to W4 occur when the vehicle 1 makes turns or the like. The side slips are subjected to the influences of the steering angles of the steering control wheels of the vehicle 1, a yaw rate (an angular velocity in the yaw direction) of the vehicle 1, the driving/braking forces of the wheels W1 to W4, and the like. For this reason, the driving/braking device 3A and the steering device 3B have functions for manipulating the translational motions in lateral directions (right/left directions) of the vehicle 1. Incidentally, the "driving/braking force" of a wheel means a translational force component, which is in a longitudinal direction of the wheel, of a road surface reaction force acting on the wheel from a road surface (more specifically, in the direction of a line of intersection between a rotational plane of the wheel (a plane which passes the central point of the wheel and which is orthogonal to the rotational axis of the wheel) and a road surface or a horizontal plane). Further, in the road surface reaction force, a translational force component in the direction of the width of a wheel (the direction parallel to the rotational axis of the wheel) is referred to as a "lateral force." In the road surface reaction force, a translational force component in a direction perpendicular to a road surface or a horizontal plane is referred to as a "ground contact load."

Although not illustrated in detail, more specifically, the driving/braking device 3A is equipped with a driving system constructed of an engine (an internal-combustion engine) serving as a motive power generating source of the vehicle 1 (an impellent force generating source of the vehicle 1) and a motive power transmitting system for transmitting an output (a rotational driving force) of the engine to the driving wheels among the wheels W1 to W4, and a braking device (a braking system) that imparts braking forces to the wheels W1 to W4. The motive power transmitting system includes a transmission, a differential gear, and the like.

The vehicle 1 explained in the embodiments is equipped with an engine as a motive power generating source; however, it may alternatively be a vehicle provided with an engine and an electric motor as motive power generating sources (a so-called parallel type hybrid vehicle) or a vehicle provided with an electric motor as a motive power generating source (a so-called electric car or a series type hybrid vehicle).

Further, a steering wheel (driver's wheel), an accelerator (gas) pedal, a brake pedal, a shift lever, and the like functioning as manipulating devices 5 (man-induced manipulating devices) operated by a driver to steer the vehicle 1 (car) are provided in a vehicle interior of the vehicle 1. The illustration of the elements of the manipulating devices 5 is omitted.

The steering wheel among the manipulating devices 5 is related to an operation of the steering device 3B. More specifically, as the steering wheel is rotationally manipulated, the steering device 3B is operated in response thereto, thus steering the steering control wheels W1 and W2 among the wheels W1 to W4.

The accelerator (gas) pedal, the brake pedal, and the shift lever among the manipulating devices 5 are related to the operations of the driving/braking device 3A. More specifically, the opening of a throttle valve provided in the engine changes according to a manipulated variable (a depression amount) of the accelerator (gas) pedal so as to adjust an intake air volume and a fuel injection amount of the engine (consequently an output of the engine). Further, the braking device is operated according to a manipulated variable (a depression amount) of a brake pedal, and a braking torque based on the manipulated variable of the brake pedal is imparted to the wheels W1 to W4. Further, manipulating the shift lever changes an operation state of the transmission, such as a change gear ratio of the transmission, thus effecting the adjustment or the like of the driving torque transmitted from the engine to the driving wheels.

The drive operation states of the manipulating devices 5, such as the steering wheel operated by the driver (the steerer of the vehicle 1) are detected by appropriate sensors, which are not shown. Hereinafter, detection values (detection outputs of the sensors) of the drive operation states will be referred to as drive operation inputs. The drive operation inputs include the detection values of a steering angle, which is a rotational angle of the steering wheel, an accelerator (gas) pedal manipulated variable, which is a manipulated variable of the accelerator (gas) pedal, a brake pedal manipulated variable, which is a manipulated variable of the brake pedal, and a shift lever position, which is a manipulation position of the shift lever. The sensors that output the drive operation inputs correspond to the drive manipulated variable detecting means in the present invention.

In the embodiments in the present description, the driving/braking device 3A and the steering device 3B described above are adapted to permit active control of the operations thereof (consequently the motions of the vehicle 1) in response to not only the drive operation inputs but also factors other than the drive operation inputs (e.g., a motion state of the vehicle 1 or an environmental condition), where "to permit active control" means that the operations of the devices 3A and 3B can be controlled into the operations obtained by correcting basic operations based on the drive operation inputs (basic desired operations determined on the basis of drive operation inputs).

More specifically, the driving/braking device 3A is a driving/braking device having a function that makes it possible to actively control the difference or the ratio between a driving/braking force of the left wheels W1, W3 and a driving/braking force of the right wheels W2, W4 on at least one of the pair of the front wheels W1, W2 and the pair of the rear wheels W3, W4 through the intermediary of actuators, such as a hydraulic actuator, an electric motor, and an electromagnetic control valve, provided in the driving/braking device 3A (hereinafter, the control function will be referred to as the right/left motive power distribution control function).

To be more specific, according to the embodiments in the present description, the driving/braking device 3A is a driving/braking device capable of actively controlling the driving/braking forces to be applied to the wheels W1 to W4 (specifically, the driving/braking forces in the braking direction of the vehicle 1) by operating a braking device through the intermediary of actuators provided in the braking device (a driving/braking device capable of controlling the driving/braking forces to be applied to the wheels W1 to W4 by the braking device by increasing or decreasing the basic driving/braking forces determined on the basis of the manipulated variables of the brake pedal). Hence, the driving/braking device 3A is a driving/braking device capable of actively controlling, through the intermediary of the actuators, the difference or the ratio between a driving/braking force of the left wheels W1, W3 and a driving/braking force of the right wheels W2, W4 by the braking device on both pairs, namely, the pair of the front wheels W1, W2 and the pair of the rear wheels W3, W4 (a driving/braking device that has the right/left motive power distribution control function for both pairs of the pair of the front wheels W1, W2 and the pair of the rear wheels W3, W4).

The driving/braking device 3A may have a function that permits active control, through the intermediary of actuators provided in the driving system, of the difference or the ratio between the driving/braking forces to be applied to the front wheels W1 and W2, which are driving wheels, by operating the driving system of the driving/braking device 3A, in addition to the function for actively controlling the driving/braking forces of the wheels W1 to W4 by operating the braking device.

As the driving/braking device 3A having the right/left motive power distribution control function as described above, a publicly known one may be used.

Supplementally, the driving/braking device 3A having the right/left motive power distribution control function as described above will also have a function for actively manipulating a rotational motion in the yaw direction of the vehicle 1 or a translational motion in the lateral direction by the control function thereof.

Incidentally, the driving/braking device 3A includes an actuator for generating braking torque for the braking device, an actuator for driving a throttle valve of the engine, an actuator for driving a fuel injection valve, an actuator for performing speed change drive of the transmission, and the like in addition to the actuators associated with the right/left motive power distribution control function.

Further, the steering device 3B is a steering device capable of secondarily steering the front wheels W1 and W2 by an actuator, such as an electric motor, as necessary, in addition to, for example, a function for mechanically steering the front wheels W1 and W2, which are steering control wheels, through the intermediary of a steering mechanism, such as a rack-and-pinion, according to a rotational operation of the steering wheel (a steering device capable of controlling the steering angle of the front wheels W1 and W2 by increasing or decreasing the steering angle mechanically determined on the basis of the rotational angle of the steering wheel). Alternatively, the steering device 3B is a steering device which steers the front wheels W1 and W2 by using only a driving force of an actuator (a so-called steering-by-wire steering device). Therefore, the steering device 3B is a steering device capable of actively controlling the steering angle of the front wheels W1 and W2 through the intermediary of an actuator (hereinafter referred to as an active steering device).

If the steering device 3B is an active steering device which secondarily steers the steering control wheels by an actuator in addition to mechanically steering the steering control wheels according to a rotational operation of the steering wheel (hereinafter, such an active steering device will be referred to as an actuator-assisted steering device), then the resultant angle of the steering angle of a steering control wheel mechanically determined by a rotational operation of the steering wheel and a steering angle based on an operation of an actuator (a correction amount of a steering angle) will be the steering angle of the steering control wheel.

If the steering device 3B is an active steering device which steers the steering control wheels W1 and W2 by using only a driving force of an actuator (hereinafter, such an active steering device will be referred to as an actuator-driven type steering device), then a target value of the steering angle of the steering control wheels is determined on the basis of at least a detection value of the steering angle and the actuator is controlled such that the actual steering angle of the steering control wheels takes the target value.

As the steering device 3B capable of actively controlling the steering angle of the steering control wheels W1 and W2 through the intermediary of an actuator (the active steering device), a publicly known one may be used.

The steering device 3B in the embodiments in the present description is an active steering device capable of actively controlling the steering angle of the front wheels W1 and W2 through the intermediary of an actuator; alternatively, however, it may be a type that performs only the mechanical steering of the front wheels W1 and W2 on the basis of a rotational operation of the steering wheel (hereinafter referred to as a mechanical type steering device). Further, in a vehicle having all wheels W1 to W4 as steering control wheels, the steering device may be capable of actively controlling the steering angles of both the front wheels W1, W2 and the rear wheels W3, W4 through the intermediary of actuators. Alternatively, the steering device may be a type which steers the front wheels W1 and W2 on the basis of a rotational operation of the steering wheel only by a mechanical means, such as a rack-and-pinion, and which is capable of actively controlling only the steering angle of the rear wheels W3 and W4 through the intermediary of an actuator.

According to the embodiments in the present description, the suspension device 3C is a suspension device which passively operates on the basis of, for example, a motion of the vehicle 1.

However, the suspension device 3C may be a suspension device capable of variably controlling, for example, a damping force, hardness or the like of a damper interposed between the vehicle body 1B and the wheels W1 to W4 through the intermediary of an actuator, such as an electromagnetic control valve or an electric motor. Alternatively, the suspension device 3C may be a suspension device capable of directly controlling a stroke (an amount of vertical displacement between the vehicle body 1B and the wheels W1 to W4) of a suspension (a mechanical portion, such as a spring, of the suspension device 3C) or a vertical expanding/contracting force of the suspension generated between the vehicle body 1B and the wheels W1 to W4 by a hydraulic cylinder or a pneumatic cylinder (a so-called electronically controlled suspension). If the suspension device 3C is a suspension device capable of controlling the damping force or the hardness of the damper and the stroke or the expanding/contracting force of the suspension as described above (hereinafter referred to as the active suspension device), then the suspension device 3C permits active control of the operations thereof.

In the following explanation, among the driving/braking device 3A, the steering device 3B, and the suspension device 3C, those devices capable of actively controlling the operations as described above may be referred to generically as actuator devices 3. In the embodiments in the present description, the actuator devices 3 include the driving/braking device 3A and the steering device 3B. If the suspension device 3C is an active suspension device, then the suspension device 3C is also included in the actuator devices 3.

Further, the vehicle 1 is provided with a controller 10 which determines a manipulated variable of an actuator (a control input to the actuator; hereinafter referred to as an actuator manipulated variable) provided in each of the actuator devices 3 on the basis of the above-mentioned drive operation inputs and the like, and controls the operation of each of the actuator devices 3 on the basis of the actuator manipulated variable. This controller 10 is constituted of an electronic circuit unit that includes a microcomputer and the like, and it receives the drive operation inputs from sensors of the manipulating devices 5 and also the detection values of the state amounts of the vehicle 1, such as a traveling velocity, a yaw rate and the like of the vehicle 1, and information on traveling environments and the like of the vehicle 1 from various sensors, which are not shown. Then, based on those inputs, the controller 10 sequentially determines actuator manipulated variables at a predetermined control processing cycle so as to sequentially control the operations of the actuator devices 3.

The above has described the general schematic construction of the vehicle 1 (the car) of the embodiments in the present description. This schematic construction will be the same in all embodiments to be explained below.

Supplementally, according to the embodiments in the present description, among the driving/braking device 3A, the steering device 3B, and the suspension device 3C described above, those corresponding to the actuator devices in the present invention (the actuator devices to which the present invention will be applied to carry out operation control) will be the driving/braking device 3A or the driving/braking device 3A and the steering device 3B. Further, the controller 10 corresponds to the actuator device controlling means in the present invention.

Further, the controller 10 implements a variety of means in the present invention by the control processing function thereof.

FIRST EMBODIMENT

The control processing by a controller 10 in a first embodiment will now be schematically explained by referring to FIG. 2. FIG. 2 is a functional block diagram illustrating an overview of an entire control processing function of the controller 10. In the following explanation, a real vehicle 1 will be referred to as an actual vehicle 1.

The portion excluding the actual vehicle 1 in FIG. 2 (more precisely, the portion excluding the actual vehicle 1 and sensors included in a sensor/estimator 12, which will be discussed later) corresponds to the primary control processing function of the controller 10. The actual vehicle 1 in FIG. 2 is provided with the driving/braking device 3A, the steering device 3B, and the suspension device 3C described above.

As illustrated, the controller 10 is equipped with, as its main processing function components, the sensor/estimator 12, a reference manipulated variable determiner 14, a reference dynamic characteristics model 16, a subtracter 18, a feedback distribution law (FB distribution law) 20, a feedforward law (FF law) 22, an actuator operation target value synthesizer 24, and an actuator drive control unit 26. The solid-line arrows in FIG. 2 indicate primary inputs to the processing function components and the dashed-line arrows indicate secondary inputs to the processing function components.

The controller 10 carries out the processing by these processing function components at a predetermined control processing cycle to sequentially determine actuator manipulated variables at each control processing cycle. Further, the controller 10 sequentially controls the operations of the actuator devices 3 of the actual vehicle 1 on the basis of the actuator manipulated variables.

The following will present an outline of each processing function component of the controller 10 and an outline of the overall processing. Hereinafter, regarding the values of the variables determined at each control processing cycle of the controller 10, a value finally obtained by the processing at a current (a latest) control processing cycle will be referred to as a current time value, and a value finally obtained by the processing of a last time control processing cycle will be referred to as a last time value.

At each control processing cycle, the controller 10 first detects or estimates a state amount of the actual vehicle 1 or a state amount of a traveling environment of the actual vehicle 1 by the sensor/estimator 12. In the present embodiment, detection targets or estimation targets of the sensor/estimator 12 include, for example, a yaw rate $\gamma act$, which is an angular velocity in the yaw direction of the actual vehicle 1, a traveling velocity Vact (ground speed) of the actual vehicle 1, a vehicle center-of-gravity point side slip angle $\beta act$, which is a side slip angle of the center-of-gravity point of the actual vehicle 1, a front wheel side slip angle $\beta f\_act$, which is a side slip angle of the front wheels W1 and W2 of the actual vehicle 1, a rear wheel side slip angle $\beta r\_act$, which is a side slip angle of the rear wheels W3 and W4 of the actual vehicle 1, a road surface reaction force (a driving/braking force, a lateral force, and a ground contact load), which is a reaction force acting on the wheels W1 to W4 of the actual vehicle 1 from a road surface, a slip ratio of the wheels W1 to W4 of the actual vehicle 1, and a steering angle $\delta f\_act$ of the front wheels W1 and W2 of the actual vehicle 1.

Among these detection targets or estimation targets, the vehicle center-of-gravity point side slip angle $\beta act$ is an angle formed by the vector of the traveling velocity Vact of the actual vehicle 1 with respect to the longitudinal direction of the actual vehicle 1 when the actual vehicle 1 is observed from above (on the horizontal plane). The front wheel side slip angle $\beta f\_act$ is an angle formed by the advancing velocity vector of the front wheels W1 and W2 with respect to the longitudinal direction of the front wheels W1 and W2 when the actual vehicle 1 is observed from above (on the horizontal plane). The rear wheel side slip angle $\beta r\_act$ is an angle formed by the advancing velocity vector of the rear wheels W3 and W4 with respect to the longitudinal direction of the rear wheels W3 and W4 when the actual vehicle 1 is observed from above (on the horizontal plane). The steering angle $\delta f\_act$ is an angle formed by the rotational surfaces of the front wheels W1 and W2 with respect to the longitudinal direction of the actual vehicle 1 when the actual vehicle 1 is observed from above (on the horizontal plane).

The front wheel side slip angle $\beta f\_act$ may be detected or estimated on each of the front wheels W1 and W2; alternatively, however, the detection or the estimation may be performed by representatively defining the side slip angle of one of the front wheels W1 and W2 as $\beta f\_act$, or the detection or the estimation may be performed by defining a mean value of the side slip angles of both as $\beta f\_act$. The same applies to the rear wheel side slip angle $\beta r\_act$.

Further, the estimation targets of the sensor/estimator 12 include a coefficient of friction between the wheels W1 to W4 of the actual vehicle 1 and an actual road surface in contact therewith (hereinafter, an estimated value of the friction coefficient will be referred to as the estimated friction coefficient $\mu estm$). Preferably, the processing for estimating a friction coefficient includes filtering of low-pass characteristics so as to restrain frequent fluctuation in the estimated friction coefficient $\mu estm$. In the present embodiment, the estimated friction coefficient $\mu estm$ is an estimated value of, for example, a representative value or a mean value of the coefficient of the friction between the wheels W1 to W4 and a road surface. Alternatively, however, the estimated friction coefficient $\mu estm$ may be determined for each of the wheels W1 to W4 or the estimated values of the estimated friction coefficient $\mu estm$ may be determined separately on the pair of the front wheels W1, W2 and the pair of the rear wheels W3, W4, or separately on the pair of the front wheel W1 and the rear wheel W3 on the left side and the pair of the front wheel W2 and the rear wheel W4 on the right side.

The sensor/estimator 12 is equipped with various sensors mounted on the actual vehicle 1 to detect or estimate the above-mentioned detection targets or estimation targets. The sensors include, for example, a rate sensor for detecting angular velocities of the actual vehicle 1, an acceleration sensor for detecting accelerations in the longitudinal direction and the lateral direction of the actual vehicle 1, a velocity sensor for detecting the traveling velocity (ground speed) of the actual vehicle 1, a rotational velocity sensor for detecting the rotational velocities of the wheels W1 to W4 of the actual vehicle 1, and a force sensor for detecting road surface reaction forces acting on the wheels W1 to W4 of the actual vehicle 1 from a road surface.

In this case, for an estimation target that cannot be directly detected by a sensor installed in the actual vehicle 1 among the detection targets or the estimation targets, the sensor/estimator 12 estimates the estimation target by an observer or the like on the basis of a detection value of a state amount related to the estimation target or the value of an actuator manipulated variable determined by the controller 10 or a target value defining it. For instance, the vehicle center-of-gravity point side slip angle tact is estimated on the basis of mainly a detection value of the acceleration sensor installed in the actual vehicle 1. Further, for example, the friction coefficient is estimated by a publicly known method on the basis of mainly a detection value of the acceleration sensor.

Supplementally, the sensor/estimator 12 has a function as an actual state amount grasping means in the present invention. In the present embodiment, the type of a first state amount related to vehicle motions uses a vehicle yaw rate and a vehicle center-of-gravity point side slip angle. In this case, the yaw rate has a meaning as a state amount related to the rotational motions in the yaw direction of the vehicle, and the vehicle center-of-gravity point side slip angle has a meaning as a state amount related to the lateral translational motions of the vehicle. Further, the yaw rate γact and the vehicle center-of-gravity point side slip angle βact are detected or estimated by the sensor/estimator 12 as a first actual state amount in the present invention.

Further, the sensor/estimator 12 functions also as a friction characteristic estimating means in the present invention by a function for estimating a frictional coefficient (determining μestm). In addition, the sensor/estimator 12 functions also as an actual side slip angle grasping means in the present invention by a function for detecting or estimating a front wheel side slip angle βf_act and a rear wheel side slip angle βr_act.

Hereinafter, the designations of the state amounts or the like of the actual vehicle 1 to be detected or estimated by the sensor/estimator 12 will be frequently accompanied by "actual." For instance, the yaw rate γact of the actual vehicle 1, the traveling velocity Vact of the actual vehicle 1, and the vehicle center-of-gravity point side slip angle βact of the actual vehicle 1 will be referred to as the actual yaw rate γact, the actual traveling velocity Vact, and the actual vehicle center-of-gravity point side slip angle βact, respectively.

Subsequently, the controller 10 determines, by a reference manipulated variable determiner 14, a reference model manipulated variable as an input to a reference dynamic characteristics model 16, which will be discussed later. In this case, the reference manipulated variable determiner 14 receives a drive operation input detected by a sensor of the manipulating devices 5 and determines the reference model manipulated variable on the basis of at least the drive operation input.

More specifically, in the present embodiment, the reference model manipulated variable determined by the reference manipulated variable determiner 14 is the steering angle of the front wheels of a vehicle on a reference dynamic characteristics model 16, which will be discussed later, (hereinafter referred to as the model front wheel steering angle). To determine the model front wheel steering angle, a steering angle θh (current time value) of the drive operation input is input as a main input amount to the reference manipulated variable determiner 14. At the same time, the actual traveling velocity Vact (current time value) and the estimated friction coefficient βestm (current time value) detected or estimated by the sensor/estimator 12, and a state amount (last time value) of the vehicle on the reference dynamic characteristics model 16 are input to the reference manipulated variable determiner 14. Further, the reference manipulated variable determiner 14 determines the model front wheel steering angle on the basis of these inputs. Basically, the model front wheel steering angle may be determined on the basis of the steering angle θh. In the present embodiment, however, a predetermined restriction is placed on the model front wheel steering angles input to the reference dynamic characteristics model 16. To place the restriction, Vact, μestm and the like in addition to the steering angle θh are supplied to the reference manipulated variable determiner 14.

Supplementally, the type of reference model manipulated variable generally depends on the form of the reference dynamic characteristics model 16 or the type of state amount to be determined by the reference dynamic characteristics model 16. The reference dynamic characteristics model 16 may include the reference manipulated variable determiner 14. If the reference dynamic characteristics model 16 is constructed to require a drive operation input itself, then the reference manipulated variable determiner 14 may be omitted.

Subsequently, the controller 10 determines and outputs a reference state amount, which is the state amount of a reference motion of the actual vehicle 1 (hereinafter referred to as the reference motion), by the reference dynamic characteristics model 16. The reference dynamic characteristics model 16 is a model which is established beforehand and which represents dynamic characteristics of a vehicle, and it sequentially determines a state amount of a reference motion (a reference state amount) on the basis of predetermined inputs, including the reference model manipulated variable mentioned above. The reference motion basically means an ideal motion or a motion close thereto of the actual vehicle 1 which is considered desirable to a driver.

In this case, the reference dynamic characteristics model 16 receives mainly the reference model manipulated variable determined by the reference manipulated variable determiner 14 and control inputs (feedback control inputs) Mvir and Fvir for operating the reference dynamic characteristics model 16 determined by an FB distribution law 20, which will be discussed later, and determines a reference motion (eventually the time series of a reference state amount) on the basis of the inputs.

More specifically, in the present embodiment, a reference state amount determined and output by the reference dynamic characteristics model 16 is composed of a set of a reference state amount related to a rotational motion in the yaw direction of a vehicle and a reference state amount related to a translational motion in the lateral direction of a vehicle. A reference state amount related to the rotational motion in the yaw direction of the vehicle is, for example, a yaw rate reference value γd (hereinafter referred to as the reference yaw rate γd in some cases) and the reference state amount related to the translational motion in the lateral direction of the vehicle is, for example, a vehicle center-of-gravity point side slip angle reference value βd (hereinafter referred to as the reference vehicle center-of-gravity point side slip angle βd in some cases). To sequentially determine these reference state amounts γd and βd at each control processing cycle, the model front wheel steering angle (current time value) and the feedback control inputs Mvir and Fvir (last time values) as reference model manipulated variables are supplied. In this case, according to the present embodiment, the traveling velocity of the vehicle on the reference dynamic characteristics model 16 is set to agree with the actual traveling velocity Vact. Thus, the actual traveling velocity Vact (current time value) detected or estimated by the sensor/estimator 12 is also supplied to the reference dynamic characteristics model 16. Then, based on these inputs, the reference dynamic characteristics model 16 determines the yaw rate and the vehicle center-of-gravity point side slip angle of the vehicle on the reference dynamic characteristics model 16 and outputs the determined results as the reference state amounts γd and βd.

Incidentally, the feedback control inputs Mvir and Fvir supplied to the reference dynamic characteristics model 16 are feedback control inputs additionally supplied to the reference dynamic characteristics model 16 in order to restrain alienation (separation) between a motion of the actual vehicle 1 and a reference motion (or approximating a reference motion to a motion of the actual vehicle 1) due to, for example, a change in a traveling environment (such as a road surface condition) of the actual vehicle 1 (a change not considered in the reference dynamic characteristics model 16) a modeling error in the reference dynamic characteristics model 16, or a detection error or an estimation error of the sensor/estimator 12. In the present embodiment, the feedback control inputs Mvir and Fvir are virtual external forces virtually applied to the vehicle on the reference dynamic characteristics model 16. Mvir of the virtual external forces Mvir and Fvir denotes a virtual moment in the yaw direction which is to act about the center-of-gravity point of the vehicle 1 on the reference dynamic characteristics model 16, and Fvir denotes a virtual translational force in the lateral direction which is to act on the center-of-gravity point.

Supplementally, the reference state amounts $\gamma d$ and $\beta d$ correspond to the first model state amount in the present invention, and the reference dynamic characteristics model 16 corresponds to a vehicle model in the present invention. Further, the processing by the reference manipulated variable determiner 14 and the reference dynamic characteristics model 16 constitutes the model state amount determining means in the present invention.

Subsequently, the controller 10 calculates, by a subtracter 18, a state amount error, which is the difference between the actual state amount (the same type of an actual state amount as a reference state amount) detected or estimated by the sensor/estimator 12 and the reference state amount determined by the reference dynamic characteristics model 16.

More specifically, the subtracter 18 determines, as state amount errors, the differences $\gamma err(=\gamma act-\gamma d)$ and $\beta err (=\beta act-\gamma d)$ between the values (current time values) of the actual yaw rate $\gamma act$ and the actual vehicle center-of-gravity point side slip angle $\beta act$ and the values (current time values) of the reference yaw rate $\gamma d$ and the reference vehicle center-of-gravity point side slip angle $\beta d$ determined by the reference dynamic characteristics model 16.

Supplementally, the processing by the subtracter 18 constitutes the state amount error calculating means in the present invention. Further, the state amount errors $\gamma err$ and $\beta err$ determined by the subtracter 18 correspond to the first state amount errors in the present invention.

Subsequently, the controller 10 supplies the state amount errors $\gamma err$ and $\beta err$ determined as described above to the FB distribution law 20. The FB distribution law 20 determines the virtual external forces Mvir and Fvir, which are feedback control inputs for manipulating the reference dynamic characteristics model 16 and an actuator operation feedback target value (actuator operation FB target value), which is a feedback control input for manipulating the actuator devices 3 of the actual vehicle 1.

In the present embodiment, the actuator operation FB target value includes a feedback control input related to the operation of the braking device of the driving/braking device 3A (more specifically, a feedback control input for manipulating a driving/braking force to be applied to the wheels W1 to W4 by operating the braking device). Alternatively, the actuator operation FB target value includes a feedback control input related to the operation of the steering device 3B (more specifically, a feedback control input for manipulating the lateral forces of the front wheels W1 and W2 by operating the steering device 3B) in addition to a feedback control input related to the operation of the driving/braking device 3A. The actuator operation FB target value is, in other words, a feedback control input for manipulating (correcting) a road surface reaction force, which is an external force to be applied to the actual vehicle 1.

The FB distribution law 20 basically determines the virtual external forces Mvir and Fvir and the actuator operation FB target value such that the received state amount errors $\gamma err$ and $\beta err$ are approximated to zero. However, when determining the virtual external forces Mvir and Fvir, the FB distribution law 20 determines the virtual external forces Mvir and Fvir such that not only the state amount errors $\gamma err$ and $\beta err$ are approximated to zero but the deviation of a predetermined restriction object amount of the actual vehicle 1 or the vehicle on the reference dynamic characteristics model 16 from a predetermined permissible range is restrained. Further, the FB distribution law 20 determines, as the actuator operation FB target value, a feedback control input related to the operation of the braking device of the driving/braking device 3A or a feedback control input related to the above feedback control input and the operation of the steering device 3B such that a predetermined moment in the yaw direction for approximating the state amount errors $\gamma err$ and $\beta err$ to zero is generated about the center-of-gravity point of the actual vehicle 1 (more generally, such that a predetermined external force (road surface reaction force) for approximating the state amount errors $\gamma err$ and $\beta err$ to zero acts on the actual vehicle 1).

To determine the virtual external forces Mvir, Fvir and the actuator operation FB target value, the FB distribution law 20 receives not only the state amount errors $\gamma err$ and $\beta err$ but also at least one of the reference state amounts $\gamma d$ and $\beta d$, which are outputs of the reference dynamic characteristics model 16, and the actual state amounts $\gamma act$ and $\beta act$ detected or estimated by the sensor/estimator 12. Furthermore, the FB distribution law 20 also receives actual state amounts, such as the actual traveling velocity Vact, the actual front wheel side slip angle $\beta f\_act$, and the actual rear wheel side slip angle $\beta r\_act$, detected or estimated by the sensor/estimator 12. Then, based on these inputs, the FB distribution law 20 determines the virtual external forces Mvir, Fvir and the actuator operation FB target value.

Supplementally, the virtual external forces Mvir and Fvir correspond to the vehicle model operation control inputs in the present invention, and the actuator operation FB target value includes a feedback control input in the present invention.

Meanwhile, in parallel to the control processing (or by time-sharing processing) by the reference manipulated variable determiner 14, the reference dynamic characteristics model 16, the subtracter 18, and the FB distribution law 20 explained above, the controller 10 supplies the aforesaid drive operation inputs to an FE law 22 to determine an actuator operation FF target value, which is a feedforward target value (basic target value) of the operation of the actuator devices 3, by the FF law 22.

In the present embodiment, the actuator operation FF target value includes the feedforward target values related to the driving/braking forces of the wheels W1 to W4 of the actual vehicle 1 by the operation of the braking device of the driving/braking device 3A, the feedforward target values related to the driving/braking forces of the driving wheels W1 and W2 of the actual vehicle 1 by the operation of the driving system of the driving/braking device 3A, the feedforward target values related to the reduction gear ratio (change gear ratio) of the transmission of the driving/braking device 3A, and the feedforward target values related to the steering angles of the steering control wheels W1 and W2 of the actual vehicle 1 by the steering device 3B.

To determine these actuator operation FF target values, the FF law 22 receives the drive operation input and also receives the actual state amount (the actual traveling velocity Vact or the like) detected or estimated by the sensor/estimator 12. Then, based on these inputs, the FF law 22 determines the actuator operation FF target value. The actuator operation F target value is an operation target value of the actuator devices 3 which is determined without depending on the state amount errors $\gamma err$ and $\beta err$ (the first state amount errors). Further, the actuator operation FF target value includes a feedforward control input in the present invention.

Supplementally, if the suspension device 3C is an active suspension device, then the actuator operation FF target value generally includes a feedforward target value related to an operation of the suspension device 3C.

Subsequently, the controller 10 inputs the actuator operation FF target value (the current time value) determined by the FF law 22 and the actuator operation FB target value (the current time value) determined by the FB distribution law 20 to the actuator operation target value synthesizer 24. Then, the controller 10 synthesizes the actuator operation FF target value and the actuator operation FB target value by the actuator operation target value synthesizer 24 to determine the actuator operation target value, which is a target value defining the operation of the actuator devices 3.

According to the present embodiment, the actuator operation target values include a target value of the driving/braking forces of the wheels W1 to W4 of the actual vehicle 1 (a target value of the total driving/braking force by the operations of the driving system of the driving/braking device 3A and the braking device), a target value of a slip ratio of the wheels W1 to W4 of the actual vehicle 1, a target value of a steering angle of the steering control wheels W1 and W2 of the actual vehicle 1 by the steering device 3B, a target value of the driving/braking force of the driving wheels W1 and W2 of the actual vehicle 1 by the operation of the driving system of the driving/braking device 3A, and a target value of a reduction gear ratio of the transmission of the driving/braking device 3A.

To determine these actuator operation target values, the actuator operation target value synthesizer 24 receives not only the actuator operation FF target value and the actuator operation FB target value but also the actual state amounts (the actual side slip angle βf_act of the front wheels W1, W2 and the estimated friction coefficient μestm, etc.) detected or estimated by the sensor/estimator 12. Then, based on these inputs, the actuator operation target value synthesizer 24 determines the actuator operation target value.

Supplementally, the actuator operation target value is not limited to the types of target values described above. For example, in place of the target values, the target values of the actuator manipulated variables of the actuator devices 3 that are associated with the aforesaid target values may be determined. Basically, the actuator operation target values may take any values as long as they make it possible to define the operations of the actuator devices. For instance, as the actuator operation target value related to an operation of the braking device, the target value of a braking pressure may be determined or the target value of the actuator manipulated variable of the braking device associated therewith may be determined.

Incidentally, an actuator operation FB target value determiner 20b of the FB distribution law 20, which will be discussed later, the FF law 22, and the actuator operation target value synthesizer 24 constitute the actual vehicle actuator operation control input determining means in the present invention.

Subsequently, the controller 10 inputs the actuator operation target value, which has been determined by the actuator operation target value synthesizer 24, into the actuator drive control unit 26, and determines the actuator manipulated variable of each of the actuator devices 3 of the actual vehicle 1 by the actuator drive control unit 26. Then, the actuator of each of the actuator devices 3 of the actual vehicle 1 is controlled on the basis of the determined actuator manipulated variable.

In this case, the actuator drive control unit 26 determines the actuator manipulated variable such that the input actuator operation target value is satisfied or in exact accordance with the actuator operation target value. Further, for this determination, the actuator drive control unit 26 further receives the actual state amounts of the actual vehicle 1 detected or estimated by the sensor/estimator 12 in addition to the actuator operation target value. Among the control functions of the actuator drive control unit 26, the control function related to the braking device of the driving/braking device 3A desirably incorporates a so-called antilock braking system.

The above has provided an overview of the control processing for each control processing cycle of the controller 10.

The order of the processing of each control processing function section of the controller 10 may be changed, as necessary. For example, the processing by the sensor/estimator 12 may be executed at the end of each control processing cycle and a detected value or an estimated value obtained thereby may be used for the processing of the next control processing cycle.

More detailed processing of the control processing function section of the controller 10 in the present embodiment will now be explained.

[About a Reference Dynamic Characteristics Model]

First, the reference dynamic characteristics model 16 in the present embodiment will be explained by referring to FIG. 3. FIG. 3 is a diagram illustrating the construction of a vehicle on the reference dynamic characteristics model 16 in the present embodiment. This reference dynamic characteristics model 16 is a model which expresses the dynamic characteristics of a vehicle in terms of the dynamic characteristics (kinetic characteristics) on a horizontal plane of a vehicle equipped with one front wheel Wf and one rear wheel Wr at the front and the back (a so-called two-wheeled model). Hereinafter, the vehicle on the reference dynamic characteristics model 16 (the vehicle corresponding to the actual vehicle 1 on the reference dynamic characteristics model 16) will be referred to as the model vehicle. The front wheel Wf of the model vehicle corresponds to a wheel that combines the two front wheels W1 and W2 of the actual vehicle 1 into one piece and provides the steering control wheel of the model vehicle. The rear wheel Wr corresponds to a wheel that combines the rear wheels W3 and W4 of the actual vehicle 1 into one piece and provides a non-steering control wheel in the present embodiment.

An angle βd formed with respect to the longitudinal direction of the model vehicle by the velocity vector Vd on the horizontal plane of a center-of-gravity point Gd of the model vehicle (i.e., a vehicle center-of-gravity point side slip angle βd of the model vehicle) and the angular velocity γd about the vertical axis of the model vehicle (i.e., the yaw rate γd of the model vehicle) are the reference state amounts sequentially determined by the reference dynamic characteristics model 16 as the reference vehicle center-of-gravity point side slip angle and the reference yaw rate, respectively. Further, an angle βf_d formed with respect to the longitudinal direction of the model vehicle by a line of intersection of the rotational plane of the front wheel Wf of the model vehicle and the horizontal plane is the reference model manipulated variable input to the reference dynamic characteristics model 16 as the model front wheel steering angle. Further, a translational force Fvir in the lateral direction additionally applied to the center-of-gravity point Gd of the model vehicle (in the lateral direction of the model vehicle) and a moment Mvir in the yaw direction (about the vertical axis) additionally applied about the center-of-gravity point Gd of the model vehicle are the feedback control inputs supplied as the virtual external forces to the reference dynamic characteristics model 16.

In FIG. 3, Vf_d denotes an advancing velocity vector of the front wheel Wf of the model vehicle on the horizontal plane, Vr_d denotes an advancing velocity vector of the rear wheel Wr of the model vehicle on the horizontal plane, βf_d denotes a side slip angle of the front wheel Wf (an angle formed with respect to the longitudinal direction of the front wheel Wf (the direction of the line of intersection of the rotational plane of the front wheel Wf and the horizontal plane) by the advancing velocity vector Vf_d of the front wheel Wf. Hereinafter referred to as the front wheel side slip angle βf_d), βr_d denotes a side slip angle of the rear wheel Wr (an angle formed with respect to the longitudinal direction of the rear wheel Wr (the direction of the line of intersection of the rotational plane of the rear wheel Wr and the horizontal plane) by the advancing velocity vector Vr_d of the rear wheel Wr. Hereinafter referred to as the rear wheel side slip angle βr_d), and βf0 denotes an angle formed with respect to the longitudinal direction of the model vehicle by the advancing velocity vector Vf_d of the front wheel Wf of the model vehicle (hereinafter referred to as the vehicle front wheel position side slip angle).

Supplementally, according to the embodiments in the present description, regarding a side slip angle of a vehicle or a wheel, a steering angle of a wheel, a yaw rate of the vehicle and a moment in the yaw direction, the counterclockwise direction as observed from above the vehicle is defined as the positive direction. Further, of the virtual external forces Mvir and Fvir, the translational force Fvir defines the leftward direction of the vehicle as the positive direction. For a driving/braking force of a wheel, the direction of a force for accelerating the vehicle forward in the direction of the line of intersection of the rotational plane of a wheel and a road surface or a horizontal plane (road surface reaction force) is defined as the positive direction. In other words, a driving/braking force in the direction that provides a driving force relative to the advancing direction of the vehicle takes a positive value, while a driving/braking force in the direction that provides a braking force relative to the advancing direction of the vehicle takes a negative value.

Specifically, the dynamic characteristics (the dynamic characteristics in a continuous system) of the model vehicle are represented by expression 01 given below. The formula excluding the third term (the term including Fvir and Mvir) of the right side of this expression 01 is equivalent to, for example, the publicly known expressions (3.12), (3.13) shown in the publicly known document titled "Motion and Control of Automobile" (written by Masato Abe; published by Sankaido Co., Ltd.; and 2nd printing, 2nd edition published on Jul. 23, 2004: hereinafter referred to as non-patent document 1).

[Mathematical Expression 1]

$$\frac{d}{dt}\begin{bmatrix}\beta d\\ \gamma d\end{bmatrix}=\begin{bmatrix}a11 & a12\\ a21 & a22\end{bmatrix}\cdot\begin{bmatrix}\beta d\\ \gamma d\end{bmatrix}+\begin{bmatrix}b1\\ b2\end{bmatrix}\cdot\delta f\_d+\begin{bmatrix}b11 & 0\\ 0 & b22\end{bmatrix}\cdot\begin{bmatrix}Fvir\\ Mvir\end{bmatrix}$$ Expression 01 where $$a11=-\frac{2\cdot(Kf+Kr)}{m\cdot Vd}$$

$$a12=-\frac{m\cdot Vd^2+2\cdot(Lf\cdot Kf-Lr\cdot Kr)}{m\cdot Vd^2}$$

$$a21=-\frac{2\cdot(Lf\cdot Kf-Lr\cdot Kr)}{I}$$

$$a22=-\frac{2\cdot(Lf^2\cdot Kf+Lr^2\cdot Kr)}{I\cdot Vd}$$

$$b1=\frac{2\cdot Kf}{m\cdot Vd}$$

$$b2=\frac{2\cdot Lf\cdot Kf}{I}$$

$$b11=\frac{1}{m\cdot Vd}$$

$$b22=\frac{1}{I}$$

In the note of the expression 01, m denotes the total mass of the model vehicle, Kf denotes the cornering power per wheel when the front wheel Wf of the model vehicle is regarded as a connected body of the two right and left front wheels, Kr denotes the cornering power per wheel when the rear wheel Wr of the model vehicle is regarded as a connected body of the two right and left rear wheels, Lf denotes the distance in the longitudinal direction between the center of the front wheel Wf of the model vehicle and the center-of-gravity point Gd (the distance in the longitudinal direction between the rotational axis of the front wheel Wf and the center-of-gravity point Gd when the steering angle of the front wheel Wf is zero. Refer to FIG. 3), Lr denotes the distance in the longitudinal direction between the center of the rear wheel Wr of the model vehicle and the center-of-gravity point Gd (the distance in the longitudinal direction between the rotational axis of the rear wheel Wr and the center-of-gravity point Gd. Refer to FIG. 3), and I denotes the inertia (inertial moment) about the yaw axis at the center-of-gravity point Gd of the model vehicle. These parameter values are preset values. In this case, for example, m, I, Lf and Lr are set to the same or substantially the same values thereof in the actual vehicle 1. Further, Kf and Kr are set by considering the characteristics of the tires (or the characteristics required of the tires) of the front wheels W1, W2 and the rear wheels W3, W4, respectively, of the actual vehicle 1. Depending on the setting of the values of Kf and Kr (more generally, the values of a11, a12, a21, and a22), the steering characteristics, such as under-steering, over-steering, and neutral steering, can be set. Further, the values of m, I, Kf, and Kr in the actual vehicle 1 may be identified during a travel of the actual vehicle 1 and the identified values may be used as the values of m, I, Kf, and Kr of the model vehicle.

Supplementally, the relationship among βf0, βd, βf_d, βr_d, γd, and δf_d of the model vehicle is represented by expressions 02a, 02b, and 02c given below.

$$\beta f\_d=\beta d+Lf\cdot\gamma d/Vd-\delta f\_d$$ Expression 02a $$\beta r\_d=\beta d-Lr\cdot\gamma d/Vd$$ Expression 02b $$\beta f0=\beta f\_d+\delta f\_d=\beta d+Lf\cdot\gamma d/Vd$$ Expression 02c Further, as shown in FIG. 3, if the cornering force of the front wheel Wf of the model vehicle (≈a lateral force of the front wheel Wf) is denoted by Ffy_d and the cornering force of the rear wheel Wr of the model vehicle (≈a lateral force of the rear wheel Wr) is denoted by Fry_d, then the relationship between Ffy_d and βf_d and the relationship between Fry_d and βr_d are represented by expressions 03a and 03b shown below.

$$Ffy\_d=-2\cdot Kf\cdot\beta f\_d$$ Expression 03a $$Fry\_d=-2\cdot Kr\cdot\beta r\_d$$ Expression 03b In the processing by the reference dynamic characteristics model 16 in the present embodiment, δf_d, Fvir, and Mvir in expression 01 given above are used as inputs and the arithmetic processing of expression 01 (specifically, the arithmetic processing of an expression obtained by representing expression 01 in terms of a discrete-time system) is sequentially carried out at a control processing cycle of the controller 10, thereby sequentially calculating βd and γd in a time series manner. In this case, at each control processing cycle, a latest value (a current time value) of the actual traveling velocity Vact detected or estimated by the sensor/estimator 12 is used as the value of the traveling velocity Vd of the model vehicle. In other words, the traveling velocity Vd of the model vehicle is always made to agree with the actual traveling velocity Vact. As the values of Fvir and Mvir, the latest values (last time values) of the virtual external forces determined as will be discussed later by the FB distribution law 20 are used. As the value of δf_d, a latest value (a current time value) of a model front wheel steering angle determined as will be discussed by the reference manipulated variable determiner 14 is used. In addition, the last time values of βd and γd are also used to calculate new βd and γd (current time values).

Supplementally, the dynamic characteristics of the model vehicle may, more generally, be represented by expression (4) shown below.

[Mathematical expression 2]

$$\frac{d}{dt}\begin{bmatrix} \beta d \\ \gamma d \end{bmatrix} = \begin{bmatrix} f1(\gamma d, \beta d, \delta f\_d) \\ f2(\gamma d, \beta d, \delta f\_d) \end{bmatrix} + \begin{bmatrix} b11 & 0 \\ 0 & b22 \end{bmatrix} \cdot \begin{bmatrix} Fvir \\ Mvir \end{bmatrix} \quad \text{Expression 04}$$

wherein f1(γd, βd, δf_d) and f2(γd, βd, δf_d) are functions of γd, βd, and δf_d, respectively. The above expression 01 is an example of the case where the values of the functions f1 and f2 are represented in terms of linear coupling (primary coupling) of γd, βd, and δf_d. The functions f1 and f2 do not have to be the functions represented by mathematical expressions, and the function values thereof may be functions determined by a map from the values of γd, βd, and δf_d.

The behavior characteristics of the actual vehicle 1 in the present embodiment show behavior characteristics somewhere between the open characteristics of the actual vehicle 1 when the present invention is not applied (the behavior characteristics of the actual vehicle 1 when the actuator FB operation target value is steadily maintained at zero) and the behavior characteristics of the reference dynamic characteristics model 16 when the virtual external forces Mvir and Fvir are steadily maintained at zero. Therefore, in general, the reference dynamic characteristics model 16 is desirably set to a model that illustrates a response behavior which a driver considers more preferable than the open characteristics of the actual vehicle 1. To be more specific, the reference dynamic characteristics model 16 is desirably set to be a model having higher linearity than that in the actual vehicle 1. For example, it is desirable to set the reference dynamic characteristics model 16 such that the relationship between the side slip angle or the slip ratio of a wheel of the model vehicle and a road surface reaction force acting on the wheel from the road surface (a lateral force or a driving/braking force) is a linear relationship or a relationship close thereto. The reference dynamic characteristics model 16 representing dynamic characteristics by the expression 01 is one example of the model that satisfies these requirements.

However, the reference dynamic characteristics model 16 may have a characteristic in which a road surface reaction force acting on the wheels Wf and Wr of the model vehicle saturates in response to a change in a side slip angle or a slip ratio. For instance, the values of the cornering powers Kf and Kr are set on the basis of the front wheel side slip angle βf_d and the rear wheel side slip angle βr_d rather than setting them at constant values. And, at this time, the value of Kf is set on the basis of βf_d such that the lateral force Ffy_d of the front wheel Wf generated on the basis of f_d (refer to the expression 03a) saturates as βf_d increases when the absolute value of the front wheel side slip angle βf_d has increased to a certain degree. Similarly, the value of Kr is set on the basis of βr_d such that the lateral force Fry_d of the rear wheel Wr generated on the basis of βr_d (refer to the expression 03b) saturates as βr_d increases when the absolute value of the rear wheel side slip angle βr_d has increased to a certain degree. This causes the lateral forces Ffy_d and Fry_d acting on the wheels Wf and Wr of the model vehicle to have the saturation characteristic relative to the side slip angle βf_d or βr_d.

[About the Reference Manipulated Variable Determiner]

The details of the processing by the reference manipulated variable determiner 14 will now be explained with reference to FIG. 4 and FIG. 5. FIG. 4 is a functional block diagram illustrating the details of the processing function of the reference manipulated variable determiner 14, and FIG. 5 is a graph for explaining the processing by an excessive centrifugal force prevention limiter 14f provided in the reference manipulated variable determiner 14.

Referring to FIG. 4, the reference manipulated variable determiner 14 first determines, in a processor 14a, an unlimited front wheel steering angle δf_unltd by dividing a steering angle θh (a current time value) in the drive operation inputs, which are to be supplied, by an overall steering ratio "is". This unlimited front wheel steering angle δf_unltd has a meaning as a basic required value of a model front wheel steering angle δf_d based on the steering angle θh.

Here, the overall steering ratio "is" is the ratio between the steering angle θh and the steering angle of the front wheel Wf of the model vehicle, and it is set on the basis of, for example, the relationship between the steering angle θh of the actual vehicle 1 and the feedforward value of the steering angle of the front wheels W1 and W2 of the actual vehicle 1 associated therewith.

The overall steering ratio "is" may be variably set on the basis of the traveling velocity Vact of the actual vehicle 1 detected or estimated by the sensor/estimator 12 rather than setting it at a constant value (a fixed value). In this case, it is desirable to set the "is" such that the overall steering ratio "is" increases as the traveling velocity Vact of the actual vehicle 1 increases.

Subsequently, the vehicle front wheel position side slip angle βf0 of the model vehicle on the reference dynamic characteristics model 16 is determined by a βf0 calculator 14b. The βf0 calculator 14b receives the last time values of the reference yaw rate γd and the reference vehicle center-of-gravity point side slip angle βd determined by the reference dynamic characteristics model 16. From these values, the last time value of βf0 is determined by calculating the expression 02c (calculating the right side of the second equal sign of expression 02c). Thus, βf0 calculated by the βf0 calculator 14b takes the value of the vehicle front wheel position side slip angle βf0 of the model vehicle at the last time control processing cycle.

Alternatively, the last time value of the front wheel side slip angle βf_d of the model vehicle may be determined by the calculation of the expression 02a from the last time values of γd and βd, the last time value of the model front wheel steering angle δf_d determined by the reference manipulated variable determiner 14, and the last time value of the actual traveling velocity Vact, then the last time value of the model front wheel steering angle δf_d determined by the reference manipulated variable determiner 14 may be added to the determined βf_d (calculating the right side of the first equal sign of expression 02c) thereby to determine βf0. Alternatively, at each control processing cycle, the calculation of βf0 may be carried out by the processing performed by the reference dynamic characteristics model 16, and the last time value of the calculated βf0 may be input to the reference manipulated variable determiner 14. In this case, the arithmetic processing by the βf0 calculator 14b in the reference manipulated variable determiner 14 is unnecessary.

Subsequently, the unlimited front wheel steering angle δf_unltd is subtracted by a subtracter 14c from the vehicle front wheel position side slip angle βf0 determined as described above, thereby determining the unlimited front wheel side slip angle. The unlimited front wheel side slip angle means an instantaneous predicted value of the front wheel side slip angle βf_d of the model vehicle generated if it is assumed that the model front wheel steering angle δf_d of the model vehicle is instantaneously controlled to the unlimited front wheel steering angle δf_unltd (current time value) from the last time value.

Subsequently, the reference manipulated variable determiner 14 passes the unlimited front wheel side slip angle through a front wheel side slip angle limiter 14d to determine a limited front wheel side slip angle. The graph of the front wheel side slip angle limiter 14d shown in the figure is a graph illustrating the relationship between an unlimited front wheel side slip angle and a limited front wheel side slip angle, the values in the direction of the axis of abscissas related to the graph indicating the values of the unlimited front wheel side slip angles while the values in the direction of the axis of ordinates indicating the values of the limited front wheel side slip angles.

The front wheel side slip angle limiter 14d is a limiter for restraining the magnitude of the front wheel side slip angle βf_d of the model vehicle from becoming excessive (furthermore, for preventing the lateral forces of the front wheels W1 and W2 required for the actual vehicle 1 from becoming excessive).

In the present embodiment, the front wheel side slip angle limiter 14d sets the permissible range of the front wheel side slip angle βf_d (more specifically, the upper limit value βf_max(>0) and the lower limit value βf_min(<0) of the permissible range) on the basis of the estimated friction coefficient μestm (current time value) and the actual traveling velocity Vact (current time value) input from the sensor/estimator 12 into the reference manipulated variable determiner 14. In this case, basically, the permissible range is set such that the permissible range [βf_min, βf_max] is narrower (βf_max and βf_min are brought more closely to zero) as the estimated friction coefficient μestm is smaller or the actual traveling velocity Vact is higher. At this time, the permissible range [βf_min, βf_max] is set in the range of the values of side slip angle that maintains the relationship between, for example, the side slip angle and the lateral force of the front wheels W1 and W2 of the actual vehicle 1 or the cornering force at a substantially linear relationship (a proportional relationship).

The permissible range [βf_min, βf_max] may be set on the basis of either μestm or Vact, or may be set to a pre-fixed permissible range independently of μestm and Vact.

And, if the value of the received unlimited front wheel side slip angle is within the permissible range [βf_min, βf_max] set as described above (if βf_min≦Unlimited front wheel side slip angle ≦βf_max), then the front wheel side slip angle limiter 14d directly outputs the value of the unlimited front wheel side slip angle as the limited front wheel side slip angle. If the value of the received unlimited front wheel side slip angle deviates from the permissible range, then the front wheel side slip angle limiter 14d outputs the lower limit value βf_min or the upper limit value βf_max of the permissible range [βf_min, βf_max] as the limited front wheel side slip angle. To be more specific, if the unlimited front wheel side slip angle >βf_max, then the βf_max is output as the limited front wheel side slip angle. If the unlimited front wheel side slip angle <βf_min, then the βf_min is output as the limited front wheel side slip angle. Thus, the limited front wheel side slip angle is determined such that it agrees with an unlimited front wheel side slip angle or takes a value that is closest to the unlimited front wheel side slip angle within the permissible range [f_min, βf_max].

Subsequently, the limited front wheel side slip angle determined as described above is subtracted by a subtracter 14e from the vehicle front wheel position side slip angle βf0 determined by the βf0 calculator 14b thereby to determine a first limited front wheel steering angle δf_ltd1. The first limited front wheel steering angle δf_ltd1 determined as described above has a meaning as a model front wheel steering angle δf_d obtained by restricting the unlimited front wheel steering angle δf_unltd such that the front wheel side slip angle βf_d of the model vehicle does not deviate from the permissible range [βf_min, βf_max].

Subsequently, the reference manipulated variable determiner 14 passes the first limited front wheel steering angle δf_ltd1 through the excessive centrifugal force prevention limiter 14f to determine a second limited front wheel steering angle f_ltd2. This δf_ltd2 is used as the value of the model front wheel steering angle δf_d to be input to the reference dynamic characteristics model 16. The graph of the excessive centrifugal force prevention limiter 14f shown in the figure is a graph illustrating the relationship between the first limited front wheel steering angle δf_ltd1 and the second limited front wheel steering angle δf_ltd2, the values in the direction of the axis of abscissas related to the graph indicating the values of δf_ltd1 while the values in the direction of the axis of ordinates indicating the values of δf_ltd2.

The excessive centrifugal force prevention limiter 14f is a limiter for restraining the centrifugal force generated in the model vehicle from becoming excessive (furthermore, for preventing the centrifugal force required for the actual vehicle 1 from becoming excessive).

In the present embodiment, the excessive centrifugal force prevention limiter 14f sets the permissible range of the model front wheel steering angle δf_d (more specifically, the upper limit value δf_max(>0) and the lower limit value δf_min(<0) of the permissible range) on the basis of the estimated friction coefficient μestm (current time value) and the actual traveling velocity Vact (current time value) input to the reference manipulated variable determiner 14. This permissible range [δf_min, δf_max] is the permissible range of the model front wheel steering angle δf_d that allows the model vehicle to make a normal circular turn without exceeding the limit of friction against a road surface when the virtual external forces Mvir and Fvir are steadily held at zero.

More specifically, first, a maximum yaw rate γmax (>0) at a normal circular turn, which is a yaw rate that satisfies expression 05 given below, is determined on the basis of the values (current time values) of Vact and μestm input to the reference manipulated variable determiner 14.

$$m \cdot \gamma max \cdot Vact = C1 \cdot \mu estm \cdot m \cdot g \qquad \text{Expression 05}$$

where m in expression 05 denotes the total mass of the model vehicle, as described above. Further, g denotes a gravitational acceleration and C1 denotes a positive coefficient of 1 or less. The left side of this expression 05 means a centrifugal force generated in the model vehicle (more specifically, a predicted convergence value of the centrifugal force) when the normal circular turn of the model vehicle is made while holding the yaw rate γd and the traveling velocity Vd of the model vehicle at γmax and Vact, respectively. Further, the value of the computation result of the right side of expression 05 indicates the value (≦the limit value) obtained by multiplying the limit value of the magnitude of a road surface reaction force determined on the basis of μestm (more specifically, a total frictional force that may be applied to the model vehicle from a road surface through the intermediary of the wheels Wf and Wr (the total sum of the translational force horizontal components of a road surface reaction force)) by the coefficient C1. Hence, the maximum yaw rate γmax at a normal circular turn is determined such that the centrifugal force generated in the model vehicle when the normal circular turn of the model vehicle is made while holding the virtual external forces Mvir and Fvir to be applied to the model vehicle at zero and the yaw rate γd and the traveling velocity Vd of the model vehicle at γmax and Vact, respectively, does not exceed the limit value of the total frictional force (the total sum of the translational force horizontal components of a road surface reaction force) which may be applied to the model vehicle on the basis of the estimated friction coefficient μestm.

Incidentally, the value of the coefficient C1 of expression 05 may be variably set on the basis of at least either one of μestm and Vact. In this case, preferably, the value of C1 is set to be smaller as μestm is smaller or as Vact is higher.

Subsequently, the value of the model front wheel steering angle δf_d associated with γmax at the normal circular turn of the model vehicle is determined as a limit steering angle at normal circular turn δf_max_c(>0). In the reference dynamic characteristics model 16 represented by the expression 01, the relationship of expression 06 given below holds between the yaw rate γd of the model vehicle at the normal circular turn and the model front wheel steering angle δf_d.

[Mathematical expression 3]

$$\gamma d = \frac{1}{1 - \frac{m}{2 \cdot L^2} \cdot \frac{Lf \cdot Kf - Lr \cdot Kr}{Kf \cdot Kr} \cdot Vd^2} \cdot \frac{Vd}{L} \cdot \delta f\_d \qquad \text{Expression 06}$$

where $L = Lf + Lr$

If Vd is sufficiently small (if it is possible to regard as $Vd^2 \approx 0$), then expression 06 can be approximately rewritten to the following expression 07.

$$\gamma d = (Vd/L) \cdot \delta f\_d \qquad \text{Expression 07}$$

Hence, in the present embodiment, the limit steering angle δf_max_c at normal circular turn associated with γmax is determined by making a solution on δf_d by taking the values of γd and Vd, respectively, in expression 06 or expression 07 as γmax and Vact.

The permissible range [δf_min, δf_max] of the model front wheel steering angle δf_d for preventing a centrifugal force generated in the model vehicle from becoming excessive may be basically set to a permissible range [−δf_max_c, δf_max_c]. In that case, however, the model front wheel steering angle δf_d may be subjected to unwanted restriction in a countersteering state of the actual vehicle 1 (a state wherein the front wheels W1 and W2 are steered in the direction of the opposite polarity from the polarity of the yaw rate of the actual vehicle 1).

In the present embodiment, therefore, δf_max_c and −δf_max_c are corrected according to expressions 08a and 08b given below on the basis of the yaw rates γd and γmax of the model vehicle thereby to set the upper limit value δf_max and the lower limit value δf_min of the permissible range of the model front wheel steering angle δf_d.

$$\delta f\_max = \delta f\_max\_c + fe(\gamma d, \gamma max) \qquad \text{Expression 08a}$$

$$\delta f\_min = -\delta f\_max\_c - fe(-\gamma d, -\gamma max) \qquad \text{Expression 08b}$$

fe(γd, γmax) and fe(−γd, −γmax) in expressions 08a and 08b are functions of γd and γmax, and the function values thereof are, for example, functions that vary according to the values of γd and γmax, as shown in the graphs of FIGS. 5(a) and (b). In this example, the value of the function fe(γd, γmax) takes a positive fixed value fex if γd takes a value of a predetermined value γ1, which is slightly larger than zero, or less (including a case where γd<0), as shown in the graph of FIG. 5(a). And, the value of fe (γd, γmax) monotonously decreases as γd increases if γd>γ1 and reaches zero by the time γd reaches γ2 (>γ1), which is a predetermined value of γmax or less. Further, the value of fe(γd, γmax) is maintained at zero if γd>γ2 (including the case where γd≧γmax).

Further, a function fe(−γd, −γmax) is a function obtained by reversing the polarities of the variables γd and γmax of the function fe (γd, γmax), so that the value of the function fe(−γd, −γmax) varies in relation to γd, as shown in the graph of FIG. 5(b). More specifically, if γd takes a value of a predetermined negative value γ1, which is slightly smaller than zero, or more (including the case where γd>0), then the function takes a positive fixed value fex. And, the value of fe(−γd, −γmax) monotonously decreases as γd decreases if γd<−γ1 and reaches zero by the time when γd reaches −γ2, which is a predetermined value of −γmax or more. Further, the value of fe(−γd, −γmax) is maintained at zero if γd<−γ2 (including the case where γd<−γmax).

As the value of γd required for determining the values of the functions fe(γd, γmax) and fe(γγd, −γmax), the last time value of the reference yaw rate γd determined by the reference dynamic characteristics model 16 may be used.

Further, the values γ1 and γ2 of γd at breakpoints of the graph of the function fe (γd, γmax) or the aforesaid positive fixed value fex may be variably changed according to the estimated friction coefficient μestm or the actual traveling velocity Vact.

The permissible range [δf_min, δf_max] of the model front wheel steering angle δf_d is set by correcting δf_max_c on the basis of the value of the function fe as described above, so that the magnitude (the absolute value) of the limit value δf_max or δf_min of the model front wheel steering angle δf_d in the direction opposite from the direction of γd is set to be larger than the limit steering angle δf_max_c at a normal circular turn associated with the limit of a centrifugal force generated in the model vehicle. This makes it possible to prevent the model front wheel steering angle δf_d from being subjected to unwanted restriction in the countersteering state of the actual vehicle 1. Incidentally, the permissible range [−δf_min, δf_max] narrows as the actual traveling velocity Vact increases or as the estimated friction coefficient μestm decreases.

After setting the permissible range of the model front wheel steering angle δf_d as described above, the excessive centrifugal force prevention limiter 14f directly outputs the value of δf_ltd1 as the second limited front wheel steering angle δf_ltd2 (=the model front wheel steering angle δf_d to be input to the reference dynamic characteristics model 16) if the received first limited front wheel steering angle δf_ltd1 takes a value within the permissible range [δf_min, δf_max] (if δf_min≦δf_ltd1≦δf_max). Further, if the value of the received δf_ltd1 deviates from the permissible range [δf_min, δf_max], then the excessive centrifugal force prevention limiter 14f outputs a value obtained by forcibly restricting the input value as the second limited front wheel steering angle δf_ltd2. To be more specific, if δf_ltd1>δf_max, then δf_max is output as the second limited front wheel steering angle δf_ltd_2, and if δf_ltd1<δf_min, then δf_min is output as the second limited front wheel steering angle δf_ltd2. Thus, δf_ltd2 is determined such that it agrees with the first limited front wheel steering angle δf_ltd1 or takes a value that is closest to the first limited front wheel steering angle δf_ltd1 within the permissible range [δf_min, δf_max].

In the reference dynamic characteristics model 16 represented by the expression 01, the relationship of expression 09 given below holds between βd and γd at a normal circular turn of the model vehicle.

[Mathematical expression 4]

$$\beta d = \left(1 - \frac{m}{2 \cdot L} \cdot \frac{Lf}{Lr \cdot Kr} \cdot Vd^2\right) \cdot \frac{Lr}{Vd} \cdot \gamma d \qquad \text{Expression 09}$$

If Vd is sufficiently small (if it is possible to regard as $Vd^2 \approx 0$), then expression 09 can be approximately rewritten to the following expression 10.

$$\beta d = (Lr/Vd) \cdot \gamma d \qquad \text{Expression 10}$$

Hence, the value of γd or γmax at the normal circular turn of the model vehicle can be converted into a value of βd (provided Vd=Vact) according to expression 09 or expression 10. Therefore, the permissible range of the model front wheel steering angle δf_d may be set on the basis of the value of the vehicle center-of-gravity point side slip angle βd associated with the yaw rates γd and γmax instead of setting the permissible range of the model front wheel steering angle δf_d on the basis of the values of the yaw rates γd and γmax as described above.

The above has presented the details of the processing by the reference manipulated variable determiner 14.

The processing by the reference manipulated variable determiner 14 explained above determines, at each control processing cycle, the second limited front wheel steering angle δf_ltd2 as the model front wheel steering angle δf_d to be input to the reference dynamic characteristics model 16 on the basis of the steering angle θh among drive operation inputs such that an instantaneous value of the front wheel side slip angle βf_d of the model vehicle on the reference dynamic characteristics model 16 does not become excessive and the centrifugal force generated in the model vehicle does not become excessive.

Supplementally, in the excessive centrifugal force prevention limiter 14*f*, limiting the model front wheel steering angle δf_d to be input to the reference dynamic characteristics model 16 as described above to prevent the centrifugal force generated in the model vehicle from becoming excessive is equivalent to limiting the model front wheel steering angle δf_d to prevent the vehicle center-of-gravity point side slip angle βd (or the rear wheel side slip angle βr_d) of the model vehicle from becoming excessive. Further, in general, a centrifugal force in the vehicle or a vehicle center-of-gravity point side slip angle (or a rear wheel side slip angle) is generated with a delay from a steering operation, so that the processing for limiting the model front wheel steering angle δf_d performed by the excessive centrifugal force prevention limiter 14*f* may be said to be the processing for limiting the model front wheel steering angle δf_d on the basis of a predicted convergence value of a centrifugal force of the vehicle or a vehicle center-of-gravity point side slip angle (or a rear wheel side slip angle). In contrast to this, the limiting processing by the front wheel side slip angle limiter 14*d* may be said to be the processing for limiting the model front wheel steering angle δf_d to prevent an instantaneous value of the front wheel side slip angle βf_d of the model vehicle from becoming excessive.

In the present embodiment, the function fe used to set the permissible range [δf_min, δf_max] by the excessive centrifugal force prevention limiter 14*f* has been set as shown in FIGS. 5(*a*) and (*b*) described above; however, it is not limited thereto.

For instance, the function fe(γd, γmax) may be set as shown by the solid-line graph in FIG. 6. In this example, the value of fe(γd, γmax) monotonously decreases as the value of γd increases (increases from a value on the negative side to a value on the positive side) and becomes zero when γd=γmax. At this time, the function fe(−γd, −γmax) will be as indicated by the dashed-line graph in FIG. 6. In this case, the upper limit value δf_max of the permissible range of the model front wheel steering angle δf_d determined by the expression 08a will be closer to zero than the limit steering angle δf_max_c at normal circular turn as γd increases when γd exceeds γmax. Similarly, the lower limit value δf_min of the permissible range of the model front wheel steering angle δf_d determined by the expression 08b will be closer to zero than −δf_max as γd decreases (as the magnitude increases) when γd exceeds −γmax onto the negative side.

Further, instead of the expressions 08a and 08b, the following expressions 11a and 11b may be used to set the upper limit value δf_max and the lower limit value δf_min of the permissible range of δf_d, and the functions fe(γd, γmax) and fe(−γd, −γmax) may be set as indicated by, for example, the solid-line and dashed-line graphs in FIG. 7.

$$\delta f\_\text{max} = \delta f\_\text{max}\_c \cdot fe(\gamma d, \gamma\text{max}) \qquad \text{Expression 11a}$$

$$\delta f\_\text{min} = -\delta f\_\text{max}\_c \cdot fe(-\gamma d, -\gamma\text{max}) \qquad \text{Expression 11b}$$

In this example, the values of fe(γd, γmax) and fe(−γd, −γmax) are always 1 or more and change with γd in the same manner as those shown in FIGS. 5(*a*) and (*b*). Then, these values of fe(γd, γmax) and fe(−γd, −γmax) are multiplied by δf_max_c and δf_min_c, respectively, to set the upper limit value δf_max and the lower limit value δf_min.

Further, the second limited front wheel steering angle δf_ltd2 may be determined by, for example, the processing described below in place of setting the permissible range [δf_min, δf_max] of the model front wheel steering angle δf_d by correcting δf_max_c on the basis of a value of the function fe. FIG. 8 is a functional block diagram for explaining the processing function.

A front wheel steering angle correction Δδf for correcting the first limited front wheel steering angle δf_ltd1 determined by the front wheel side slip angle limiter 14*d* is determined on the basis of the yaw rate γd (last time value) of the model vehicle in a processor 14*g*. At this time, Δδf is basically determined such that the value of Δδf monotonously increases on the positive side as γd increases on the positive side, while the value of Δδf monotonously decreases on the negative side as γd decreases on the negative side, as shown by the graph in the processor 14*g*. In the graph in the processor 14*g*, the value of Δδf is provided with an upper limit value (>0) and a lower limit value (<0). In this case, the upper limit value and the lower limit value are set such that, for example, the absolute values thereof are the same values as the fixed values fex shown in FIGS. 5(*a*) and (*b*) described above.

Subsequently, the front wheel steering angle correction Δδf determined as described above is added by an adder 14*h* to the first limited front wheel steering angle δf_ltd1 calculated by the subtracter 14*e* (refer to FIG. 4) thereby to determine a first limited front wheel steering angle with input correction. In this case, if the direction of δf_ltd1 and the direction of γd are opposite from each other, then the magnitude of the first limited front wheel steering angle with input correction will be smaller than the magnitude of δf_ltd1. However, if the direction of δf_ltd1 and the direction of γd are the same, then the magnitude of the first limited front wheel steering angle with input correction will be larger than the magnitude of δf_ltd1.

Subsequently, the first limited front wheel steering angle with input correction is passed through the excessive centrifugal force prevention limiter 14f to determine a second limited front wheel steering angle with input correction obtained by restricting the first limited front wheel steering angle with input correction to a value within the permissible range [δf_min, δf_max] of the model front wheel steering angle δf_d. In other words, if the first limited front wheel steering angle with input correction has a value within the permissible range, then the first limited front wheel steering angle with input correction is directly determined as the second limited front wheel steering angle with input correction. Further, if the first limited front wheel steering angle with input correction deviates from the permissible range, then either one of δf_max and δf_min which has a value closer to the first limited front wheel steering angle with input correction is determined as the second limited front wheel steering angle with input correction.

In this case, the upper limit value δf_max(>0) of the permissible range of the model front wheel steering angle δf_d in the excessive centrifugal force prevention limiter 14f is set to a value that is slightly larger than the steering angle limit value at normal circular turn δf_max_c (e.g., δf_max_c+fex) by taking into account the correction of δf_ltd1 when the direction of δf_ltd1 and the direction of γd are the same. Similarly, the lower limit value δf_min(<0) of the permissible range of the model front wheel steering angle δf_d is set such that the absolute value thereof will be a value that is slightly larger than δf_max_c.

Subsequently, the front wheel steering angle correction Δδf is subtracted by a subtracter 14i from the second limited front wheel steering angle with input correction determined as described above, thereby determining the second limited front wheel steering angle δf_ltd2.

The model front wheel steering angle δf_d(=δf_ltd2) to be input to the reference dynamic characteristics model 16 can be determined while preventing the centrifugal force generated in the model vehicle from becoming excessive and also preventing unwanted restriction from being placed in the countersteering state of the actual vehicle 1 even when the second limited front wheel steering angle δf_ltd2 is determined as described above.

In the present embodiment, the processing by the front wheel side slip angle limiter 14d and the excessive centrifugal force prevention limiter 14f has been carried out to determine the model front wheel steering angle δf_d to be input to the reference dynamic characteristics model 16; however, the processing by one or both of them may be omitted. More specifically, the unlimited front wheel steering angle δf_unltd determined by the processor 14a or a value obtained by supplying the δf_unltd to the excessive centrifugal force prevention limiter 14f or the first limited front wheel steering angle δf_ltd1 determined by the subtracter 14e may be determined as the model front wheel steering angle δf_d to be input to the reference dynamic characteristics model 16.

The current time value of the model front wheel steering angle δf_d (=the current time value of δf_ltd2) determined by the reference manipulated variable determiner 14 as explained above is input to the reference dynamic characteristics model 16, and the current time values of the reference yaw rate γd and the reference vehicle center-of-gravity point side slip angle βd are newly determined by the reference dynamic characteristics model 16 (according to the expression 01) from the above input value and the virtual external forces Fvir and Mvir (last time values) determined by the FB distribution law 20, as will be discussed later. This processing is actually carried out according to an expression obtained by representing expression 01 in terms of a discrete-time system, so that the last time values of γd and βd are also used to determine the current time values of γd and βd.

In this case, the model front wheel steering angle δf_d input to the reference dynamic characteristics model 16 is restricted by the reference manipulated variable determiner 14 as previously described, thus preventing the occurrence of a spin or an extreme side slip of the model vehicle.

[About the FB Distribution Law]

The details of the processing by the FB distribution law 20 will now be explained with reference to FIG. 9 to FIG. 16.

FIG. 9 is a functional block diagram illustrating the processing function of the FB distribution law 20. As shown in the figure, the processing function of the FB distribution law 20 is roughly constituted of a virtual external force determiner 20a which carried out the processing for determining the virtual external forces Mvir and Fvir and an actuator operation FB target value determiner 20b which carries out the processing for determining an actuator operation FB target value.

Incidentally, the virtual external force determiner 20a corresponds to the vehicle model operation control input determining means in the present invention. Further, the actuator operation FB target value determiner 20b is a constituent element of the actual vehicle actuator operation control input determining means in the present invention (the means which determines a feedback control input in the present invention).

First, the virtual external force determiner 20a will be explained with reference to FIG. 9. The processing function of the virtual external force determiner 20a is roughly divided into a virtual external force temporary value determiner 201 and a γβ limiter 202.

In the processing by the virtual external force determiner 20a, first, temporary values Mvirtmp and Fvirtmp of virtual external forces are determined by the virtual external force temporary value determiner 201 on the basis of state amount errors γerr (=γact−γd), βerr (=βact−βd) input from the subtracter 18. Mvirtmp of the temporary values Mvirtmp and Fvirtmp means a moment (a moment in the yaw direction) to be additionally generated about the center-of-gravity point Gd of the model vehicle of the reference dynamic characteristics model 16 in order to approximate the state amount errors γerr and βerr to zero, and Fvirtmp means a translational force (a lateral translational force of the model vehicle) to be additionally applied to the center-of-gravity point Gd of the model vehicle of the reference dynamic characteristics model 16 in order to approximate the state amount errors γerr and Herr to zero.

To be specific, as shown by expression 15 given below, a vector (γerr, βerr)$^T$ (the superscript T means transposition) composed of the input state amount errors γerr and βerr is multiplied by a predetermined gain matrix Kfvir thereby to determine the temporary values Mvirtmp and Fvirtmp of the virtual external force (hereinafter referred to as the virtual external force temporary values Mvirtmp and Fvirtmp).

[Mathematical expression 5]

$$\begin{bmatrix} Fvirtmp \\ Mvirmp \end{bmatrix} = Kfvir \cdot \begin{bmatrix} \beta err \\ \gamma err \end{bmatrix} \quad \text{Expression 15}$$

where $$Kfvir = \begin{bmatrix} Kfvir11 & Kfvir12 \\ Kfvir21 & Kfvir22 \end{bmatrix}$$

According to the expression 15, the virtual external force temporary values Mvirtmp and Fvirtmp as the temporary values of control inputs to be fed back to the reference dynamic characteristics model 16 to approximate the state amount errors γerr and βerr to zero are determined from the state amount errors γerr and βerr by the feedback control law.

If it is required that the γβ limiter 202, which will be explained in detail below, generates an intense action for bringing βd or βact back to a predetermined permissible range only if the vehicle center-of-gravity point side slip angle βd of the model vehicle or the actual vehicle center-of-gravity point side slip angle βact of the actual vehicle 1 is about to exceed or has exceeded the permissible range, then βerr is desirably converged to zero by a characteristic close to a primary delay characteristic with a small time constant. For this purpose, for example, Kfvir12 among gain matrix Kfvir components may be set to zero and Kfvir11 may be set such that the absolute value thereof increases.

Subsequently, the γβ limiter 202 carries out the processing for correcting the virtual external force temporary values Mvirtmp and Fvirtmp so as to restrain the yaw rate γd and the vehicle center-of-gravity point side slip angle βd of the model vehicle on the reference dynamic characteristics model 16 from deviating from the respective predetermined permissible ranges thereof.

More specifically, the γβ limiter 202 first carries out the processing by a prediction calculator 203 to predict the yaw rate γd and the vehicle center-of-gravity point side slip angle βd of the model vehicle after predetermined time (after the time equivalent to a predetermined number of one or more control processing cycles), and outputs those predicted values as the predicted yaw rate γda and a predicted vehicle center-of-gravity point side slip angle βda.

At this time, the prediction calculator 203 receives the reference yaw rate γd (current time value) and the reference vehicle center-of-gravity point side slip angle βd (current time value) determined by the reference dynamic characteristics model 16, the actual traveling velocity Vact (current time value) detected or estimated by the sensor/estimator 12, the second limited front wheel steering angle δf_ltd2 (current time value) determined by the reference manipulated variable determiner 14, and the virtual external force temporary values Mvirtmp and Fvirtmp (current time values) determined as described above by the virtual external force temporary value determiner 201. Then, the prediction calculator 203 calculates the predicted yaw rate γda and the predicted vehicle center-of-gravity point side slip angle βda on the basis of the expression 01 on the assumption that the model front wheel steering angle δf_d is held at the input δf_ltd2, the virtual external forces Mvir and Fvir to be applied to the model vehicle are held at the input Mvirtmp and Fvirtmp, and the traveling velocity Vd of the model vehicle is held at the input Vact.

Subsequently, the γβ limiter 202 passes the γda and βda calculated by the prediction calculator 203 as described above through a γ dead-zone processor 204 and a β dead-zone processor 205, respectively, to determine the amounts of deviation γover and βover from predetermined permissible ranges of γda and βda, respectively. The graph of the γdead-zone processor 204 shown in the figure is a graph illustrating the relationship between γda and γover, the values in the direction of the axis of abscissas related to the graph indicating the values of γda, while the values in the direction of the axis of ordinates indicating the values of γover. Similarly, the graph of the dead-zone processor 205 shown in the figure is a graph illustrating the relationship between βda and βover, the values in the direction of the axis of abscissas related to the graph indicating the values of βda, while the values in the direction of the axis of ordinates indicating the values of βover.

Here, the permissible range in the γ dead-zone processor 204 is a permissible range (a permissible range of the yaw rate γd) having the lower limit value and the upper limit value thereof set to γdamin(<0) and γdamax(>0), respectively, and the permissible range in the β dead-zone processor 205 is a permissible range (a permissible range of the vehicle center-of-gravity point side slip angle βd) having the lower limit value and the upper limit value thereof set to βdamin(<0) and βdamax(>0), respectively.

In the present embodiment, the permissible range [γdamin, γdamax] related to the yaw rate γd is set such that, for example, the centrifugal force generated in the model vehicle when a normal circular turn is made while holding the traveling velocity Vd of the model vehicle at Vact (current time value) and also holding the yaw rate γd of the model vehicle at γdamin or γdamax does not exceed a limit value of a frictional force based on the estimated friction coefficient μestm (current time value). In other words, γdamax and γdamin are set on the basis of Vact (current time value) and μestm (current time value) such that expressions 16a and 16b shown below are satisfied.

$$m \cdot Vact \cdot \gamma damax < \mu estm \cdot m \cdot g \quad \text{Expression 16a}$$

$$m \cdot Vact \cdot \gamma damin > -\mu estm \cdot m \cdot g \quad \text{Expression 16b}$$

γdamax, γdamin may be set such that, for example, the absolute value of each thereof will be the same value as the maximum yaw rate γmax at a normal circular turn determined according to the expression 05 (provided γdamax=γmax and γdamin=−γmax). Alternatively, however, the γdamax and γdamin may be set such that the absolute values thereof are different values from γmax (e.g., values that are smaller than γmax).

Incidentally, the permissible range [γdamin, γdamax] set as described above narrows as the actual traveling velocity Vact increases or the estimated friction coefficient μestm decreases.

Further, the permissible range [βdamin, βdamax] related to the vehicle center-of-gravity point side slip angle βd is set, for example, within a range of a vehicle center-of-gravity point side slip angle that maintains the relationship between the vehicle center-of-gravity point side slip angle of the actual vehicle 1 and the translational force in the lateral direction applied to the center-of-gravity point of the actual vehicle 1 to be a substantially linear relationship (proportional relationship). In this case, βdamin and βdamax are desirably set on the basis of at least one of Vact (current time value) and μestm (current time value).

Further, specifically, the processing by the γ dead-zone processor 204 sets γover=0 if an input γda is a value within a predetermined permissible range [γdamin, γdamax] (if γdamin≦γda≦γdamax), or sets γover=γda−γdamin if γda<γdamin, or sets γover=γda−γdamax if γda>γdamax. Thus, the amount of deviation γover of the predicted yaw rate γda from the permissible range [γdamin, γdamax] is determined.

Similarly, the processing by the βdead-zone processor 205 sets βover=0 if the value of an input βda is a value within a predetermined permissible range [βdamin, βdamax] (if βdamin≦βda≦βdamax), or sets βover=βda−βdamin if βda<βdamin, or sets βover=βda−βdamax if βda>βdamax. Thus, the amount of deviation βover of the predicted vehicle center-of-gravity point side slip angle βda from the permissible range [βdamin, βdamax] is determined.

Subsequently, the γβ limiter 202 calculates, by a processor 206, the temporary value manipulated variables Mvir_over and Fvir_over, which are the correction amounts of the virtual external force temporary values Mvirtmp and Fvirtmp, such that these amounts of deviation γover and βover are approximated to zero.

To be more specific, as indicated by expression 17 given below, a vector (γover, βover)$^T$ composed of γover and βover is multiplied by a predetermined gain matrix Kfov to determine Mvir_over and Fvir_over.

[Mathematical expression 6]

$$\begin{bmatrix} Fvir\_over \\ Mvir\_over \end{bmatrix} = Kfov \cdot \begin{bmatrix} \beta\ over \\ \gamma\ over \end{bmatrix} \quad \text{Expression 17}$$

where $$Kfov = \begin{bmatrix} Kfov11 & Kfov12 \\ Kfov21 & Kfov22 \end{bmatrix}$$

Subsequently, the γβ limiter 202 subtracts the temporary value manipulated variables Mvir_over and Fvir_over from the virtual external force temporary values Mvirtmp and Fvirtmp by a subtracter 207 to determine the current time values of the virtual external forces Mvir and Fvir. In other words, the virtual external forces Mvir and Fvir are determined according to the following expressions 18a and 18b.

$Mvir=Mvirtmp-Mvir\_over$  Expression 18a $Fvir=Fvirtmp-Fvir\_over$  Expression 18b The processing by the virtual external force determiner 20a is carried out as described above thereby to determine the virtual external forces Mvir and Fvir such that the state amount errors γerr and βerr are approximated to zero, while restraining the predicted yaw rate γda and the predicted vehicle center-of-gravity point side slip angle βda from deviating from the permissible ranges [γdamin, γdamax] and [βdamin, βdamax], respectively.

The γβ limiter 202 of the virtual external force determiner 20a explained above determines the virtual external forces Mvir and Fvir by correcting the virtual external force temporary values Mvirtmp and Fvirtmp on the basis of the temporary value manipulated variables Mvir_over and Fvir_over (more generally speaking, Mvir and Fvir are determined by the linear coupling of Mvir_over and Mvirtmp and the linear coupling of Fvir_over and Fvirtmp, respectively). Alternatively, however, the virtual external forces Mvir and Fvir may be determined as described below. FIG. 10 is a functional block diagram for explaining the processing.

Referring to the figure, in this example, the processing by the virtual external force temporary value determiner 201, the prediction calculator 203, the γ dead-zone processor 204, the β dead-zone processor 205, and a processor 206 is the same as that shown in FIG. 9. Meanwhile, in the present example, the temporary value manipulated variables Fvir_over and Mvir_over determined by the processor 206 are input to processors 208 and 209, respectively, and correction coefficients Katt1 ($\geqq 0$) and Katt2($\geqq 0$) for correcting the virtual external force temporary values Mvirtmp and Fvirtmp, respectively, are determined in the processors 208 and 209. These correction coefficients Katt1 and Katt2 are correction coefficients serving as multipliers for the virtual external force temporary values Mvirtmp and Fvirtmp, respectively. The graph related to the processor 208 shown in the figure is a graph illustrating the relationship between Mvir_over and Katt1, the values in the direction of the axis of abscissas related to the graph indicating the values of Mvir_over and the values in the direction of the axis of ordinates indicating the values of Katt1. Similarly, the graph related to the processor 209 shown in the figure is a graph illustrating the relationship between Fvir_over and Katt2, the values in the direction of the axis of abscissas related to the graph indicating the values of Fvir_over and the values in the direction of the axis of ordinates indicating the values of Katt2.

The processing by the processor 208 sets Katt1=1 if Mvir_over is zero and sets the value of Katt1 such that the value of Katt1 monotonously decreases from 1 to 0 as the absolute value of Mvir_over increases from zero, as shown by the graph in the figure. Further, the value of Katt1 is maintained at zero if the absolute value of Mvir_over exceeds a predetermined value (a value at which Katt1 reaches zero).

Similarly, the processing by the processor 209 sets Katt2=1 if Fvir_over is zero and sets the value of Katt2 such that the value of Katt2 monotonously decreases from 1 to 0 as the absolute value of Fvir_over increases from zero, as shown by the graph in the figure. Further, the value of Katt2 is maintained at zero if the absolute value of Fvir_over exceeds a predetermined value (a value at which Katt2 reaches zero).

Subsequently, the correction coefficients Katt1 and Katt2 determined as described above are multiplied by the virtual external force temporary values Mvirtmp and Fvirtmp by multipliers 210 and 211, respectively, thereby determining the current time values of the virtual external forces Mvir and Fvir.

Thus, in the example shown in FIG. 10, the virtual external force Mvir is determined such that the magnitude of the virtual external force Mvir is narrowed (approximated to zero) relative to the virtual external force temporary value Mvirtmp as the absolute value of the amount of deviation Mvir_over increases. Similarly, the virtual external force Fvir is determined such that the magnitude of the virtual external force Mvir is narrowed (approximated to zero) relative to the virtual external force temporary value Mvirtmp as the absolute value of the amount of deviation Fvir_over increases. Thus, determining the virtual external forces Mvir and Fvir means to regard that the deviation of γda and βda from their permissible ranges is attributable to the virtual external forces Mvir and Fvir and to determine the virtual external forces Mvir and Fvir such that the state amount errors γerr and βerr are approximated to zero while restraining the deviation of γda and βda from their permissible ranges [γdamin, γdamax] and [βdamin, βdamax]. In this case, desirably, in the reference manipulated variable determiner 14, the model front wheel steering angle δf_d to be input to the reference dynamic characteristics model 16 is limited, as described above.

Further, in the γβ limiter 202 explained above, the predicted yaw rate γda and the predicted vehicle center-of-gravity point side slip angle βda determined using expression 01 as described above by the prediction calculator 203 are respectively defined as restriction object amounts, and these γda and βda are input to the γ dead-zone processor 204 and the β dead-zone processor 205 to determine the deviation amounts γover and βover. Alternatively, however, in place of γda and βda, the current time values of the reference yaw rate γd and the reference vehicle center-of-gravity point side slip angle βd, or the current time values of the actual yaw rate γact and the actual vehicle center-of-gravity point side slip angle βact, or the values obtained by filtering these values may be used as the restriction object amounts.

For example, at each control processing cycle, the current time value of γd in place of γda may be input to the γ dead-zone processor 204, and a value obtained by filtering, in which a transfer function is represented in the form of (1+T1·s)/(1+T2·s), the βd sequentially calculated by the reference dynamic characteristics model 16 (T1 and T2 denoting certain time constants and s denoting a Laplace operator) may be input in place of βda into the β dead-zone processor 205. In this case, if the time constants T1 and T2 are set such that, for example, T1>T2, then the filtering functions as a so-called phase advancing compensation element. At this time, advancing the phase of a frequency component of βd in a frequency band which is high to a certain degree and enhancing a gain relative to the frequency component make it possible to limit the virtual external forces Mvir and Fvir on the basis of βover before the value itself of βd determined at each control processing cycle deviates from the permissible range [βdamin, βdamax].

Further, the γda and βda as the restriction object amounts may alternatively be determined as described below. In the prediction calculator 203, as shown by the following expressions 19a and 19b, an appropriate coefficient cij may be used to determine, as γda and βda, the values obtained by linearly coupling the current time values of γd and βd.

$$\gamma da = c11 \cdot \gamma d + c12 \cdot \beta d \qquad \text{Expression 19a}$$

$$\beta da = c21 \cdot \gamma d + c22 \cdot \beta d \qquad \text{Expression 19b}$$

Alternatively, as shown by the following expressions 20a and 20b, an appropriate coefficient cij may be used to determine, as γda and βda, the values obtained by linearly coupling the current time values of γd, βd, Mvirtmp, Fvirtmp, and δf_ltd2.

$$\gamma da = c11 \cdot \gamma d + c12 \cdot \beta d + c13 \cdot Mvirt\_mp + c14 \cdot Fvirtmp + c15 \cdot \delta f\_ltd2 \qquad 20a$$

$$\beta da = c21 \cdot \gamma d + c22 \cdot \beta d + c23 \cdot Mvirtimp + c24 \cdot Fvirtmp + c25 \cdot \delta f\_ltd2 \qquad 20b$$

These expressions 20a and 20b are represented by further generalizing the processing by the prediction calculator 203 described above.

Alternatively, as shown by the following expressions 21a and 21b, the values obtained by linearly coupling the current time values of γact and βact by using an appropriate coefficient cij may be determined as γda and βda.

$$\gamma da = c11 \cdot \gamma act + c12 \cdot \beta act \qquad \text{Expression 21a}$$

$$\beta da = c21 \cdot \gamma act + c22 \cdot \beta act \qquad \text{Expression 21b}$$

Supplementally, as is obvious from expression 02b, if c21=−Lr/Vd and c22=1 (here, Vd denotes the traveling velocity of the model vehicle (=actual traveling velocity Vact)), then βda corresponds to the side slip angle of the rear wheel.

Alternatively, as shown in the following expressions 22a and 22b, the values obtained by linearly coupling the current time values of γd, βd and a temporal differential value dβd/dt of βd, γact, βact and a temporal differential value βpact/dt of βact, Mvirtmp, Fvirtmp, and δf_ltd2 by using an appropriate coefficient cij may be determined as γda and βda.

$$\gamma da = \\ c11 \cdot \gamma d + c12 \cdot \beta d + c13 \cdot d\beta d/dt + c14 \cdot \gamma act + c15 \cdot \beta act + c16 \cdot d\beta act/dt + c17 \cdot Mvirtmp + c18 \cdot Fvirtmp + c19 \cdot \delta f\_ltd2 \qquad 22a$$

$$\gamma da = c21 \cdot \gamma d + c22 \cdot \beta d + c23 \cdot d\beta d/dt + c24 \cdot \gamma act + c25 \cdot \beta act + c26 \cdot d\beta act/dt + c27 \cdot Mvirtmp + c28 \cdot Fvirtmp + c29 \cdot \delta f\_ltd2 \qquad 22b$$

Alternatively, the weighted mean value of the value of the computation result of the right side of expression 20a and the value of the computation result of the right side of expression 21a and the weighted mean value of the value of the computation result of the right side of expression 20b and the value of the computation result of the right side of expression 21b may be determined as γda and βda, respectively. This is an example of the case where γda and βda are determined according to expression 22a and expression 22b. The terms of Mvirtmp and Fvirtmp in expression 20a and expression 20b or expression 22a and expression 22b may be omitted.

Alternatively, the predicted values of γd and βd at each control processing cycle until after predetermined time may be determined according to the expression 01 and the peak values of the determined γd and βd may be determined as γda and βda.

Further, even in the case where γda and βda are determined using any of expression 20a and expression 20b, or expression 21a and expression 21b, or expression 22a and expression 22b, the coefficient cij of these expressions may be provided with a frequency characteristic (in other words, the value of a variable to be multiplied by cij may be subjected to filtering by a low-pass filter or the like). Alternatively, the limitation of a temporal change rate of the variable may be placed on the value of the variable to be multiplied by the coefficient cij.

Supplementally, if γda and βda are determined by expression 21a and expression 21b or expression 22a and expression 22b described above, then each coefficient cij is desirably set such that the γda and βda bear meanings as the predicted values of the actual yaw rate γact and the actual vehicle center-of-gravity point side slip angle βact of the actual vehicle 1 after predetermined time.

If the reference dynamic characteristics model 16 is a linear model as represented by the expression 01, then γda and βda can be properly determined as the predicted values of a yaw rate and a vehicle center-of-gravity point side slip angle of the actual vehicle 1 or the model vehicle after predetermined time by using any of expression 20a and expression 20b, or expression 21a and expression 21b, or expression 22a and expression 22b.

If the current time values of γact and βact or the values obtained by filtering γact and βact are used in place of γda and βda, or if γda and βda are determined by expression 21a and expression 21b or expression 22a and expression 22b described above, then the virtual external forces Mvir and Fvir will be determined such that the state amount errors γerr and βerr are approximated to zero while restraining the current time values or filtered values or predicted values of the actual yaw rate γact and the actual vehicle center-of-gravity point side slip angle βact of the actual vehicle 1 from deviating from the permissible ranges [γdamin, γdamax] and [βdamin, βdamax], respectively.

Supplementally, more generally, the processing by the virtual external force determiner 20*a* may determine the virtual external forces Mvir and Fvir according to expression 200 given below.

[Mathematical expression 7]

$$\begin{bmatrix} Fvir \\ Mvir \end{bmatrix} = \begin{bmatrix} Kfb11 & Kfb12 & Kfb13 & Kfb14 & Kfb15 & Kfb16 \\ Kfb21 & Kfb22 & Kfb23 & Kfb24 & Kfb25 & Kfb26 \end{bmatrix} \cdot \begin{bmatrix} \beta d \\ \gamma d \\ \beta act \\ \gamma act \\ \beta \text{ over} \\ \gamma \text{ over} \end{bmatrix} + \begin{bmatrix} Kfb\_\delta 1 \\ Kfb\_\delta 2 \end{bmatrix} \cdot \delta f\_ltd2 \qquad \text{Expression 200}$$

Further, in the γ dead-zone processor 204 and the β dead-zone processor 205 of the γβ limiter 202, the amounts of deviation γover and βover have been determined by separately setting the permissible ranges [γdamin, γdamax] and [βdamin, βdamax] of γda and βda, respectively; alternatively, however, a permissible range (permissible area) for a pair of γda and βda may be set by considering the correlativity between γda and βda, to determine the amounts of deviation γover and βover.

For example, as shown in FIG. 11, an area A (a parallelogram area) enclosed by straight lines 1 to 4 on a coordinate plane having γda on the axis of abscissa and βda on the axis of ordinates is set as a permissible area A for a pair of γda and βda. In this case, the straight lines 1 and 3 are the straight lines that define a lower limit value and an upper limit value, respectively, of γda. The lower limit value and the upper limit value are set, for example, in the same manner as that for the lower limit value γdamin and the upper limit value γdamax of the permissible range [γdamin, γdamax] in the γ dead-zone processor 204. The straight lines 2 and 4 are the straight lines that define a lower limit value and an upper limit value, respectively, of βda. In this example, the setting is made such that the lower limit value and the upper limit value, respectively, linearly change according to γda. Further, the amounts of deviation γover and βover are determined, for example, as follows. If the pair of γda and βda exists within the permissible area A, as indicated by a point P1 in FIG. 11, then γover=βover=0. On the other hand, if the pair of γda and βda deviates from the permissible area A, as indicated by, for example, a point P2 in FIG. 11, then a point P3 on the boundary of the permissible area A that is closest to the point P2 among the points on the straight line 5 which passes the point P2 and has a predetermined inclination (a point P3 closest to P2 among the points existing in the permissible area A on a straight line 5) is determined. Then, the difference between the value of γda at the point P2 and the value of γda at the point P3 is determined as the amount of deviation γover, and the difference between the value of βda at the point P2 and the value of βda at the point P3 is determined as the amount of deviation βover. If a point associated with the pair of γda and βda is, for example, a point P4 shown in FIG. 11, i.e., if a straight line 6 having a predetermined inclination (the same inclination as that of the straight line 5) to pass the point P4 associated with the pair of γda and βda does not intersect with the permissible area A (if no point in the permissible range A exists on the straight line 6), then a point P5 on the boundary of the permissible area A that is closest to the straight line 6 is determined. Then, the difference between the value of γda at the point P4 and the value of γda at the point P5 may be determined as the amount of deviation γover, and the difference between the value of βda at the point P4 and the value of βda at the point P5 may be determined as the amount of deviation βover.

Supplementally, the permissible area of the pair of γda and βda does not have to be a parallelogram area, and it may alternatively be, for example, an area A' having smooth boundary portions (formed with no angular portions), as indicated by the dashed line in FIG. 11.

Further, in they limiter 202, the amounts of deviation γover and βover from [γdamin, γdamax] and [βdamin, βdamax] have been determined on both γda and βda, then the temporary values Mvirtmp and Fvirtmp have been corrected on the basis thereof; alternatively, however, the temporary values Mvirtmp and Fvirtmp may be corrected on the basis of only one of γover and βover. In this case, the processing by the processor 206 may determine the temporary value manipulated variables Mvir_over and Fvir_over by fixing the value of either one of γover and βover to zero.

Next, the processing by the actuator operation FB target value determiner 20b will be explained with reference to FIG. 12 to FIG. 14. In the following explanation, the wheels W1 to W4 may be referred to as an n-th wheel Wn (n=1, 2, 3, 4).

FIG. 12 is a functional block diagram illustrating the processing by the actuator operation FB target value determiner 20b. Referring to the figure, the actuator operation FB target value determiner 20b first determines in a processor 220 a feedback yaw moment basic required value Mfbdmd, which is a basic required value of a moment in the yaw direction to be generated about the center-of-gravity point G of the actual vehicle 1 in order to bring the state amount errors γerr and βerr close to zero on the basis of received state amount errors γerr and βerr, as the basic required value of a feedback control input to the actuator device 3 of the actual vehicle 1.

Mfbdmd is determined by a feedback control law from the state amount errors γerr and βerr. More specifically, as indicated by expression 23 given below, a vector (Herr, γerr) T composed of βerr and γerr is multiplied by a predetermined gain matrix Kfbdmd (by linearly coupling βerr and γerr), thereby determining Mfbdmd.

[Mathematical expression 8]

$$Mfbdmd = Kfdmd \cdot \begin{bmatrix} \beta err \\ \gamma err \end{bmatrix} \qquad \text{Expression 23}$$

where
$$Kfbdmd \equiv [\, Kfbdmd1 \quad Kfbdmd2 \,]$$

Alternatively, Mfbdmd may be determined on the basis of βerr, γerr and a first-order differential value dβerr/dt of βerr. For example, a vector composed of βerr, γerr and dβerr/dt may be multiplied by an appropriate gain matrix (by linearly coupling βerr, γerr, and dβerr/dt by an appropriate coefficient) so as to determine Mfbdmd.

Alternatively, at least one of elements Kfbdmd1 and Kfbdmd2 of the gain matrix Kfbdmd may be multiplied by a phase compensating element whose transfer function is expressed by (1+Tc1·s)/(1+Tc2·s). For instance, Kfbdmd1, which is a multiplier for βerr, may be multiplied by the phase compensating element, and the values of time constants Tc1 and Tc2 may be set such that Tc1>Tc2. In such a case, the term obtained by multiplying Kfbdmd1 by βerr will be equivalent to the result obtained by passing Herr and a differential value thereof, which have been linearly coupled, through a high-cut filter.

Subsequently, the actuator operation FB target value determiner 20b passes the Mfbdmd through a dead-zone processor 221 to determine a dead zone excess feedback yaw moment required value Mfbdmd_a. The graph of the dead zone processor 221 in the figure is a graph illustrating the relationship between Mfbdmd and Mfbdmd_a, the values in the direction of the axis of abscissas related to the graph indicating the values of Mfbdmd, while the values in the direction of the axis of ordinates indicating the values of Mfbdmd_a.

According to the present embodiment, in the feedback control of the actuator devices 3 of the actual vehicle 1, the braking device of the driving/braking device 3A among the actuator devices 3 is mainly operated to approximate the state amount errors γerr and βerr to zero. In this case, if the braking device is operated on the basis of Mfbdmd determined as described above, there is a danger that the braking device will be frequently operated. To prevent this, according to the present embodiment, the braking device is operated on the basis of the dead zone excess feed back yaw moment required value Mfbdmd_a obtained by passing Mfbdmd through the dead zone processor 221.

To be more specific, the processing by the dead zone processor 221 is carried out as follows. The dead zone processor 221 sets Mfbdmd_a=0 if the value of Mfbdmd exists in a predetermined dead zone established in the vicinity of zero. Further, the dead zone processor 221 sets Mfbdmd_a=Mfbdmd−upper limit value if Mfbdmd is larger than an upper limit value (>0) of the dead zone, while the dead zone processor 221 sets Mfbdmd_a=Mfbdmd−lower limit value if Mfbdmd is smaller than a lower limit value (<0) of the dead zone. In other words, an excess from the dead zone of Mfbdmd is determined as Mfbdmd_a. Operating the braking device of the driving/braking device 3A on the basis of Mfbdmd_a determined as described above makes it possible to operate the braking device such that the state amount errors γerr and βerr are approximated to zero, while restraining frequent operation of the braking device based on the state amount errors γerr and βerr. Incidentally, the processing by the dead zone processor 221 may be omitted, and Mfbdmd may be directly used as Mfbdmd_a.

Subsequently, an actuator operation FB target value distribution processor 222 carries out processing for determining the actuator operation FB target value (a feedback control input to an actuator device 3) on the basis of the dead zone excess feedback yaw moment required value Mfbdmd_a.

The processing by the actuator operation FB target value distribution processor 222 will be schematically explained. The actuator operation FB target value distribution processor 222 determines an FB target n-th wheel brake driving/braking force Fxfbdmd_n (n=1, 2, 3, 4), which is a feedback target value of the driving/braking force of the wheels W1 to W4 by an operation of the braking device of the driving/braking device 3A (a feedback control input to the braking device to approximate γerr and βerr to zero), such that Mfbdmd_a is generated about the center-of-gravity point of the actual vehicle 1 (consequently to approximate γerr and βerr to zero). Alternatively, in addition to Fxfbdmd_n (n=1, 2, 3, 4), an active steering FB target lateral force Fyfbdmd_f, which is a feedback target value of the lateral forces of the front wheels W1 and W2 by an operation of the steering device 3B, is determined.

In this case, according to the present embodiment, if the dead zone excess feedback yaw moment required value Mfbdmd_a indicates a moment in the positive direction (a moment in the counterclockwise direction as observed from above the actual vehicle 1), then basically, the driving/braking force of the left wheels W1 and W3 of the actual vehicle 1 is increased in the braking direction thereby to determine the FB target n-th wheel brake driving/braking force Fxfbdmd_n (n=1, 2, 3, 4) such that Mfbdmd_a is generated about the center-of-gravity point G of the actual vehicle 1. Further, at this time, an FB target first wheel brake driving/braking force Fxfbdmd_1 and an FB target third wheel brake driving/braking force Fxfbdmd_3 related to the left wheels W1 and W3 for generating Mfbdmd_a about the center-of-gravity point G of the actual vehicle 1 are determined such that the relationship between the changes in each thereof and the changes in Mfbdmd_a is a proportional relationship. Hereinafter, the ratios of changes in Fxfbdmd_1 and Fxfbdmd_3, respectively, to the changes in Mfbdmd_a in the proportional relationship will be referred to as a front wheel gain GA1 and a rear wheel gain GA3, respectively. In the present embodiment, if Mfbdmd_a is a moment in the positive direction, then Fxfbdmd_1 and Fxfbdmd_3 are determined to be the values obtained by multiplying Mfbdmd_a by GA1 and GA3, respectively, (values that are proportional to Mfbdmd_a).

If Mfbdmd_a is a moment in the negative direction (a moment in the clockwise direction as observed from above the actual vehicle 1), then basically, the driving/braking force of the right wheels W1 and W3 of the actual vehicle 1 is increased in the braking direction so as to determine the FB target n-th wheel brake driving/braking force Fxfbdmd_n (n=1, 2, 3, 4) such that Mfbdmd_a is generated thereby about the center-of-gravity point G of the actual vehicle 1. Further, at this time, an FB target second wheel brake driving/braking force Fxfbdmd_2 and an FB target fourth wheel brake driving/braking force Fxfbdmd_4 related to the right wheels W2 and W4 for generating Mfbdmd_a about the center-of-gravity point G of the actual vehicle 1 are determined such that the relationship between the changes of each thereof and the changes in Mfbdmd_a is a proportional relationship. Hereinafter, the ratios of changes in Fxfbdmd_2 and Fxfbdmd_4, respectively, to changes in Mfbdmd_a in the proportional relationship will be referred to as a front wheel gain GA2 and a rear wheel gain GA4. In the present embodiment, if Mfbdmd_a is a moment in the negative direction, then Fxfbdmd_2 and Fxfbdmd_4 are determined to be the values obtained by multiplying Mfbdmd_a by GA2 and GA4, respectively, (values that are proportional to Mfbdmd_a).

In the following explanation, as shown in FIG. 13, the interval between the front wheels W1 and W2 (i.e., the tread of the front wheels W1 and W2) of the actual vehicle 1 is denoted by df, and the interval between the rear wheels W3 and W4 (i.e., the tread of the rear wheels W3 and W4) is denoted by dr, and the actual steering angle of the front wheels W1 and W2 (the actual front wheel steering angle) is denoted by δf_act. The distance between an n-th wheel Wn and the center-of-gravity point G of the actual vehicle 1 in the direction orthogonal to the longitudinal direction of the n-th wheel Wn (in the direction orthogonal on a horizontal plane) when the actual vehicle 1 is observed from above is denoted by Ln (n=1, 2, 3, 4). In the present embodiment, although the rear wheels W3 and W4 are not shown because they are non-steering control wheels, the actual steering angle of the rear wheels W3 and W4 (actual rear wheel steering angle) is denoted by δr_act. In the present embodiment, δr_act=0 and L3=L4=dr/2.

Lf in FIG. 13 denotes the distance in the longitudinal direction between the center-of-gravity point G of the actual vehicle 1 and the axle of the front wheels W1 and W2, and Lr denotes the distance in the longitudinal direction between the center-of-gravity point G of the actual vehicle 1 and the axle of the rear wheels W3 and W4. The values of these Lf and Lr are the same as the values of Lf and Lr related to the model vehicle shown in FIG. 3 described above.

The processing by the actuator operation FB target value distribution processor 222 will be specifically explained below. First, it is assumed that the actual vehicle 1 is in a traveling-straight state (a traveling state in which δf_act=0), and an n-th wheel driving/braking force full required value Fxfullfbdmd_n, which is the driving/braking force of the n-th wheel Wn (n=1, 2, 3, 4) required to generate a moment in the yaw direction that is equal to Mfbdmd_a about the center-of-gravity point G of the actual vehicle 1 in the traveling-straight state is respectively determined by a processor 222a_n (n=1, 2, 3, 4).

To be more specific, Fxfullfbdmd_n (n=1, 2, 3, 4) is determined in each processor 222a_n by the multiplication calculation of the following expressions 24a to 24d.

$$Fxfullfbdmd\_1 = -(2/df) \cdot Mfbdmd\_a \quad \text{Expression 24a}$$

$$Fxfullfbdmd\_2 = (2/df) \cdot Mfbdmd\_a \quad \text{Expression 24b}$$

$$Fxfullfbdmd\_3=-(2/dr)\cdot Mfbdmd\_a \quad \text{Expression 24c}$$

$$Fxfullfbdmd\_4=(2/dr)\cdot Mfbdmd\_a \quad \text{Expression 24d}$$

Subsequently, the actuator operation FB target value distribution processor 222 determines a first wheel distribution ratio correction value K1_str and a second wheel distribution ratio correction value K2_str in processors 222b_1 and 222b_2, respectively, on the basis of the actual front wheel steering angle δf_act, and also determines a third wheel distribution ratio correction value K3_str and a fourth wheel distribution ratio correction value K4_str in processors 222b_3 and 222b_4, respectively, on the basis of the actual rear wheel steering angle δr_act. These respective n-th wheel distribution ratio correction values Kn_str(n=1, 2, 3, 4) are correction coefficients whereby Fxfullfbdmd_n is multiplied.

Here, as the actual front wheel steering angle δf_act changes from zero, the driving/braking forces of the first wheel W1 and the second wheel W2 that generate a moment in the yaw direction equivalent to Mfbdmd_a about the center-of-gravity point G of the actual vehicle 1 change from Fxfullfbdmd_1 and Fxfullfbdmd_2 determined according to the aforesaid expressions 24a and 24b, respectively. Similarly, if the rear wheels W3 and W4 are steering control wheels, then as the actual rear wheel steering angle δr_act changes from zero, the driving/braking forces of the third wheel W3 and the fourth wheel W4 that generate a moment in the yaw direction equivalent to Mfbdmd_a about the center-of-gravity point G of the actual vehicle 1 change from Fxfullfbdmd_3 and Fxfullfbdmd_4 determined according to the expressions 24c and 24d, respectively. The n-th wheel distribution ratio correction value Kn_str is basically a correction coefficient for determining the driving/braking force of the n-th wheel Wn that generates a moment in the yaw direction equal or close to Mfbdmd_a about the center-of-gravity point G of the actual vehicle 1 by correcting Fxfullfbdmd_n(n=1, 2, 3, 4) by taking such influences of a steering angle into account.

In the present embodiment, however, the rear wheels W3 and W4 are non-steering control wheels, so that δr_act is always zero. Hence, K3_str and K4_str are in fact always set to "1." Therefore, the processors 222b_3 and 222b_4 may be omitted.

Meanwhile, K1_str and K2_str related to the front wheels W1 and W2 are determined as described below by the processors 222b_1 and 222b_2, respectively. First, the values of L1 and L2 shown in FIG. 13 are calculated by the geometric calculation of expressions 25a and 25b shown below from values of df and Lf, which are set beforehand, and a value of δf_act. As the value of δf_act in the calculation, a value (current time value) detected or estimated by the sensor/estimator 12 may be used, or alternatively, a last time value of a target value (a target value finally determined at each control processing cycle) of a steering angle of the front wheels W1 and W2 of the actual vehicle 1 may be used. Further, if the steering device 3B is a mechanical steering device, then the value may be determined from an overall steering ratio of the mechanical steering device and the steering angle θh in the drive operation inputs. Alternatively, a current time value of the unlimited front wheel steering angle δf_unltd determined by the processor 14a of the reference manipulated variable determiner 14 may be used.

$$L1=(df/2)\cdot\cos \delta Lf\_act-Lf\sin \delta f\_act \quad \text{Expression 25a}$$

$$L2=(df/2)\cdot\cos \delta Lf\_act+Lf\sin \delta f\_act \quad \text{Expression 25b}$$

Here, the result obtained by multiplying the driving/braking force of each of the front wheels W1 and W2 by L1 and L2, respectively, provides the moment in the yaw direction generated about the center-of-gravity point G of the actual vehicle 1. Therefore, basically, the driving/braking forces of the front wheels W1 and W2 for generating a moment in the yaw direction that is equal to Mfbdmd_a about the center-of-gravity point G can be determined by multiplying Fxfullfbdmd_1 and Fxfullfbdmd_2 by K1_str=(df/2)/L1 and K2_str=(df/2)/L2, respectively.

Doing as described above, however, tends to cause K1_str or K2_str to become excessive when L1 or L2 is small and to cause the overall feedback loop gain of the actual vehicle 1 based on the state amount errors γerr and βerr to become excessive, frequently resulting in an oscillation of a control system or the like.

In the present embodiment, therefore, K1_str and K2_str are determined according to the following expressions 26a and 26b.

$$K1\_str=(df/2)/\max(L1,Lmin) \quad \text{Expression 26a}$$

$$K2\_str=(df/2)/\max(L2,Lmin) \quad \text{Expression 26b}$$

where, in expression 26a and expression 26b, max(a,b)(a and b denote general variables) denotes a function outputting a value of the variable a or b, whichever is larger, and Lmin denotes a positive constant that is smaller than df/2. This has prevented K1_str and K2_str from becoming excessive. In other words, according to the present embodiment, (df/2)/Lmin(>1) is defined as the upper limit value of K1_str and K2_str, and K1_str and K2_str are set at the upper limit value or less on the basis of the actual front wheel steering angle δf_act.

In the present embodiment, since the rear wheels W3 and W4 are non-steering control wheels, so that K3_str=K4_str=1, as described above. If, however, the rear wheels W3 and W4 are steering control wheels, then K3_str and K4_str are desirably set on the basis of the actual rear wheel steering angle δr_act in the same manner as that for setting K1_str and K2_str on the basis of the actual front wheel steering angle δf_act as described above.

Subsequently, the actuator operation FB target value distribution processor 222 determines the n-th wheel distribution gain Kn in the processor 222c_n(n=1, 2, 3, 4) on the basis of the actual front wheel side slip angle βf_act (current time value) or the actual rear wheel side slip angle βr_act (current time value). This Kn is a correction coefficient (a positive value that is smaller than 1) for correcting Fxfullfbdmd_n by multiplying the n-th wheel driving/braking force full required value Fxfullfbdmd_n by Kn.

In this case, the n-th wheel distribution gain Kn is determined as described below in each processor 222c_n.

A first wheel distribution gain K1 and a third wheel distribution gain K3 related to the first wheel W1 and the third wheel W3, which are longitudinally disposed on the left side of the actual vehicle 1, are determined such that the gains virtually continuously change on the basis of βf_act and βr_act, as shown by the solid-line graphs in FIGS. 14(a) and (b), respectively. Further, a second wheel distribution gain K2 and a fourth wheel distribution gain K4 related to the second wheel W2 and the fourth wheel W4, which are longitudinally disposed on the right side of the actual vehicle 1, are determined such that the gains virtually continuously change on the basis of βf_act and βr_act, as shown by the dashed-line graphs in FIGS. 14(a) and (b), respectively. Incidentally, any one value of Kn is a positive value that is smaller than 1. Further, "virtually continuously" means that a jump (quantization) of a value that inevitably occurs when an analog quantity is expressed in terms of a discrete system does not impair the continuity of the analog quantity.

In this case, more specifically, regarding the first wheel distribution gain K1 and the third wheel distribution gain K3, K1 is determined on the basis of a value of βf_act such that it monotonously increases from a predetermined lower limit value to a predetermined upper limit value as βf_act increases from a negative value to a positive value, as shown by the solid-line graph in FIG. 14($a$). Hence, K1 is determined such that, when βf_act takes a positive value, it takes a larger value than that when βf_act takes a negative value.

Meanwhile, K3 is determined on the basis of a value of βr_act such that it monotonously decreases from a predetermined upper limit value to a predetermined lower limit value as βr_act increases from a negative value to a positive value, as shown by the solid-line graph in FIG. 14($b$). Hence, K3 is determined such that, when βr_act takes a negative value, it takes a larger value than that when βr_act takes a positive value.

The solid-line graphs in FIGS. 14($a$) and ($b$) are set such that the sum of the values of K1 and K3 corresponding to βf_act and βr_act becomes substantially one when βf_act and βr_act agree or substantially agree with each other.

Further, regarding the second wheel distribution gain K2 and the fourth wheel distribution gain K4, K2 is determined on the basis of a value of βf_act such that it monotonously decreases from a predetermined upper limit value to a predetermined lower limit value as βf_act increases from a negative value to a positive value, as shown by the dashed-line graph in FIG. 14($a$). In this case, the dashed-line graph indicating a relationship between K2 and βf_act is identical to the graph obtained by laterally reversing the solid-line graph indicating a relationship between K1 and βf_act around the axis of ordinates (the line of βf_act=0). Hence, the value of K2 at each value of βf_act is determined such that it is equal to the value of K1 at the value obtained by reversing the positive/negative of βf_act.

Further, K4 is determined on the basis of a value of βr_act such that it monotonously increases from a predetermined lower limit value to a predetermined upper limit value as βr_act increases from a negative value to a positive value, as shown by the dashed-line graph in FIG. 14($b$). In this case, the dashed-line graph indicating the relationship between K4 and βr_act is identical to a graph obtained by laterally reversing the solid-line graph indicating the relationship between K3 and βr_act around the axis of ordinates (the line of βr_act=0). Hence, the value of K4 at each value of βr_act is determined such that it is equal to the value of K3 at the value obtained by reversing the positive/negative of βr_act.

By determining the n-th wheel distribution gain Kn(n=1, 2, 3, 4) as described above, in a situation wherein βf_act and βr_act take virtually the same value, such as when the actual vehicle 1 is in a normal traveling mode, the ratio of the first wheel distribution gain K1 corresponding to the front wheel W1 to the third wheel distribution gain K2 corresponding to the rear wheel W3 right behind the front wheel W1 will monotonously change as βf_act and βr_act change while maintaining the sum of K1 and K3 to be substantially constant. Similarly, the ratio of the second wheel distribution gain K2 corresponding to the front wheel W2 to the fourth wheel distribution gain K4 corresponding to the rear wheel W4 right behind the front wheel W2 will monotonously change as βf_act and βr_act change while maintaining the sum of K2 and K4 to be substantially constant.

The reason for determining the n-th wheel distribution gain Kn(n=1, 2, 3, 4) on the basis of βf_act and βr_act as described above will be discussed later.

Supplementally, in the present embodiment, βf_act and βr_act are used as a front wheel gain adjustment parameter and a rear wheel adjustment parameter, and on the basis thereon, the n-th wheel distribution gain Kn is changed as described above. Thus, as will be described later, the front wheel gains GA1 and GA2 are changed on the basis of βf_act as the front wheel gain adjustment parameter, and the rear wheel gains GA3 and GA4 are changed on the basis of βr_act as the rear wheel gain adjustment parameter. In this case, βf_act has a meaning as a state amount related to lateral motions of the front wheels W1 and W2, and βr_act has a meaning as a state amount related to lateral motions of the rear wheels W3 and W4. To determine the n-th wheel distribution gain Kn(n=1, 2) related to the front wheels W1 and W2, respectively, βf_act detected or estimated for each of the front wheels W1 and W2 may be used; alternatively, however, βf_act detected or estimated on either one of the front wheels W1 or W2, or a mean value of βf_act detected or estimated for each of the front wheels W1 and W2 may be defined as a representative value of actual front wheel side slip angles, and both the distribution gains K1 and K2 may be determined on the basis of the representative value. This applies also when determining the distribution gains K3 and k4 related to the rear wheels W3 and W4.

After determining Kn_str and Kn(n=1, 2, 3, 4) as described above, the actuator operation FB target value distribution processor 222 multiplies each n-th wheel driving/braking force full required value Fxfullfbdmd_n (n=1, 2, 3, 4) by Kn_str and Kn by the processors 222$b\_n$ and 222$c\_n$, respectively, thereby determining the n-th wheel distribution driving/braking force basic value Fxfb_n. In other words, the n-th wheel distribution driving/braking force basic values Fxfb_n (n=1, 2, 3, 4) are determined according to the following expressions 27a to 27d.

$$Fxfb\_1 = Fxfullfbdmd\_1 \cdot K1\_str \cdot K1 \qquad \text{Expression 27a}$$

$$Fxfb\_2 = Fxfullfbdmd\_2 \cdot K2\_str \cdot K2 \qquad \text{Expression 27b}$$

$$Fxfb\_3 = Fxfullfbdmd\_3 \cdot K3\_str \cdot K3 \qquad \text{Expression 27c}$$

$$Fxfb\_4 = Fxfullfbdmd\_4 \cdot K4\_str \cdot K4 \qquad \text{Expression 27d}$$

When Fxfb_n(n=1, 2, 3, 4) is determined as described above, if Mfbdmd_a>0, then Fxfb_1 and Fxfb_3 associated with the left wheels W1 and W3 provide a driving/braking force in a braking direction (a negative driving/braking force), while Fxfb_2 and Fxfb_4 associated with the right wheels W2 and W4 provide a driving/braking force in a driving direction (a positive driving/braking force). Further, if Mfbdmd_a<0, then Fxfb_1 and Fxfb_3 associated with the left wheels W1 and W3 provide a driving/braking force in the driving direction (a positive driving/braking force), while Fxfb_2 and Fxfb_4 associated with the right wheels W2 and W4 provide a driving/braking force in the braking direction (a negative driving/braking force). Further, any one of the n-th wheel distribution driving/braking force basic value Fxfb_n will be proportional to Mfbdmd_a.

Subsequently, the actuator operation FB target value distribution processor 222 passes the n-th wheel distribution driving/braking force basic value Fxfb_n(n=1, 2, 3, 4), which has been determined as described above, through a limiter 222$d\_n$ associated with each n-th wheel Wn thereby to determine respective FB target n-th wheel brake driving/braking force Fxfbdmd_n, which is the feedback target value of the driving/braking force of the n-th wheel Wn by an operation of the braking device of the driving/braking device 3A.

Here, the graphs of the limiters 222d_n(n=1, 2, 3, 4) in FIG. 12 are graphs illustrating the relationships between Fxfb_n and Fxfbdmd_n, the values in the direction of the axis of abscissas related to the graphs indicating the values of Fxfb_n, while the values in the direction of the axis of ordinates indicating the values of Fxfbdmd_n.

The limiter 222d_n outputs Fxfb_n directly as Fxfbdmd_n without processing it only if the value of Fxfb_n input thereto is zero or a negative value, and if Fxfb_n takes a positive value, then the value of Fxfbdmd_n to be output independently of a value of Fxfb_n is set to zero. In other words, Fxfbdmd_n is determined by limiting Fxfb_n with zero being an upper limit value.

The FB target n-th wheel brake driving/braking force Fxfbdmd_n is respectively determined as described above so as to increase the driving/braking forces of the left wheels W1 and W3 of the actual vehicle 1 in the braking direction (to set Fxfbdmd_1<0 and Fxfbdmd_3<0) if Mfbdmd_a>0, as described above, thereby to determine the FB target n-th wheel brake driving/braking force Fxfbdmd_n(n=1, 2, 3, 4) such that Mfbdmd_a is generated about the center-of-gravity point G of the actual vehicle 1. In this case, for the right wheels W2 and W4, Fxfbdmd_2=Fxfbdmd_4=0 in the present embodiment.

Further, Fxfbdmd_1 and Fxfbdmd_3 related to the left wheels W1 and W3 in this case are equal to Fxfb_1 and Fxfb_3 determined according to the aforesaid expressions 27a and 27c, respectively. Therefore, Fxfbdmd_1 and Fxfbdmd_3 related to the left wheels W1 and W3 in the case where Mfbdmd_a>0 are respectively proportional to Mfbdmd_a. Consequently, the relationship between changes in Mfbdmd_a and changes in Fxfbdmd_1 and Fxfbdmd_3 will be a proportional relationship. Further, in this case, as is obvious from the expression 24a and expression 27a, the front wheel gain GA1 related to the front wheel W1 is proportional to K1, because GA1=−(2/df)·K1_str·K1. And, this K1 is determined such that it changes on the basis of the actual front wheel side slip angle $\beta f\_act$ as the front wheel gain adjustment parameter, as described above, so that the front wheel gain GA1 will also change on the basis of $\beta f\_act$. Hence, Fxfbdmd_1 is determined such that the relationship between changes in Mfbdmd_a and changes in Fxfbdmd_1 will be a proportional relationship and that the front wheel gain GA1 in the proportional relationship changes on the basis of $\beta f\_act$ used as the front wheel gain adjustment parameter. Similarly, as is obvious from the expression 24c and expression 27c, the rear wheel gain GA3 related to the rear wheel W3 is proportional to K3, because GA3=−(2/dr)·K3_str·K3. And, this K3 is determined such that it changes on the basis of the actual rear wheel side slip angle $\beta r\_act$ serving as the rear wheel gain adjustment parameter, as described above, so that the rear wheel gain GA3 will also change on the basis of $\beta r\_act$. Hence, Fxfbdmd_3 is determined such that the relationship between changes in Mfbdmd_a and changes in Fxfbdmd_3 will be a proportional relationship and that the rear wheel gain GA3 in the proportional relationship changes on the basis of $\beta r\_act$ serving as the rear wheel gain adjustment parameter.

Further, the driving/braking forces of the right wheels W2 and W4 of the actual vehicle 1 are increased in the braking direction (to set Fxfbdmd_2<0 and Fxfbdmd_4<0) if Mfbdmd_a<0, thereby determining the FB target n-th wheel brake driving/braking force Fxfbdmd_n(n=1, 2, 3, 4) such that Mfbdmd_a is generated about the center-of-gravity point G of the actual vehicle 1. In this case, for the left wheels W1 and W3, Fxfbdmd_1=Fxfbdmd_3=0 in the present embodiment.

Further, Fxfbdmd_2 and Fxfbdmd_4 related to the right wheels W2 and W4 in this case are equal to Fxfb_2 and Fxfb_4 determined according to the expressions 27b and 27d, respectively. Therefore, Fxfbdmd_2 and Fxfbdmd_4 related to the right wheels W2 and W4 in the case where Mfbdmd_a<0 are respectively proportional to Mfbdmd_a. Furthermore, the relationship between changes in Mfbdmd_a and changes in Fxfbdmd_2 and Fxfbdmd_4 will be a proportional relationship. Further, in this case, as is obvious from the expression 24b and the expression 27b, the front wheel gain GA2 related to the front wheel W2 is proportional to K2, because GA2=(2/df)·K2_str·K2. And, this K2 is determined such that it changes on the basis of the actual front wheel side slip angle $\beta f\_act$ as the front wheel gain adjustment parameter, as described above, so that the front wheel gain GA2 will also change on the basis of $\beta f\_act$. Hence, Fxfbdmd_2 is determined such that the relationship between changes in Mfbdmd_a and changes in Fxfbdmd_2 will be a proportional relationship and that the front wheel gain GA2 in the proportional relationship changes on the basis of $\beta f\_act$ serving as the front wheel gain adjustment parameter. Similarly, as is obvious from the expression 24d and the expression 27d, the rear wheel gain GA4 related to the rear wheel W4 is proportional to K4, because GA4=(2/dr) K4_str·K4. And, this K4 is determined such that it changes on the basis of the actual rear wheel side slip angle $\beta r\_act$ serving as the rear wheel gain adjustment parameter, as described above, so that the rear wheel gain GA4 will also change on the basis of $\beta r\_act$. Hence, Fxfbdmd_4 is determined such that the relationship between changes in Mfbdmd_a and changes in Fxfbdmd_4 will be a proportional relationship and that the rear wheel gain GA4 in the proportional relationship changes on the basis of $\beta r\_act$ serving as the rear wheel gain adjustment parameter.

In either case, the n-th wheel distribution gain Kn(n=1, 2, 3, 4) is determined such that it virtually continuously changes according to $\beta f\_act$ or $\beta r\_act$, thus preventing a situation wherein Fxfbdmd_n discontinuously changes.

In a situation wherein $\beta f\_act$ and $\beta r\_act$ take substantially the same value, as in the case where the actual vehicle 1 is in a normal traveling mode when Mfbdmd_a>0, the ratio of the first wheel distribution gain K1 and the third wheel distribution gain K2 associated with the front wheel W1 and the rear wheel W3 on the left side and also a front-to-rear wheel ratio, which is a ratio of the front wheel gain GA1 to the rear wheel gain GA3, monotonously change in response to changes in the values of $\beta f\_act$ and $\beta r\_act$. Similarly, in a situation wherein $\beta f\_act$ and $\beta r\_act$ take substantially the same value, as in the case where the actual vehicle 1 is in the normal traveling mode when Mfbdmd_a<0, the ratio of the second wheel distribution gain K2 and the fourth wheel distribution gain K4 associated with the front wheel W2 and the rear wheel W4 on the right side and also a front-to-rear wheel ratio, which is a ratio of the front wheel gain GA2 to the rear wheel gain GA4, monotonously change in response to changes in the values of $\beta f\_act$ and $\beta r\_act$.

Here, the following will explain the reason for determining the n-th wheel distribution gain Kn(n=1, 2, 3, 4) on the basis of $\beta f\_act$ and $\beta r\_act$ in the tendency described above.

First, if Mfbdmd_a>0, then the FB target n-th wheel brake driving/braking force Fxfbdmd_n is determined such that the driving/braking forces of the first wheel W1 and the third wheel W3, which are the left wheels of the actual vehicle 1, are increased in the braking direction, as described above.

In this case, a situation wherein $\beta f\_act$<0 and r_act<0 is assumed. In such a situation, if it is assumed that K1 is set to a slightly larger value (to cause Fxfbdmd_1 to increase in the braking direction) and K3 is set to a slightly smaller value (to restrain Fxfbdmd_3 from increasing in the braking direction), then the lateral force of the first wheel W1 (this functions to generate a moment in the same direction as Mfbdmd_a about the center-of-gravity point of the actual vehicle 1) decreases, whereas the lateral force of the third wheel W3 (this functions to generate a moment in the opposite direction from Mfbdmd_a about the center-of-gravity point of the actual vehicle 1) slightly increases. For this reason, there is a danger that it becomes difficult to adequately generate a moment in the positive direction (a moment about the yaw axis) required by Mfbdmd_a about the center-of-gravity point G of the actual vehicle 1. Hence, it has been decided to determine the first wheel distribution gain K1 to be a slightly smaller value and to determine the third wheel distribution gain K3 to be a slightly larger value in the situation wherein βf_act<0 and βr_act<0.

Another situation wherein βf_act>0 and βr_act>0 when Mfbdmd_a>0 will be assumed. In such a situation, if it is assumed that K1 is set to a slightly smaller value (consequently to restrain Fxfbdmd_1 from increasing in the braking direction) and K3 is set to a slightly larger value (consequently to cause Fxfbdmd_3 to increase in the braking direction), then the lateral force of the first wheel W1 (this functions to generate a moment in the opposite direction from Mfbdmd_a about the center-of-gravity point of the actual vehicle 1) slightly increases, whereas the lateral force of the third wheel W3 (this functions to generate a moment in the same direction as Mfbdmd_a about the center-of-gravity point of the actual vehicle 1) decreases. For this reason, there is a danger that it becomes difficult to adequately generate a moment in the positive direction (a moment about the yaw axis) required by Mfbdmd_a about the center-of-gravity point G of the actual vehicle 1. Hence, it has been decided to determine the first wheel distribution gain K1 to be a slightly larger value and to determine the third wheel distribution gain K3 to be a slightly smaller value in the situation wherein βf_act>0 and βr_act>0.

If Mfbdmd_a<0, then the FB target n-th brake driving/braking force Fxfbdmd_n is determined such that the driving/braking forces of the second wheel W2 and the fourth wheel W4, which are the right wheels of the actual vehicle 1, are increased in the braking direction, as described above.

In this case, a situation wherein βf_act<0 and βr_act<0 is assumed. In such a situation, if it is assumed that K2 is set to a slightly smaller value (to consequently restrain Fxfbdmd_2 from increasing in the braking direction) and K4 is set to a slightly larger value (to consequently cause Fxfbdmd_4 to increase in the braking direction), then the lateral force of the second wheel W2 (this functions to generate a moment in the opposite direction from Mfbdmd_a about the center-of-gravity point of the actual vehicle 1) increases, whereas the lateral force of the fourth wheel W4 (this functions to generate a moment in the same direction as Mfbdmd_a about the center-of-gravity point of the actual vehicle 1) decreases. For this reason, there is a danger that it becomes difficult to adequately generate a moment in the negative direction (a moment about the yaw axis) required by Mfbdmd_a about the center-of-gravity point G of the actual vehicle 1. Hence, it has been decided to determine the second wheel distribution gain K2 to be a slightly larger value and to determine the fourth wheel distribution gain K4 to be a slightly smaller value in the situation wherein βf_act<0 and βr_act<0.

Another situation wherein βf_act>0 and βr_act>0 when Mfbdmd_a<0 will be assumed. In such a situation, if it is assumed that K2 is set to a slightly larger value (consequently to cause Fxfbdmd_2 to increase in the braking direction) and K4 is set to a slightly smaller value (consequently to restrain Fxfbdmd_4 from increasing in the braking direction), then the lateral force of the second wheel W2 (this functions to generate a moment in the same direction as Mfbdmd_a about the center-of-gravity point of the actual vehicle 1) decreases, whereas the lateral force of the fourth wheel W4 (this functions to generate a moment in the opposite direction from Mfbdmd_a about the center-of-gravity point of the actual vehicle 1) increases. For this reason, there is a danger that it becomes difficult to adequately generate a moment in the negative direction (a moment about the yaw axis) required by Mfbdmd_a about the center-of-gravity point G of the actual vehicle 1. Hence, it has been decided to determine the second wheel distribution gain K2 to be a slightly smaller value and to determine the fourth wheel distribution gain K4 to be a slightly larger value in the situation wherein βf_act>0 and βr_act>0.

Thus, determining the n-th wheel distribution gain Kn(n=1, 2, 3, 4) as described above makes it possible to prevent a lateral force that becomes an obstacle in generating a moment of Mfbdmd_a in the yaw direction about the center-of-gravity point G of the actual vehicle 1 from becoming excessive while at the same time preventing a lateral force that is effective in generating a moment of Mfbdmd_a in the yaw direction about the center-of-gravity point G of the actual vehicle 1 from becoming too small.

Moreover, by determining the n-th distribution gain Kn(n=1, 2, 3, 4) as described above, the sum of a value of K1 and a value of K3 and the sum of a value of K2 and a value of K4, respectively, become substantially one in a situation wherein βf_act and βr_act agree or substantially agree with each other, as in the case where the actual vehicle 1 is in a normal circular turn mode or a normal straight travel mode. This means that if the braking device of the driving/braking device 3A is operated faithfully in accordance with the FB target n-th wheel brake driving/braking force Fxfbdmd_n, then the gain of a transfer function from Mfbdmd_a to a moment (a moment in the yaw direction) actually generated about the center-of-gravity point G of the actual vehicle 1 becomes substantially one (a moment in the yaw direction actually generated becomes substantially equal to Mfbdmd_a).

Supplementally, there is a case where the difference between βf_act and βr_act increases in a transient motion situation or the like of the actual vehicle 1. And, in this case, the sum of a value of K1 and a value of K3 and the sum of a value of K2 and a value of K4, respectively, considerably deviate from one. To solve this problem, preferably, after the values of K1 and K3 are determined as described above, the values of K1 and K3 are corrected while maintaining the ratio of the values at a constant level such that the sum of the corrected values of K1 and K3 becomes substantially one or becomes closer to one than the sum of the values of K1 and K3 before the correction. Similarly, it is preferred that, after the values of K2 and K4 are determined as described above, the values of K2 and K4 are corrected while maintaining the ratio of the values at a constant level such that the sum of the corrected values of K2 and K4 becomes substantially one or becomes closer to one than the sum of the values of K2 and K4 before the correction. To be more specific, for example, after the n-th distribution gain Kn(n=1, 2, 3, 4) is determined according to the graphs of FIGS. 14(a) and (b), K1', K2', K3' and K4' are determined by K1'=K1/(K1+K3), K3'=K3/(K1+K3), K2'=K2/(K2+K4), and K4'=K4/(K2+K4). Then, K1', K2', K3' and K4' may be respectively re-determined as the values of K1, K2, K3 and K4.

In this example, the sum of K1 and K3 and the sum of K2 and K4 are always maintained at one; however, the sums do not have to always agree with one. Alternatively, the values of K1 to K4 may be corrected such that the sums take values within a range in the vicinity of one. Alternatively, K1 to K4 may be corrected such that the sum of K1 and k3 and the sum of K2 and K4 approach further to one.

Further, in addition to determining the FB target n-th wheel brake driving/braking force Fxfbdmd_n as described above, the actuator operation FB target value distribution processor 222 according to the present embodiment inputs the feedback yaw moment required value Mfbdmd to a processor 222e so as to determine, by the processor 222e, an active steering FB target lateral force Fyfbdmd_f, which is a feedback target value of the lateral force of the front wheels W1 and W2 by an operation of the steering device 3B. The graph of the processor 222e in the figure is a graph illustrating a relationship between Mfbdmd and Fyfbdmd_f, the values in the direction of the axis of abscissas related to the graph indicating the values of Mfbdmd, while the values in the direction of the axis of ordinates indicating the values of Fyfbdmd_f. As shown in the graph, the processor 222e basically determines Fyfbdmd_f such that Fyfbdmd_f monotonously increases as Mfbdmd increases. In this case, Fyfbdmd_f is determined by using, for example, a map, from a value of Mfbdmd supplied to the processor 222e.

Alternatively, Fyfbdmd_f may be determined by multiplying Mfbdmd by a predetermined gain. Further, Fyfbdmd_f may be determined on the basis of Mfbdmd within a range between a predetermined upper limit value (>0) and a predetermined lower limit value (<0).

Supplementally, the processing by the processor 222e may be omitted regardless of whether the steering device 3B is an active steering device or a mechanical steering device. When determining the active steering FB target lateral force Fyfbdmd_f by the processing of the processor 222e and manipulating the operation of the steering device 3B on the basis of the determined Fyfbdmd_f, it is further preferable to determine Fxfbdmd_n(n=1, 2, 3, 4) and Fyfbdmd_f such that the sum of a moment in the yaw direction to be generated about the center-of-gravity point G of the actual vehicle 1 by the FB target n-th wheel brake driving/braking force Fxfbdmd_n (n=1, 2, 3, 4) and a moment in the yaw direction generated about the center-of-gravity point G of the actual vehicle 1 by the active steering FB target lateral force Fyfbdmd_f is substantially equal to the aforesaid feedback yaw moment basic required value Mfbdmd. For example, the active steering FB target lateral force Fyfbdmd_f may be determined on the basis of a difference between Mfbdmd and Mfbdmd_a. In this case, it is desirable to determine Fyfbdmd_f such that a moment in the yaw direction that is substantially equal to Mfbdmd is generated about the center-of-gravity point G of the actual vehicle 1 by Fyfbdmd_f when Mfbdmd_a=0.

The above has explained the details of the processing by the actuator operation FB target value determiner 20b in the present embodiment. This processing determines the FB target n-th wheel brake driving/braking force Fxfbdmd_n(n=1, 2, 3, 4) or Fxfbdmd_n(n=1, 2, 3, 4) and the active steering FB target lateral force Fyfbdmd_f as the actuator operation FB target value such that Mfbdmd is approximated to zero (consequently to approximate the state amount errors γerr and βerr to zero), as described above.

Supplementally, the FB target n-th wheel brake driving/braking force Fxfbdmd_n(n=1, 2, 3, 4) of the actuator operation FB target value determined by the actuator operation FB target value determiner 20b as described above corresponds to a feedback control input in the present invention.

The limiter $222d\_n$(n=1, 2, 3, 4) may output, as Fxfbdmd_n, a value obtained by limiting Fxfb_n input thereto to not more than a predetermined positive upper limit value, which is slightly larger than zero. For example, if Fxfb_n is a value that is the upper limit value or less, then Fxfb_n is directly output as Fxfbdmd_n without processing it, or if Fxfb_n takes a positive value that is larger than the upper limit value, then the upper limit value is output as Fxfbdmd_n. In this case, Fxfbdmd_n of a positive value provides a feedback control input that functions to decrease the magnitude of the driving/braking force of the n-th wheel Wn in the braking direction by the braking device.

Further, for each wheel Wn(n=1, 2, 3, 4), the processing from the processor $222a\_n$ to the limiter $222d\_n$ (the processing for determining Fxfbdmd_n on the basis of Mfbdmd_a and δf_act or δr_act and βf_act or βr_act), or the processing from the processor 222b-n to the limiter $222d\_n$ (the processing for determining Fxfbdmd_n on the basis of Fxfullfbdmd_n and δf_act or δr_act and βf_act or βr_act), or the processing from the processor $222c\_n$ to the limiter $222d\_n$ (the processing for determining Fxfbdmd_n on the basis of an output of the processor $222b\_n$ and βf_act or βr_act), or the processing that combines two or more portions of the processing from the processor 222a-n to the limiter $222d\_n$ (e.g., the processing from the processor $222b\_n$ to the processor $222c\_n$) may be changed to determine an output by using a map or a function expression from input values necessary for such processing.

For instance, to carry out the processing from the processor $222c\_n$ to the limiter $222d\_n$ by using a map, a map for the first wheel may be set as shown in, for example, FIGS. 15(a) to (e), and a map for the third wheel may be set as shown in, for example, FIGS. 16(a) to (e). In this case, the graphs in FIGS. 15(a) to (e), respectively, show the relationships between outputs of the processor $222b\_1$ (=Fxfullfbdmd_1·K1_str) and Fxfbdmd_1 in association with a plurality of representative types of values of βf_act, the individual values being shown in terms of the values in the direction of the axis of abscissas of the graphs and the values in the direction of the axis of ordinates. Further, the graphs in FIGS. 16(a) to (e), respectively, show the relationships between outputs of the processor $222b\_3$ (=Fxfullfbdmd_3·K3_str) and Fxfbdmd_3 in association with a plurality of representative types of values of βr_act, the individual values being shown in terms of the values in the direction of the axis of abscissas of the graphs and the values in the direction of the axis of ordinates. In FIG. 15, regarding the values of βf_act, "βf--" means a negative value having a relatively large absolute value, "βf-" means a negative value having a relatively small absolute value, "βf+" means a positive value having a relatively small absolute value, and "βf++" means a positive value having a relatively large absolute value. Similarly, in FIG. 16, regarding the values of βr_act, "βr--" means a negative value having a relatively large absolute value, "βr-" means a negative value having a relatively small absolute value, "βr+" means a positive value having a relatively small absolute value, and "βr++" means a positive value having a relatively large absolute value.

Although not shown, a map for the second wheel may be set such that the relationship between outputs of the processor $222b\_2$ (=Fxfullfbdmd_2·K2_str) and Fxfbdmd_2 will be the same at each value of βf_act as that in the map for the first wheel associated with the values obtained by reversing the signs of the values (e.g., the relationship between an output of the processor $222b\_2$ when βf_act=βf- (=Fxfullfbdmd_2·K2_str) and Fxfbdmd_2 will be the same as the relationship between an output of the processor $222b\_1$ when βf_act=βf+ and Fxfbdmd_1 (the relationship shown by the graph of FIG. 15(c))). Similarly, although not shown, a map for the fourth wheel may be set such that the relationship between outputs of the processor $222b\_4$ (=Fxfullfbdmd_4·K4_str) and Fxfbdmd_4 will be the same at each value of $\beta r\_act$ as that in the map for the third wheel associated with the values obtained by reversing the signs of the values (e.g., the relationship between an output of the processor $222b\_4$ when $\beta r\_act=\beta r-$ (=Fxfullfbdmd_4·K4_str) and Fxfbdmd_4 will be the same as the relationship between an output of the processor $222b\_3$ when $\beta r\_act=\beta r+$ and Fxfbdmd_3 (the relationship shown by the graph of FIG. 16(*c*))).

In this example, if an output of the processor $222b\_n$(n=1, 2, 3, 4) is a value of zero or less, then Fxfbdmd_n is determined in the same manner as that shown in FIG. 12 described above. Meanwhile, if an output of the processor $222b\_n$(n=1, 2, 3, 4) is a positive value, then Fxfbdmd_n takes a positive value within a range of relatively small values as with the case where the upper limit value in the limiter $222d\_n$ is set to a positive value as described above.

Supplementally, both the processors $222b\__3$ and $222b\_4$ associated with the third wheel W3 and the fourth wheel W4 share the same input values and output values; therefore, carrying out the processing from the processor $222c\_3$ to the limiter $222d\__3$ and the processing from the processor $222c\_4$ to the limiter $222d\_4$ on the third wheel W3 and the fourth wheel W4 by using the maps as described above is equivalent to carrying out the processing from the processor $222b\__3$ to the limiter $222d\__3$ and the processing from the processor $222b\_4$ to the limiter $222d\_4$ by using the maps.

Further, as the front wheel gain adjustment parameter for determining (whereby to manipulate the front wheel gains GA1 and GA2) the n-th wheel distribution gain Kn (n=1, 2) related to the front wheels W1 and W2, the following may be used besides $\beta f\_act$.

For example, in place of $\beta f\_act$, the detected values or the estimated values of the side slip velocities of the front wheels W1 and W2 of the actual vehicle 1 (components in the direction of the rotational axes of the front wheels W1 and W2 in the advancing velocity vectors of the front wheels W1 and W2) or the detected values or the estimated values of the lateral accelerations of the front wheels W1 and W2 (lateral components of the acceleration vectors of the front wheels W1 and W2) may be used as the front wheel gain adjustment parameters. Incidentally, the side slip velocities or the lateral accelerations of the front wheels W1 and W2 are examples of the state amounts related to lateral motions of the front wheels W1 and W2, as with $\beta f\_act$. These side slip velocities and the lateral accelerations may be the detected values or the estimated values of each of the front wheels W1 and W2; alternatively, however, the means values thereof or the detected values or the estimated values of either one of the front wheels W1 and W2 may be used.

Alternatively, a detected value or an estimated value of an actual side slip angle at a predetermined position of a front portion of the actual vehicle 1 (e.g., a central position on the axle of the front wheels W1 and W2), or a detected value or an estimated value of the side slip velocity at the predetermined position (a lateral component of the advancing velocity vector at the predetermined position), or a detected value or an estimated value of the lateral acceleration at the predetermined position (a lateral component of the acceleration vector at the predetermined position) may be used as the front wheel gain adjustment parameter. The side slip angle, the side slip velocity, and the lateral acceleration at the predetermined position are examples of the state amounts related to a lateral motion at the predetermined position.

Alternatively, the detected values or the estimated values of the lateral forces of the front wheels W1 and W2 may be used as the front wheel gain adjustment parameters. The lateral forces may take a detected value or an estimated value for each of the front wheels W1 and W2 or may take a mean value thereof or a detected value or an estimated value on either one of the front wheels W1 and W2.

Regardless of which of the aforesaid front wheel gain adjustment parameters may be used, the relationship between a front wheel gain adjustment parameter and the n-th wheel distribution gain Kn (n=1, 2) may be set in the same manner as that for the relationship between $\beta f\_act$ and K1, K2.

Alternatively, a parameter having correlativity with one of the state amounts (such as $\beta f\_act$) related to the lateral motions of the front wheels W1 and W2 of the actual vehicle 1 as described above, a state amount related to a lateral motion at a predetermined position of a front portion of the actual vehicle 1, and the lateral forces of the front wheels W1 and W2 may be used as a front wheel gain adjustment parameter. For instance, any parameter that is substantially proportional to a state amount related to the lateral motion or a detected value or an estimated value of a lateral force may be used as a front wheel gain adjustment parameter. Further, a state amount related to the lateral motion or one or more parameters that define the value of a lateral force may be used as the front wheel gain adjustment parameters. For example, $\beta f\_act$ is basically defined on the basis of the actual vehicle center-of-gravity point side slip angle pact, the actual yaw rate $\gamma act$, the actual traveling velocity Vact, and the actual front wheel steering angle $\delta f\_act$ (refer to the expression 02a), and $\beta f\_act$ can be expressed as a function of $\beta act$, $\gamma act$, Vact, and $\delta f\_act$. Accordingly, these $\beta act$, $\gamma act$, Vact, and $\delta f\_act$ may be used as the front wheel gain adjustment parameters in order to determine the n-th wheel distribution gain Kn(n=1, 2) associated with the front wheels W1 and W2 according to a map or a function expression on the basis of the aforesaid front wheel gain adjustment parameters. More specifically, for example, the aforesaid relationship between $\beta f\_act$ and the first wheel distribution gain K1 and the second wheel distribution gain K2 (the relationship shown by the graph in FIG. 14(*a*) described above) is converted beforehand into a relationship between $\beta act$, $\gamma act$, Vact and $\delta f\_act$ and K1 and K2 on the basis of an expression which has replaced $\beta f\_d$, $\beta d$, $\gamma d$, Vd and $\delta f\_d$ of the expression 02a related to the model vehicle by $\beta f\_act$, $\beta act$, $\gamma act$, Vact and $\delta f\_act$, respectively. Then, based on the relationship obtained by the conversion, K1 and K2 may be determined according to $\beta act$, $\gamma act$, Vact and $\delta f\_act$.

Similarly to the above, the following may be used besides $3r$ act as a rear wheel gain adjustment parameter for determining (so as to manipulate the rear wheel gains GA3 and GA4) the n-th wheel distribution gain Kn(n=3, 4) associated with the rear wheels W3 and W4.

For example, in place of $\beta r\_act$, the detected values or the estimated values of the side slip velocities of the rear wheels W3 and W4 of the actual vehicle 1 (components in the direction of the rotational axes of the rear wheels W3 and W4 in the advancing velocity vectors of the rear wheels W3 and W4) or the detected values or the estimated values of the lateral accelerations of the rear wheels W3 and W4 (lateral components of the acceleration vectors of the rear wheels W3 and W4) may be used as the rear wheel gain adjustment parameters. Incidentally, the side slip velocities or the lateral accelerations of the rear wheels W3 and W4 are examples of the state amounts related to lateral motions of the rear wheels W3 and W4, as with $\beta r\_act$. These side slip velocities and the lateral accelerations may be a detected value or an estimated value of each of the rear wheels W3 and W4; alternatively, however, a means value thereof or a detected value or an estimated value of either one of the rear wheels W3 and W4 may be used.

Alternatively, a detected value or an estimated value of a side slip angle at a predetermined position of a rear portion of the actual vehicle 1 (e.g., a central position on the axle of the rear wheels W3 and W4), or a detected value or an estimated value of a side slip velocity at the predetermined position (a lateral component of the advancing velocity vector at the predetermined position), or a detected value or an estimated value of a lateral acceleration at the predetermined position (a lateral component of the acceleration vector at the predetermined position) may be used as the rear wheel gain adjustment parameter. The side slip angle, the side slip velocity, and the lateral acceleration at the predetermined position are examples of the state amounts related to a lateral motion at the predetermined position.

Alternatively, the detected values or the estimated values of the lateral forces of the rear wheels W3 and W4 of the actual vehicle 1 may be used as the rear wheel gain adjustment parameters. The lateral forces may take a detected value or an estimated value for each of the rear wheels W3 and W4 or may take a mean value thereof or a detected value or an estimated value on either one of the rear wheels W3 and W4.

Regardless of which of the aforesaid rear wheel gain adjustment parameters may be used, the relationship between the rear wheel gain adjustment parameter and the n-th wheel distribution gain Kn (n=3, 4) may be set in the same manner as that for the relationship between $\beta r\_act$ and K3, K4.

Alternatively, a parameter having correlativity with one of the state amounts (such as $\beta r\_act$) related to the lateral motions of the rear wheels W3 and W4 of the actual vehicle 1 as described above, a state amount related to a lateral motion at a predetermined position of a rear portion of the actual vehicle 1, and the lateral forces of the rear wheels W3 and W4 may be used as a rear wheel gain adjustment parameter. For instance, any parameter that is substantially proportional to a state amount related to the lateral motion or a detected value or an estimated value of a lateral force may be used as a rear wheel gain adjustment parameter. Further, a state amount related to the lateral motion or one or more parameters that define the value of a lateral force may be used as the rear wheel gain adjustment parameters. For example, $\beta r\_act$ is basically defined on the basis of the actual vehicle center-of-gravity point side slip angle βact, the actual yaw rate γact, and the actual traveling velocity Vact (refer to the aforesaid expression 02b), and $\beta r\_act$ can be expressed as a function of βact, γact, and Vact. Accordingly, these βact, γact, Vact may be used as the rear wheel gain adjustment parameters in order to determine the n-th wheel distribution gain Kn(n=3, 4) associated with the rear wheels W3 and W4 according to a map or a function expression on the basis of the rear wheel gain adjustment parameters. More specifically, for example, the aforesaid relationship between $\beta r\_act$ and the third wheel distribution gain K3 and the fourth wheel distribution gain K4 (the relationship shown by the graph in FIG. 14(b) described above) is converted beforehand into a relationship between βact, γact, and Vact and K3 and K4 on the basis of an expression which has replaced $\beta r\_d$, $\beta d$, $\gamma d$, and Vd of the expression 02b related to the model vehicle by $\beta r\_act$, βact, γact, and Vact, respectively. Then, based on the relationship obtained by the conversion, K3 and K4 may be determined according to βact, γact, and Vact.

Further, instead of using the state amounts related to the lateral motions of the front wheels W1 and W2 of the actual vehicle 1, the state amount related to the lateral motion at the predetermined position of the front portion of the actual vehicle 1, the lateral forces of the front wheels W1 and W2 of the actual vehicle 1, and a parameter having correlativity with any one of these state amounts and the lateral forces as the front wheel gain adjustment parameters, as described above, the state amounts or lateral forces or parameters corresponding thereto in the model vehicle on the reference dynamic characteristics model 16 may be used as the front wheel gain adjustment parameters. For instance, $\beta f\_d$ of the model vehicle in place of $\beta f\_act$ may be used as the front wheel gain adjustment parameter to determine the first wheel distribution gain K1 and the second wheel distribution gain K2. Similarly, instead of using the state amounts related to the lateral motions of the rear wheels W3 and W4 of the actual vehicle 1, the state amount related to the lateral motion at the predetermined position of the rear portion of the actual vehicle 1, the lateral forces of the rear wheels W3 and W4 of the actual vehicle 1, and a parameter having correlativity with any one of these state amounts and the lateral forces as the rear wheel gain adjustment parameters, the state amounts or lateral forces or parameters corresponding thereto in the model vehicle on the reference dynamic characteristics model 16 may be used as the rear wheel gain adjustment parameters. For instance, $\beta r\_d$ of the model vehicle in place of $\beta r\_act$ may be used as the rear wheel gain adjustment parameter to determine the third wheel distribution gain K3 and the fourth wheel distribution gain K4.

Alternatively, a composite value of a state amount related to a lateral motion of the front wheels W1 and W2 or at a predetermined position of a front portion of the actual vehicle 1 and a state amount related to a lateral motion of the front wheel Wf or at a predetermined position of the front portion of the model vehicle (the same type of state amount as that of the state amount of the actual vehicle 1), or a composite value of a lateral force of the front wheels W1 and W2 of the actual vehicle 1 and a lateral force of the front wheel Wf of the model vehicle may be used as the front wheel gain adjustment parameter. Similarly, a composite value of a state amount related to a lateral motion of the rear wheels W3 and W4 or at a predetermined position of a rear portion of the actual vehicle 1, and a state amount related to a lateral motion of the rear wheel Wr or at a predetermined position of the rear portion of the model vehicle (the same type of state amount as that of the state amount of the actual vehicle 1), or a composite value of a lateral force of the rear wheels W3 and W4 of the actual vehicle 1 and a lateral force of the rear wheel Wr of the model vehicle may be used as the rear wheel gain adjustment parameter. For example, the first wheel distribution gain K1 and the second wheel distribution gain K2 may be determined on the basis of a weighted mean value of $\beta f\_act$ of the actual vehicle 1 and $\beta f\_d$ of the model vehicle, and the third wheel distribution gain K3 and the fourth wheel distribution gain K4 may be determined on the basis of a weighted mean value of $\beta r\_act$ of the actual vehicle 1 and $\beta r\_d$ of the model vehicle. In this case, the weights involved in the weighted mean values may be provided with a frequency characteristic (e.g., a frequency characteristic functioning as a phase compensating element).

Alternatively, the first temporary values of the respective n-th wheel distribution gains Kn(n=1, 2) related to the front wheels W1 and W2 may be determined on the basis of a state amount related to a lateral motion of the front wheels W1 and W2 or at a predetermined position of the front portion of the actual vehicle 1 or a lateral force of the front wheels W1 and W2 of the actual vehicle 1, and the second temporary values of the respective n-th wheel distribution gains Kn (n=1, 2) related to the front wheels W1 and W2 may be determined on the basis of a state amount related to a lateral motion of the front wheel Wf or at a predetermined position of the front portion of the model vehicle or a lateral force of the front wheel Wf of the model vehicle, and a composite value of the weighed mean value or the weighted mean values or the like of the first temporary values and the second temporary values may be determined as the n-th wheel distribution gain Kn(n=1, 2). For example, the first temporary value of K1 related to the first wheel W1 is determined on the basis of βf_act as indicated by the graph shown in FIG. 14(a) described above and the second temporary value of K1 is determined on the basis of βf_d in the same manner as that for the first temporary value. In this case, the tendency of changes in the second temporary value relative to βf_d may be the same as the tendency of changes in the first temporary value relative to βf_act. Then, a weighed mean value of these first temporary value and second temporary value is determined as the first wheel distribution gain K1. The same applies to the second wheel distribution gain K2.

Similarly, the first temporary values of the respective n-th wheel distribution gains Kn(n=3, 4) related to the rear wheels W3 and W4 may be determined on the basis of a state amount related to a lateral motion of the rear wheels W3 and W4 or at a predetermined position of the rear portion of the actual vehicle 1 or a lateral force of the rear wheels W3 and W4 of the actual vehicle 1, and the second temporary values of the n-th wheel distribution gains Kn(n=3, 4) related to the rear wheels W3 and W4 may be determined on the basis of a state amount related to a lateral motion of the rear wheel Wr or at a predetermined position of the rear portion of the model vehicle or a lateral force of the rear wheel Wr of the model vehicle, and a composite value of the weighed mean values or the weighted mean values or the like of the first temporary values and the second temporary values may be determined as the n-th wheel distribution gain Kn(n=3, 4). For example, the first temporary value of K3 related to the third wheel W3 is determined on the basis of βr_act as indicated by the graph shown in FIG. 14(b) described above and the second temporary value of K3 is determined on the basis of βr_d in the same manner as that for the first temporary value. In this case, the tendency of changes in the second temporary value relative to βr_d may be the same as the tendency of changes in the first temporary value relative to βr_act. Then, a weighed mean value of these first temporary value and second temporary value is determined as the third wheel distribution gain K3. The same applies to the fourth wheel distribution gain K4.

Further desirably, the value of the n-th wheel distribution gain Kn(n=1, 2, 3, 4) is determined such that the value is not only changed according to a front wheel gain adjustment parameter or a rear wheel gain adjustment parameter, such as βf_act or βr_act, but also changed according to the estimated friction coefficient µestm. For example, when determining the n-th wheel distribution gain Kn on the basis of f_act or βr_act, as described above in relation to the present embodiment, K1 is desirably determined such that the first wheel distribution gain K1 when βf_act is a negative value having a large absolute value is further decreased as µestm is decreased. Further, K3 is desirably determined such that the third wheel distribution gain K3 when βr_act is a positive value having a large absolute value is further decreased as µestm is decreased. Similarly, K2 is desirably determined such that the second wheel distribution gain K2 when βf_act is a positive value having a large absolute value is further decreased as µestm is decreased. Further, K4 is desirably determined such that the fourth wheel distribution gain K4 when r_act is a negative value having a large absolute value is further decreased as µestm is decreased. This is because, as µestm decreases, the lateral force of the n-th wheel Wn considerably reduces when the driving/braking force of the n-th wheel Wn(n=1, 2, 3, 4) in the braking direction is increased.

Further, a value (a value set on the basis of a front wheel gain adjustment parameter or a rear wheel gain adjustment parameter, such as βf_act or βr_act) of the n-th wheel distribution gain Kn(n=1, 2, 3, 4) may be adjusted also on the basis of an actual ground contact load of the n-th wheel (a detected value or an estimated value of a translational force, which is in the vertical direction or a direction perpendicular to a road surface, of a road surface reaction force acting on the n-th wheel). In this case, the value of the n-th wheel distribution gain Kn is desirably determined such that it decreases as the actual ground contact load of the n-th wheel Wn decreases.

Alternatively, when the actual ground contact load of each n-th wheel Wn is expressed by Fzact_n(n=1, 2, 3, 4) and the total sum thereof is expressed by ΣFzact(=Fzact_1+Fzact_2+Fzact_3+Fzact_4), the values of the n-th wheel distribution gains K1 and K2 related to the front wheels W1 and W2 may be adjusted on the basis of the sum of the actual ground contact loads of the front wheels W1 and W2 (=Fzact_1+Fzact_2) or may be adjusted on the basis of a ratio of the sum with respect to ΣFzact (=(Fzact_1+Fzact_2)/ΣFzact). Similarly, the n-th wheel distribution gains K3 and K4 related to the rear wheels W3 and W4 may be adjusted on the basis of the sum of the actual ground contact loads of the rear wheels W3 and W4 (=Fzact_3+Fzact_4) or may be adjusted on the basis of a ratio of the sum with respect to ΣFzact (=(Fzact_3+Fzact_4)/ΣFzact). Alternatively, the value of each n-th wheel distribution gain Kn(n=1, 2, 3, 4) may be adjusted on the basis of the ratio of the actual ground contact load of each n-th wheel Wn with respect to ΣFzact (=Fzact_n/ΣFzact).

Further, in the present embodiment, as the feedback control input to the braking device of the driving/braking device 3A (as the actuator operation FB target value), the FB target n-th wheel brake driving/braking force Fxfbdmd_n(n=1, 2, 3, 4) has been determined; alternatively, however, instead of Fxfbdmd_n, a target slip ratio of each wheel Wn(n=1, 2, 3, 4) by the braking device may be determined or both the target slip ratio and Fxfbdmd_n may be determined.

Further, to determine an actuator operation FB target value, such as Fxfbdmd_n, the actuator operation FB target value may be directly determined by using a map or the like from the state amount errors γerr and βerr without determining Mfbdmd or Mfbdmd_a, which are intermediate variables. The actuator operation FB target value may be alternatively determined by using, for example, a multidimensional map which uses variables, such as γerr, βerr, βf_act (or βf_d), βr_act (or βr_d), Vact, and µestm, as inputs.

The feedback yaw moment basic required value Mfbdmd may be determined such that the Mfbdmd not only causes the state amount errors γerr and βerr to approximate zero but also causes the deviation amounts γover and βover determined by the γβ limiter 202 of the virtual external force determiner 20a to approximate zero (thereby to restrain the γda and βda from deviating from their permissible ranges [γdamin, γdamax] and [βdamin, βdamax], respectively). For example, the Mfbdmd may be determined according to expression 28a given below by using appropriate coefficients Kfbdmd1 to Kfbdmd4.

$$Mfbdmd = Kfbdmd1 \cdot \gamma err + Kfbdmd2 \cdot \beta err - Kfbdmd3 \cdot \gamma over - Kfbdmd4 \cdot \beta over \quad \text{Expression 28a}$$

Determining Mfbdmd according to this expression 28a is equivalent to determining Mfbdmd by correcting the temporary value of Mfbdmd determined by the feedback control law for approximating the state amount errors γerr and βerr to zero (the sum of the first term and the second term of the right side of expression 28a) such that the deviation amounts γover and βover are approximated to zero.

Alternatively, the aforesaid dead-zone excess feedback yaw moment required value Mfbdmd_a, which is the value obtained by passing Mfbdmd determined to bring the state amount errors γerr and βerr close to zero according to the expression 23 through the dead zone processor 221, may be corrected by expression 28b given below (an expression that uses Mfbdmd_a in place of the value of the sum of the first term and the second term of the right side of the above expression 28a) to determine a value Mfbdmd_a' and this Mfbdmd_a' may be again used as Mfbdmd_a. In other words, the value obtained by passing Mfbdmd through the dead-zone processor 221 is defined as a temporary value of Mfbdmd_a, and Mfbdmd_a may be determined by correcting the temporary value such that the deviation amounts γover and βover approximate zero.

$$Mfbdmd\_a' = Mfbdmd\_a - Kfbdmd3 \cdot \gamma over - Kfbdmd4 \cdot \beta over \quad \text{Expression 28b}$$

Supplementally, according to the present embodiment, the virtual external force temporary values Mvirtmp and Fvirtmp are manipulated to approximate γover and βover to zero by the γβ limiter 202, as described above, thereby determining the virtual external forces Mvir and Fvir. This alone restrains γd and βd of the model vehicle from deviating from their permissible ranges [γdamin, γdamax] and [βdamin, βdamax], respectively, when they change. Accordingly, the actuator operation FB target value changes such that γact and βact of the actual vehicle 1 are brought close to γd and βd, respectively. Therefore, even when the actuator operation FB target value is determined such that only γerr and βerr are brought close to zero, the γact and βact can be also consequently restrained from deviating from the permissible ranges [γdamin, γdamax] and [βdamin, βdamax]. However, determining Mfbdmd or Mfbdmd_a (so as to determine the actuator operation FB target value) such that γover and βover are also brought close to zero in addition to γerr and Herr as described above makes it possible to further effectively restrain the γact and βact from deviating from the permissible ranges [γdamin, γdamax] and [βdamin, βdamax], respectively.

Further, if Mfbdmd or Mfbdmd_a is determined such that γover and βover are also brought close to zero, in addition to γerr and βerr, as described above, then it is not always necessary to determine the virtual external forces Mvir and Fvir such that γover and βover are brought close to zero; instead, the virtual external forces Mvir and Fvir may be determined so as simply to bring γerr and βerr close to zero. In this case, the virtual external force temporary values Mvirtmp and Fvirtmp determined by the virtual external force temporary value determiner 201 may be directly determined as the virtual external forces Mvir and Fvir, respectively. And, the processing other than the processing for determining Mfbdmd or Mfbdmd_a and the processing for determining the virtual external forces Mvir and Fvir may be the same as that in the present embodiment. This also makes it possible to determine the actuator operation FB target value such that γact and βact are restrained from deviating from the permissible ranges [γdamin, γdamax] and [βdamin, βdamax], respectively. Even in this case, the virtual external forces Mvir and Fvir are determined such that the state amount errors γerr and βerr approximate zero, so that the γd and βd are consequently determined such that the γd and βd of the model vehicle are restrained from deviating from the permissible ranges [γdamin, γdamax] and [βdamin, βdamax], respectively.

[About the FF Law]

The processing by the FF law 22 will now be explained in detail with reference to FIG. 17. FIG. 17 is a functional block diagram illustrating the processing by the FF law 22.

As described above, according to the present embodiment, a feedforward target value determined by the FF law 22 (a basic target value of the actuator devices 3 on the basis of drive operation inputs) includes the feedforward target values of the driving/braking forces of the wheels W1 to W4 of the actual vehicle 1 by the braking device of the driving/braking device 3A (hereinafter referred to as the FF target n-th wheel brake driving/braking forces (n=1, 2, 3, 4)), the feedforward target values of the driving/braking forces of the driving wheels W1 and W2 of the actual vehicle 1 by the driving system of the driving/braking device 3A (hereinafter referred to as the FF target n-th wheel driving system driving/braking forces (n=1, 2)), the feedforward target value of a reduction gear ratio (change gear ratio) of the speed change gear of the driving/braking device 3A (hereinafter referred to as the FF target transmission reduction gear ratio) and the feedforward target values of the steering angles of the steering control wheels W1 and W2 of the actual vehicle 1 by the steering device 3B (hereinafter referred to as the FF target front wheel steering angle δf_ff).

Incidentally, the FF law 22 corresponds to the means which determines a feedforward control input in the present invention, and the FF target n-th wheel brake driving/braking forces (n=1, 2, 3, 4) and the FF target n-th wheel driving system driving/braking forces (n=1, 2), which are determined here, correspond to the feedforward control inputs in the present invention.

As shown in FIG. 17, the FF target front wheel steering angle δf_ff is determined by a processor 230 on the basis of the steering angle θh (or on the basis of θh and Vact) of drive operation inputs. In FIG. 17, it is assumed that the steering device 3B is the actuator-driven steering device. In this case, the processor 230 determines the FF target front wheel steering angle δf_ff by the same processing as the processing by the processor 14a of the reference manipulated variable determiner 14. More specifically, the steering angle θh is divided by a predetermined overall steering ratio "is" or an overall steering ratio "is" set on the basis of Vact thereby to determine δf_ff. The value of δf_ff thus determined is the same as the value of the unlimited front wheel steering angle δf_unltd determined by the processor 14a of the reference manipulated variable determiner 14.

If the steering device 3B is the actuator-assisted steering device or a mechanical steering device, then it is unnecessary to determine δf_ff. Alternatively, δf_ff may be always set to zero. However, if the steering device 3B is the actuator-assisted steering device and has a function for correcting, on the basis of Vact, the steering angles of the front wheels W1 and W2 mechanically determined on the basis of the steering angle θh, then the correction may be determined on the basis of Vact and the obtained correction may be determined as δf_ff.

Supplementally, if the steering device 3B is an actuator-assisted steering device, then the basic steering angles of the front wheels W1 and W2 (the basic values of δf_act) are mechanically determined on the basis of the steering angle θh, so that δf_ff has a meaning as the feedforward target values of the correction amounts of the steering angles of the front wheels W1 and W2 by an actuator.

Further, the FF target n-th wheel brake driving/braking forces (n=1, 2, 3, 4) are respectively determined by processors 231a_n(n=1, 2, 3, 4) on the basis of a brake pedal manipulated variable of drive operation inputs. The graphs shown in the processors 231a-n in the figure respectively are graphs illustrating the relationship between brake pedal manipulated variables and the FF target n-th wheel brake driving/braking forces (n=1, 2, 3, 4), the values in the direction of the axis of abscissas in the graphs indicating the values of the brake pedal manipulated variables, while the values in the direction of the axis of ordinates indicating the FF target n-th wheel brake driving/braking forces. As shown in the graphs of the figure, the FF target n-th wheel brake driving/braking forces (<0) are basically determined such that the magnitudes (absolute values) thereof monotonously increase as the brake pedal manipulated variable increases. In the illustrated examples, the FF target n-th wheel brake driving/braking forces are set such that they are saturated when a brake pedal manipulated variable exceeds a predetermined amount (the increasing rate of the absolute value of the FF target n-th wheel brake driving/braking force relative to an increase in the brake pedal manipulated variable approaches zero or reaches zero), thereby preventing the magnitude of the FF target n-th wheel brake driving/braking force from becoming excessive.

The FF target n-th wheel driving system driving/braking forces (n=1, 2) and the FF target transmission reduction gear ratio are determined by a driving system actuator operation FF target value determiner 232 on the basis of an accelerator (gas) pedal manipulated variable, a shift lever position, and Vact of drive operation inputs. The processing by the driving system actuator operation FF target value determiner 232 may be the same as a method for determining a driving force transmitted from an engine to driving wheels and the reduction gear ratio of a speed change gear on the basis of an accelerator (gas) pedal manipulated variable, Vact, and the shift lever position of the speed change gear in a publicly known regular car; so that detailed explanation thereof in the present description will be omitted.

The above has described the specific processing by the FF law 22 in the present embodiment.

[About the Actuator Operation Target Value Synthesizer]

The processing by the actuator operation target value synthesizer 24 will now be explained in detail. FIG. 18 is a functional block diagram illustrating the processing by the actuator operation target value synthesizer 24.

Referring to the figure, regarding the first wheel W1, the actuator operation target value synthesizer 24 determines, by an adder 240, the sum of the FF target first wheel brake driving/braking force of the actuator operation FF target value and the FF target first wheel driving system driving/braking force. Then, the sum is input as an FF total target first wheel driving/braking force FFtotal_1 into an optimum target first driving/braking force determiner 241$a$_1. Further, the sum of this FFtotal_1 and the FB target first wheel brake driving/braking force Fxfbdmd_1 of the actuator operation FB target value is determined by an adder 242. Then, the sum is input as an unlimited target first wheel driving/braking force Fxdmd_1 into the optimum target first driving/braking force determiner 241$a$_1.

Regarding the second wheel W2, the actuator operation target value synthesizer 24 determines, by an adder 243, the sum of the FF target second wheel brake driving/braking force of the actuator operation FF target value and the FF target second wheel driving system driving/braking force. Then, the sum is input as an FF total target second wheel driving/braking force FFtotal_2 into an optimum target second driving/braking force determiner 241$a$_2. Further, the sum of this FFtotal_2 and the FB target second wheel brake driving/braking force Fxfbdmd_2 of the actuator operation FB target value is determined by an adder 244. Then, the sum is input as an unlimited target second wheel driving/braking force Fxdmd_2 into the optimum target second driving/braking force determiner 241$a$_2.

Regarding the third wheel W3, the actuator operation target value synthesizer 24 directly inputs an FE target third wheel brake driving/braking force of the actuator operation FE target value as an FE total target third wheel driving/braking force FFtotal_3 into an optimum target third driving/braking force determiner 241$a$_3. Further, the sum of this FFtotal_3 and the FB target third wheel brake driving/braking force Fxfbdmd_3 of the actuator operation FB target value is determined by an adder 245. Then, the sum is input as an unlimited target third wheel driving/braking force Fxdmd_3 into the optimum target third driving/braking force determiner 241$a$_3.

Regarding the fourth wheel W4, the actuator operation target value synthesizer 24 directly inputs an FE target fourth wheel brake driving/braking force of the actuator operation FE target value as an FE total target fourth wheel driving/braking force FFtotal_4 into an optimum target fourth driving/braking force determiner 241$a$_4. Further, the sum of this FFtotal_4 and the FB target fourth wheel brake driving/braking force Fxfbdmd_4 of the actuator operation FB target value is determined by an adder 246. Then, the sum is input as an unlimited target fourth wheel driving/braking force Fxdmd_4 into the optimum target fourth driving/braking force determiner 241$a$_4.

Here, to generalize the FF total target n-th wheel driving/braking force FFtotal_n(n=1, 2, 3, 4), it means the total sum of a feedforward target value of the driving/braking force of the n-th wheel Wn by an operation of the driving system of the driving/braking device 3A (FF target n-th wheel driving system driving/braking force) and a feedforward target value of the driving/braking force of the n-th wheel Wn by an operation of the braking device (FF target n-th wheel brake driving/braking force). In this case, according to the embodiments in the present description, the driving wheels of the actual vehicle 1 are the front wheels W1 and W2, and the rear wheels W3 and W4 are the driven wheels; hence, for the rear wheels W3 and W4, the FF target n-th wheel brake driving/braking force (n=3, 4) is directly determined as the FF total target n-th wheel driving/braking force FFtotal_n.

Further, the unlimited target n-th wheel driving/braking force Fxdmd_n(n=1, 2, 3, 4) is the sum of the F total target n-th wheel driving/braking force FFtotal_n and the FB n-th wheel brake driving/braking force, so that it means the total driving/braking force of the n-th wheel required by a feedforward control operation of the driving/braking device 3A (a feedforward control operation based on at least a drive operation input) and a feedback control operation (a feedback control operation based on at least state amount errors γerr and βerr).

Then, the actuator operation target value synthesizer 24 determines the target n-th wheel driving/braking force Fxcmd_n, which is the final target value of the driving/braking force of each n-th wheel Wn, by the optimum target n-th driving/braking force determiner 241$a$_$n$ (n=1, 2, 3, 4), and also determines a target n-th wheel slip ratio, which is the final target value of the slip ratio of the n-th wheel.

In this case, the optimum target n-th driving/braking force determiner 241$a$_$n$ (n=1, 2, 3, 4) receives a latest value (current time value) of the actual side slip angle of the n-th wheel Wn (more specifically, the actual front wheel side slip angle βf_act when n=1, 2 or the actual rear wheel side slip angle βr_act when n=3, 4) and a latest value (current time value) of the estimated friction coefficient μestm in addition to FFtotal_n and Fxdmd_n. Although not shown, the optimum target n-th driving/braking force determiner 241$a$_$n$ (n=1, 2) associated with the front wheels W1 and W2 also receives a latest value (current time value) of the actual front wheel steering angle δf_act. Then, the optimum target n-th driving/braking force determiner 241$a$_$n$(n=1, 2, 3, 4) determines the target n-th wheel driving/braking force Fxcmd_n and the target n-th wheel slip ratio on the basis of the inputs supplied thereto, respectively, as will be described later.

Further, the actuator operation target value synthesizer 24 inputs the active steering FB target lateral force Fyfbdmd_f of the actuator operation FB target value and the FF target front wheel steering angle δf_ff of the actuator operation FF target value into an optimum target active steering angle determiner 247 so as to determine target front wheel steering angles δfcmd, which are the final steering angle target values of the front wheels W1 and W2 by the optimum target active steering angle determiner 247. Incidentally, the δfcmd means the final target values of the steering angles themselves (the steering angles based on the longitudinal direction of the actual vehicle 1) of the front wheels W1 and W2 by an operation of an actuator if the steering device 3B is the actuator-driven steering device. Meanwhile, if the steering device 3B is the actuator-assisted steering device, then it means the final target values of the correction amounts of the steering angles of the front wheels W1 and W2 by an operation of an actuator.

The actuator operation target value synthesizer 24 directly outputs the FF target n-th wheel driving system driving/braking force(n=1, 2) of the actuator operation FF target value as the target n-th wheel driving system driving/braking force, which is the final target value of the driving/braking force of the n-th wheel Wn by an operation of the driving system of the driving/braking device 3A. Moreover, the actuator operation target value synthesizer 24 directly outputs the FF target transmission reduction gear ratio of the actuator operation FF target value without processing it as a target transmission reduction gear ratio, which is the final target value of the reduction gear ratio (speed change ratio) of the speed change gear of the driving/braking device 3A.

Incidentally, the actuator operation target value synthesizer 24 is a constituent element (a means which determines driving/braking force manipulation control inputs) of the actual vehicle actuator operation control input determining means in the present invention, and the aforesaid individual target values determined here correspond to actual vehicle actuator operation control inputs. Further, the target n-th wheel driving/braking force Fxcmd_n and the target n-th wheel slip ratio in the target values correspond to the driving/braking force manipulation control inputs in the present invention.

The processing by the optimum target n-th driving/braking force determiner 241*a_n* (n=1, 2, 3, 4) will be explained below in detail. FIG. 19 is a flowchart illustrating the processing by the optimum target n-th driving/braking force determiner 241*a_n*.

Referring to the figure, first, in S100, it is preconditioned that the side slip angle of the n-th wheel Wn (n=1, 2, 3, 4) is an actual side slip angle (more specifically, the actual front wheel side slip angle βf_act for n=1, 2 and the actual rear wheel side slip angle βr_act for n=3, 4), and a road surface friction coefficient (the coefficient of friction between the n-th wheel Wn and a road surface) is the estimated friction coefficient μestm. Then, based on the precondition, an n-th wheel driving/braking force candidate Fxcand_n, which is the value of the driving/braking force of the n-th wheel Wn closest to the unlimited target n-th wheel driving/braking force Fxdmd_n (including a case of agreement therebetween), and an n-th wheel slip ratio candidate Scand_n, which is the value of the slip ratio of the n-th wheel Wn associated therewith, are determined.

In general, there is a constant correlation based on the characteristics of wheel tires or the characteristics of a suspension device among the side slip angle and a road surface reaction force (a driving/braking force, a lateral force, and a ground contact load), a slip ratio and a road surface friction coefficient of each wheel. For example, there is a correlation indicated by expressions (2.57), (2.58), (2.72), and (2.73) in the aforesaid non-patent document 1 among a side slip angle, a road surface reaction force (a driving/braking force, a lateral force, and a ground contact load), a slip ratio and a road surface friction coefficient of each wheel. Moreover, if, for example, the ground contact load and the road surface friction coefficient are set to be constant, then there is a correlation as shown in FIG. 2.36 of the aforesaid non-patent document 1 among the side slip angle, the driving/braking force, the lateral force, and the slip ratio of each wheel. Hence, the road surface reaction force and the slip ratio of each wheel when the side slip angle and the road surface friction coefficient individually take certain values cannot respectively take independent values; instead, the values thereof change according to the aforesaid correlations (hereinafter referred to as wheel characteristics relations). The slip ratio takes a negative value when the driving/braking force is a driving/braking force in the driving direction (>0), while it takes a positive value when the driving/braking force is a driving/braking force in the braking direction (<0).

Thus, the processing in S100 in the present embodiment determines a driving/braking force that is closest to or agrees with the unlimited target n-th wheel driving/braking force Fxdmd_n (a driving/braking force that provides a minimum absolute value of a difference from Fxdmd_n) and a slip ratio associated with the driving/braking force from the actual side slip angle βf_act or βr_act (latest value) of the n-th wheel Wn and the estimated road surface friction coefficient μestm (latest value) on the basis of a map which illustrates a relationship among a side slip angle, a road surface friction coefficient, a driving/braking force, and a slip ratio of the n-th wheel Wn and which has been prepared in advance. Then, the driving/braking force and the slip ratio determined as described above are determined as an n-th wheel driving/braking force candidate Fxcand_n and an n-th wheel slip ratio candidate Scand_n.

For the map used for the processing, the aforesaid wheel characteristics relationship, for example, may be specified or estimated beforehand by various experiments or the like or on the basis of the tire characteristics of the wheels W1 to W4 or the characteristics of the suspension device 3C, and the map may be prepared on the basis of the specified or estimated wheel characteristics relationship. The ground contact loads of n-th wheels Wn may be added as variable parameters to the map. In this case, the actual ground contact load Fzact_n of the n-th wheel Wn may be input to the optimum target n-th driving/braking force determiner 241*a-n* to determine Fxcand_n and Scand_n from the actual side slip angle βf_act or βr_act, the estimated friction coefficient μestm, and the actual ground contact load Fzact_n of the n-th wheel Wn. However, fluctuations in the actual ground contact load Fzact_n are relatively small in general, so that the actual ground contact load Fzact_n may be regarded as a fixed value.

Supplementally, if Fxdmd_n exists in a range of values of driving/braking forces that can be generated (that can be applied from a road surface) in the n-th wheel Wn (driving/braking forces that can be generated on the basis of the aforesaid wheel characteristics relationship) corresponding to a set of the actual side slip angle βf_act or βr_act and the estimated road surface friction coefficient μestm of the n-th wheel Wn or a set of these and the actual ground contact load Fzact_n, then the Fxdmd_n may be directly determined as Fxcand_n without processing it. Further, if Fxdmd_n deviates from the range, then an upper limit value (>0) or a lower limit value (<0) of the range, whichever is closer to Fxdmd_n may be determined as Fxcand_n.

Further, corresponding to the set of the actual side slip angle βf_act or βr_act and the estimated road surface friction coefficient μestm of the n-th wheel Wn or the set of these and the actual ground contact load Fzact_n, a relationship between the slip ratio and the driving/braking force that can be generated in the n-th wheel Wn (a relationship between the slip ratio and the driving/braking force that can be generated according to the wheel characteristics relationship) will generally be a relationship in which the driving/braking forces have peak values (extremal values) with respect to changes in the slip ratio (a graph having slip ratio values on the axis of abscissas and the driving/braking force magnitude values on the axis of ordinates will be a graph that bulges upward). For this reason, in some cases, there are two types of slip ratio values that correspond to the values of driving/braking forces whose absolute values are smaller than the peak values. If there are two types of slip ratio values corresponding to Fxcand_n as described above, then, of the two types of slip ratio values, the slip ratio value that is closer to zero may be determined as an n-th wheel slip ratio candidate Scand_n. In other words, in the relationship between the slip ratio and the driving/braking force of the n-th wheel Wn (the relationship based on the wheel characteristics relationship), the n-th wheel slip ratio candidate Scand_n may be determined within a range between the slip ratio value, at which the driving/braking force reaches a peak value, and zero.

Supplementally, within the range between the slip ratio value, at which the driving/braking force reaches a peak value, and zero, the absolute value of a driving/braking force monotonously increases as the absolute value of the slip ratio increases from zero.

Subsequently, the procedure proceeds to S102 wherein an n-th wheel driving/braking force at the generation of a maximum moment Fxmmax_n and an n-th wheel slip ratio at the generation of a maximum moment Smmax_n, which is a slip ratio corresponding to the above Fxmmax_n, are determined under the same precondition as that in S100. Here, the n-th wheel driving/braking force at the generation of a maximum moment Fxmmax_n means the value of a driving/braking force component of a road surface reaction force that causes a moment in the yaw direction generated about the center-of-gravity point G of the actual vehicle 1 by a road surface reaction force to become maximum toward the same polarity (direction) as the polarity of the aforesaid feedback yaw moment basic required value Mfbdmd, the driving/braking force component being a component in a road surface reaction force that can be generated in the n-th wheel Wn when the side slip angle of the n-th wheel Wn is the actual side slip angle βf_act or βr_act and the road surface friction coefficient is the estimated friction coefficient μestm (more specifically, the resultant force of the driving/braking force and the lateral force that can be applied to the n-th wheel Wn from a road surface according to the wheel characteristics relationship). In this case, Fxmmax_n and Smmax_n are determined within a range wherein the absolute value of the driving/braking force monotonously increases as the absolute value of the slip ratio increases from zero in the relationship between the driving/braking force and the slip ratio of the n-th wheel Wn (the relationship based on the wheel characteristics relationship). Thus, Smmax_n is determined to take a value between the slip ratio value, at which the driving/braking force reaches a peak value, and zero.

In S102, regarding the front wheels W1 and W2 (when n=1 or 2), the n-th wheel driving/braking force at the generation of a maximum moment Fxmmax_n and the n-th wheel slip ratio at the generation of a maximum moment Smmax_n corresponding thereto are determined from, for example, the actual front wheel side slip angle βf_act, the estimated friction coefficient μestm, and the actual front wheel steering angle δf_act according to a map prepared beforehand (a map illustrating the relationship among front wheel side slip angles, road surface friction coefficients, front wheel steering angles, driving/braking forces at the generation of maximum moments, and slip ratios at the generation of maximum moments (the relationship based on the wheel characteristics relationship). Alternatively, from among the sets of driving/braking forces and lateral forces of the n-th wheel Wn (n=1 or 2) that can be generated with respect to sets of βf_act and μestm, the set of a driving/braking force and a lateral force that causes a moment in the yaw direction generated by the resultant force thereof about the center-of-gravity point G of the actual vehicle 1 to reach its maximum level is exploratively determined on the basis of the map illustrating the relationship among the front wheel side slip angles, road surface friction coefficients, slip ratios, driving/braking forces, and lateral forces, and the actual front wheel steering angle δf_act. Then, the driving/braking force and the slip ratio associated with the set may be determined as Fxmmax_n and Smmax_n, respectively.

Further, regarding the rear wheels W3 and W4, (when n=3 or 4), the n-th wheel driving/braking force at the generation of a maximum moment Fxmmax_n and the n-th wheel slip ratio at the generation of a maximum moment Smmax_n corresponding thereto are determined from, for example, the actual rear wheel side slip angle βr_act and the estimated friction coefficient μestm according to a map prepared beforehand (a map illustrating the relationship among rear wheel side slip angles, road surface friction coefficients, driving/braking forces at the generation of maximum moments, and slip ratios at the generation of maximum moments (the relationship based on the wheel characteristics relationship). Alternatively, from among the sets of driving/braking forces and lateral forces of the n-th wheel Wn (n=3 or 4) that can be generated with respect to sets of βr_act and μestm, the set of a driving/braking force and a lateral force that causes a moment in the yaw direction generated by the resultant force thereof about the center-of-gravity point G of the actual vehicle 1 to reach a maximum level is exploratively determined according to the map illustrating the relationship among the rear wheel side slip angles, the road surface friction coefficients, the slip ratios, the driving/braking forces, and the lateral forces. Then, the driving/braking force and the slip ratio associated with the set may be determined as Fxmmax_n and Smmax_n, respectively.

Incidentally, the processing in S102 may include the actual ground contact load Fzact_n of the n-th wheel Wn as a variable parameter as with the case explained in relation to the processing in S100 described above.

Subsequently, the processing in S104 to S112 is carried out, as will be described later, so as to determine the target n-th wheel driving/braking force Fxcmd_n. In this case, the target n-th wheel driving/braking force Fxcmd_n is determined to satisfy the following conditions (1) to (3). Regarding conditions (1) to (3), the priority rank becomes higher in the order of (1), (2), and (3). If no target n-th wheel driving/braking force Fxcmd_n that satisfies all the conditions (1) to (3) can be determined, then the target n-th wheel driving/braking force Fxcmd_n is determined such that a condition with higher priority is preferentially satisfied.

Condition (1): If an FF total target n-th wheel driving/braking force FFtotal_n and a target n-th wheel driving/braking force Fxcmd_n are driving/braking forces in the braking direction, then the magnitude (the absolute value) of the target n-th wheel driving/braking force Fxcmd_n is not smaller than the magnitude (the absolute value) of the FF total target n-th wheel driving/braking force FFtotal_n. In other words, 0>Fxcmd_n>FFtotal_n does not happen.

Condition (2): If the target n-th wheel driving/braking force Fxcmd_n has the same polarity as that of the n-th wheel driving/braking force Fxmmax_n at the generation of a maximum moment, then the magnitude (the absolute value) of Fxcmd_n does not exceed the magnitude (the absolute value) of the Fxmmax_n. In other words, Fxcmd_n>Fxmmax_n>0 or Fxcmd_n<Fxmmax_n<0 does not happen.

Condition (3): The target n-th wheel driving/braking force Fxcmd_n agrees with the n-th wheel driving/braking force candidate Fxcand_n as much as possible (more precisely, the absolute value of a difference between Fxcmd_n and Fxcand_n is minimized).

Here, Condition (1) is a condition for preventing the target n-th wheel driving/braking force Fxcmd_n from becoming smaller than the driving/braking force in the braking direction of the n-th wheel Wn of the actual vehicle 1 (this corresponds to FFtotal_n) required by an operation of the brake pedal performed by the driver of the actual vehicle 1. Supplementally, according to the embodiments in the present description, the rear wheels W3 and W4 are driven wheels, so that the FF total target n-th wheel driving/braking force FFtotal_n (n=3, 4) and the target n-th wheel driving/braking force Fxcmd_n(n=3, 4) related to the rear wheels W3 and W4 always take values of zero or less. Accordingly, regarding the rear wheels W3 and W4, condition (1) is equivalent to a condition that "the magnitude (the absolute value) of the target n-th wheel driving/braking force Fxcmd_n does not become smaller than the magnitude (the absolute value) of the FF total target n-th wheel driving/braking force FFtotal_n."

Further, condition (2) is a condition for preventing a lateral force generated in the n-th wheel Wn on the basis of the target n-th wheel driving/braking force Fxcmd_n from becoming excessively small.

Further, condition (3) is a condition for satisfying as much as possible the control requirements (targets) of operations of the actuator devices 3 determined by the actuator operation FB target value determiner 20b and the FF law 22. Incidentally, Fxcand_n is, as described above, the value of a driving/braking force closest to the unlimited target n-th wheel driving/braking force Fxdmd_n (including a case of agreement therebetween) within a range of the values of driving/braking forces that can be generated in the n-th wheel Wn according to the wheel characteristics relationship (a wheel characteristics relationship observed when it is preconditioned that the side slip angle of the n-th wheel Wn is an actual side slip angle βf_act or βr_act and a road surface friction coefficient is the estimated friction coefficient μestm). Therefore, the condition (3) is, in other words, equivalent to a condition that the target n-th wheel driving/braking force Fxcmd_n takes a value within the range of values of driving/braking forces that can be generated in the n-th wheel Wn according to the wheel characteristics relationship (the wheel characteristics relationship observed when it is preconditioned that the side slip angle of the n-th wheel Wn is the actual side slip angle βf_act or βr_act and a road surface friction coefficient is the estimated friction coefficient μestm) and agrees with or approximates (the absolute value of a difference from Fxdmd_n is minimized) the unlimited target n-th wheel driving/braking force Fxdmd_n (a driving/braking force based on a control requirement) as much as possible.

Supplementally, the conditions (1) to (3) correspond to the third required condition, the second required condition, and the first required condition, respectively, in the present invention. In this case, the n-th wheel driving/braking force at the generation of a maximum moment Fxmmax_n corresponds to the k-th wheel driving/braking force at the generation of a maximum moment in the present invention. In the present embodiment, each of the wheels W1 to W4 is defined as the k-th wheel (the particular wheel) in the present invention.

The processing in S104 to S112 described above is specifically carried out as follows. First, the procedure proceeds to S104 wherein it is determined whether the magnitude relationship between Fxcand_n determined in S100 and Fxmmax_n determined in S102 is 0>Fxmmax_n>Fxcand_n or 0<Fxmmax_n<Fxcand_n. If the result of the determination is NO, then the procedure proceeds to S106 wherein the value of Fxcand_n is substituted into the target n-th wheel driving/braking force Fxcmd_n. More specifically, if Fxcand_n and Fxmmax_n have polarities that are different from each other or if the Fxcand_n and Fxmmax_n have the same polarity and the magnitude (the absolute value) of Fxcand_n is the magnitude (the absolute value) of Fxmmax_n or less, then the value of Fxcand_n is directly substituted into Fxcmd_n. Incidentally, the value of Fxcand_n is substituted into Fxcmd_n (provided Fxcmd_n=0) also when Fxcand_n=0 (at this time, Fxdmd_n is also zero).

Meanwhile, if the determination result in S104 is YES, then the procedure proceeds to S108 wherein the value of Fxmmax_n (the value determined in S102) is substituted into the target n-th wheel driving/braking force Fxcmd_n.

By the processing up to this point, Fxcmd_n is determined such that the conditions (2) and (3) are satisfied (provided that condition (2) is given a higher priority).

After the processing in S106 or S108, the procedure proceeds to S110 wherein it is determined whether the magnitude relationship between the FF total target n-th wheel driving/braking force FFtotal_n and the current target n-th wheel driving/braking force Fxcmd_n (the value determined in S106 or S108) is 0>Fxcmd_n>FFtotal_n. If the result of the determination is YES, then the procedure proceeds to S112 wherein FFtotal_n is re-substituted into the target n-th wheel driving/braking force Fxcmd_n. More specifically, if the FF total target n-th wheel driving/braking force FFtotal_n and the n-th wheel driving/braking force candidate Fxcmd_n determined in S106 or S108 are driving/braking forces in the braking direction and the magnitude (the absolute value) of Fxcmd_n is smaller than the magnitude (the absolute value) of FFtotal_n, then the value of FFtotal_n is substituted into Fxcmd_n. If the determination result in S110 is NO, then the value of Fxcmd_n at that instant is maintained as it is.

By the aforesaid processing in S104 to S112, as previously described, basically, the target n-th wheel driving/braking force Fxcmd_n is determined such that the conditions (1) to (3) are satisfied. Further, if no target n-th wheel driving/braking force Fxcmd_n that satisfies all the conditions (1) to (3) can be determined, then the target n-th wheel driving/braking force Fxcmd_n is determined such that a condition having a higher priority is preferentially satisfied.

If the determination result in S110 is YES, or after the processing in S112, the processing in S114 is carried out. In this S114, a slip ratio associated with Fxcmd_n determined by the processing in S106 to S112 as described above is determined as the target n-th wheel slip ratio Scmd_n. In this case, by the processing in S104 to S112, Fxcmd_n takes the value of one of Fxcand_n, Fxmmax_n, and FFtotal_n. And, if Fxcmd_n=Fxcand_n, then the n-th wheel slip ratio candidate Scand_n determined in S100 is determined as Scmd_n. If Fxcmd_n=Fxmmax_n, then the n-th wheel slip ratio at the generation of a maximum moment Smmax_n determined in S102 is determined as Scmd_n. If Fxcmd_n=FFtotal_n, then the slip ratio associated with FFtotal_n is determined according to, for example, a map used for the processing in S100, and the determined slip ratio may be determined as Scmd_n. In this case, if there are two types of values of the slip ratio associated with FFtotal_n, then a slip ratio value that is closer to zero (a value within the range between a slip ratio value, at which the driving/braking force of the n-th wheel Wn reaches a peak value, and zero) may be determined as Scmd_n. If FFtotal_n deviates from the range of the values of driving/braking forces that can be generated in the n-th wheel Wn in the map, then a slip ratio associated with the value of the driving/braking force that is closest to FFtotal_n within the range may be determined as Scmd_n.

The above has explained in detail the processing by the optimum target n-th driving/braking force determiner 241a_n (n=1, 2, 3, 4).

In the present embodiment, the target n-th wheel driving/braking force Fxcmd_n has been determined first and then the target n-th wheel slip ratio Scmd_n associated therewith has been determined; reversely, however, the target n-th wheel slip ratio Scmd_n may be determined, and then the target n-th wheel driving/braking force Fxcmd_n associated therewith may be determined. In this case, the target n-th wheel slip ratio Scmd_n may be determined by the same processing as that in S104 to S112 described above on the basis of conditions related to the target n-th wheel slip ratio Scmd_n associated with the aforesaid conditions (1) to (3). Then, after that, Fxcmd_n associated with the Scmd_n may be determined. In this case, in the relationship between the slip ratios and the driving/braking forces based on the wheel characteristics relationship of the n-th wheel Wn, Scmd_n is determined within a range between the slip ratio value, at which the driving/braking force reaches a peak value, and zero.

The processing by the optimum target active steering angle determiner 247 will now be explained. FIG. 20 is a functional block diagram illustrating the processing by the optimum target active steering angle determiner 247.

Referring to the figure, the optimum target active steering angle determiner 247 first determines, by a processor 247a on the basis of Fyfbdmd_f, the FB active steering angle δf_fb, which indicates change amounts of the steering angles of the front wheels W1 and W2 required for the actual vehicle 1 to generate the active steering FB target lateral force Fyfbdmd_f determined by the actuator operation FB target value determiner 20b in the front wheels W1 and W2 (more specifically, the resultant force of a lateral force of the front wheel W1 and a lateral force of the front wheel W2 is changed by Fyfbdmd_f). In this case, the processor 247a determines the cornering power Kf_1 of the first wheel W1 according to a predetermined function expression or a map on the basis of, for example, the actual ground contact load Fzact_1 of the first wheel W1, and also determines the cornering power Kf_2 of the second wheel W2 according to a predetermined function expression or a map on the basis of the actual ground contact load Fzact_2 of the second wheel W2. The function expression or map is set in advance on the basis of the tire characteristics of the front wheels W1 and W2 of the actual vehicle 1. Then, the cornering powers Kf_1 and Kf_2 are used to determine the FB active steering angle δf_fb according to the following expression 30.

$$\delta f\_fb = (1/(Kf\_1 + Kf\_2)) \cdot Fyfbdmd\_f \quad \text{Expression 30}$$

The FB active steering angle δf_fb determined as shown above corresponds to the correction amount of a front wheel side slip angle required to change the resultant force of the lateral forces of the front wheels W1 and W2 by Fyfbdmd_f.

Normally, changes in the actual ground contact loads Fzact_1 and Fzact_2 are small, so that the coefficient (1/(Kf_1+Kf_2)) by which Fyfbdmd_f is multiplied in expression 30 may be set to a constant value.

Subsequently, the optimum target active steering angle determiner 247 adds the δf_fb determined as described above to the FF target front wheel steering angle δf_ff by an adder 247b so as to determine the target front wheel steering angle δfcmd.

If the active steering FB target lateral force Fyfbdmd_f based on the state amount errors γerr and βerr is not determined or if Fyfbdmd_f=0 is always maintained, then δf_ff may be directly determined as the target front wheel steering angle δf_cmd.

Up to this point, the processing by the actuator operation target value synthesizer 24 has been explained in detail.

[About the Actuator Drive Control Unit]

The actuator drive control unit 26 operates the actuator devices 3 of the actual vehicle 1 such that the target value determined by the actuator operation target value synthesizer 24 is satisfied. For example, the actuator manipulated variable of the driving system is determined such that the driving/braking force (the driving/braking force in the driving direction) of the first wheel W1 by an operation of the driving system of the driving/braking device 3A becomes the target first wheel driving system driving/braking force, and the driving system is operated on the basis thereof. Further, the actuator manipulated variable of the braking device is determined such that the driving/braking force of the actual road surface reaction force of the first wheel W1 (the sum of the driving/braking force of the first wheel W1 by an operation of the driving system and the driving/braking force of the first wheel W1 by an operation of the braking device (the driving/braking force in the braking direction)) becomes the target first wheel driving/braking force Fxcmd_1, and the braking device is actuated on the basis thereof. Further, in this case, the operation of the driving system or the braking device is adjusted so as to bring a difference between the actual slip ratio of the first wheel W1 and the target first wheel slip ratio Scmd_1 close to zero. The same applies to the remaining wheels W2 to W4.

Further, if the steering device 3B is an actuator-driven steering device, then the actuator manipulated variable of the steering device 3B is determined such that the actual front wheel steering angle δf_act agrees with the target front wheel steering angle δfcmd, and the operation of the steering device 3B is controlled on the basis thereof. If the steering device 3B is an actuator-assisted steering device, then the operation of the steering device 3B is controlled such that the actual front wheel steering angle δf_act agrees with the sum of the target front wheel steering angle δf_cmd and a mechanical steering angle component based on the steering angle θh.

The reduction gear ratio of the speed change gear of the driving system of the driving/braking device 3A is controlled on the basis of the target transmission reduction gear ratio.

Regarding the control amounts of the driving/braking forces of the wheels W1 to W4, lateral forces and the like, the operations of the driving/braking device 3A, the steering device 3B, and the suspension device 3C tend to interfere with each other. In such a case, the operations of the driving/braking device 3A, the steering device 3B, and the suspension device 3C are desirably controlled integrally by the processing of non-interference in order to control the control amounts to target values.

SECOND EMBODIMENT

A second embodiment of the present invention will now be explained with reference to FIG. 21. The present embodiment differs from the first embodiment described above only partly in processing, so that the explanation will be focused mainly on different aspects and the explanation of the same portions will be omitted. Further, in the explanation of the present embodiment, the same constituent portions or the same functional portions as those of the first embodiment will be assigned the same reference characters as those in the first embodiment.

According to a feedback control theory, basically, an actuator operation FB target value is ideally determined such that a feedback yaw moment basic required value Mfbdmd based on the state amount errors γerr and βerr is satisfied. However, in the aforesaid first embodiment, a moment in the yaw direction generated about the center-of-gravity point G of the actual vehicle 1 by an actuator operation FB target value incurs an excess or deficiency relative to Mfbdmd due to the processing by the dead-zone processor 221, the limiter 222d_n or the like. In addition, there are cases where the road surface reaction forces generated in the wheels W1 to W4 of the actual vehicle 1 on the basis of actuator operation FB target values incur an excess or deficiency relative to the actuator operation FB target values due to the influences of the nonlinearity (e.g., a limiter or a saturation characteristic) in the processing function sections (e.g., the actuator operation target value synthesizer 24) from actuator operation FB target values to actuator operation target values. This sometimes causes the road surface reaction forces generated in the wheels W1 to W4 of the actual vehicle 1 to develop an excess or deficiency relative to ideal road surface reaction forces for approximating the state amount errors γerr and βerr to zero.

Meanwhile, regarding the influences on the difference between the state amount of a motion of the actual vehicle 1 and the state amount of a motion of the model vehicle, applying an additional road surface reaction force by feeding the difference back to the actuator device 3 of the actual vehicle 1 (a road surface reaction force for approximating the difference to zero) to the actual vehicle 1 is equivalent to applying an external force, which is obtained by multiplying the additional road surface reaction force by (−1), to the model vehicle.

According to the present embodiment, therefore, a virtual external force to be applied to the model vehicle is corrected on the basis of the excess or deficiency of the road surface reaction force generated in each of the wheels W1 to W4 of the actual vehicle 1 relative to the ideal road surface reaction force, thereby compensating for the excess or deficiency.

An explanation will be given with reference to FIG. 21. In the present embodiment, a virtual external force determiner 20a of the FB distribution law 20 is provided with a processor 215 in addition to the functions in the aforesaid first embodiment.

The processor 215 first inputs into a processor 215a, the actuator operation FB target values (current time values) determined as previously described in an actuator operation FB target value determiner 20b. Then, the processor 215a calculates the road surface reaction force correction amounts, which are the correction amounts of the road surface reaction forces acting on the wheels W1 to W4 of the actual vehicle 1 on the basis of the actuator operation FB target values (the correction amounts from the road surface reaction forces produced on the basis of the actuator operation FF target values). In this case, the road surface reaction force correction amounts are determined as follows.

The road surface reaction force (the driving/braking force and the lateral force) acting on the n-th wheel Wn is estimated on the basis of the target n-th wheel driving/braking force Fxcmd_n(n=1, 2, 3, 4) and the target slip ratio Sxcmd_n(n=1, 2, 3, 4) determined by an actuator operation target value synthesizer 24 on the basis of the actuator operation FB target value (current time value) and the actuator operation FF target value (current time value). At this time, the estimated value of the driving/braking force of the n-th wheel Wn may be denoted by Fxcmd_n, and the lateral force may be determined by using a map or the like based on, for example, the aforesaid wheel characteristics relationship. More specifically, the lateral force may be determined by using, for example, S200 and S202, and the like, which will be discussed hereinafter. Further, the same processing as that by the actuator operation target value synthesizer 24 is carried out with the actuator operation FB target value being set to zero, thereby determining the target driving/braking force and the target slip ratio of each n-th wheel Wn(n=1, 2, 3, 4) observed when the actuator operation FB target value is set to zero, and based thereon, the road surface reaction force (the driving/braking force and lateral force) acting on the n-th wheel Wn is estimated. Then, the difference in the road surface reaction force of the n-th wheel Wn is determined with the actuator operation FB target value being different as mentioned above, and the difference is determined as the road surface reaction force correction amount for the n-th wheel Wn.

Subsequently, the road surface reaction force correction amount determined as described above is supplied to a processor 215b. Then, the processor 215b calculates a total moment Mfb (a moment in the yaw direction) generated about the center-of-gravity point G of the actual vehicle 1 due to the road surface reaction force correction amount (the resultant force of a driving/braking force component and a lateral force component of the road surface reaction force correction amount) of each of the wheels W1 to W4. To be specific, a moment in the yaw direction generated about the center-of-gravity point G of the actual vehicle 1 by the road surface reaction force correction amount of the n-th wheel Wn is determined on the basis of primarily the road surface reaction force correction amount of each n-th wheel Wn(n=1, 2, 3, 4) and the actual front wheel steering angle δf_act (the parameters that define the geometric relationship between each of the wheels W1 to W4 and the center-of-gravity point of the actual vehicle 1). Then, the moments are synthesized on all the wheels W1 to W4 thereby to determine Mfb.

Subsequently, the feedback yaw moment basic required value Mfbdmd (current time value) determined by a processor 220 of the actuator operation FB target value determiner 20b is subtracted from the moment Mfb by a subtracter 215c to determine an actual vehicle yaw moment error Mfb_err (=Mfb−Mfbdmd). Incidentally, this actual vehicle yaw moment error Mfb_err means the excess or deficiency of the moment in the yaw direction, which is generated in the actual vehicle 1 due to the actuator operation FB target value, from Mfbdmd.

Subsequently, the actual vehicle yaw moment error Mfb_err is multiplied by a predetermined gain Cfb by a multiplier 215d to determine a virtual external force compensating moment Mvir_c. The gain Cfb takes a value of 0<Cfb≦1 (a positive value of 1 or less). The virtual external force compensating moment Mvir_c means a moment in the yaw direction that should be generated about a center-of-gravity point Gd of the model vehicle to bring a state amount error between the actual vehicle 1 and the model vehicle close to zero, the state amount error occurring due to an excess or deficiency of the moment in the yaw direction, which is generated in the actual vehicle 1 due to an actuator operation FB target value, from Mfbdmd.

Subsequently, the virtual external force determined as described above by the γβ limiter 202 (the output of the subtracter 207) is defined as second temporary values Mvir' (=Mvirtmp−Mvir_over) and Fvir' (=Fvirtmp−Fvir_over), and the second temporary values Mvir', Fvir' and the virtual external force compensating moment Mvir_c are added up by an adder 215e. This determines the virtual external forces Mvir and Fvir (current time values). To be more specific, the sum of the second temporary values Mvir' and Mvir_c is determined as Mvir, while the second temporary value Fvir' is directly determined as Fvir without processing it.

The construction and processing other than those explained above are the same as those in the aforesaid first embodiment.

According to the present embodiment, the influences of the nonlinearity from the state amount errors γerr and βerr to an actuator operation target value exerted on the behaviors of βerr and γerr are reduced, allowing the γerr and βerr to converge to zero while maintaining high linearity. In other words, the total sum of the feedback gains for converging the state amount errors γerr and Herr to zero approximates a difference between the gain matrix Kfbdmd in the expression 23 and the gain matrix Kfvir in expression 15 (Kfbdmd−Kfvir)

In other words, the relationship between the difference between the external force acting on the model vehicle when the virtual external forces Mvir and Fvir obtained by correcting the second temporary values Mvir' and Fvir' by the virtual external force compensating moment Mvir_c are input to a reference dynamic characteristics model 16 (a moment in the yaw direction) and an external force acting on the actual vehicle 1 caused by the actuator operation FB target value (a moment Mfb in the yaw direction), and the state amount errors γerr and βerr will be a relationship having higher linearity than the relationship between the difference between the external force acting on the model vehicle when the second temporary values Mvir' and Fvir' of a virtual external force are directly input as the virtual external forces Mvir and Fvir into the reference dynamic characteristics model 16 (a moment in the yaw direction) and an external force acting on the actual vehicle 1 caused by the actuator operation FB target value (a moment Mfb in the yaw direction), and the state amount errors γerr and βerr.

THIRD EMBODIMENT

A third embodiment of the present invention will now be explained with reference to FIG. 22 to FIG. 24. The present embodiment differs from the aforesaid first embodiment only partly in processing, so that the explanation will be focused mainly on the different aspect, and the explanation of the same portions will be omitted. In the explanation of the present embodiment, the same constituent portions or the same functional portions as those of the first embodiment will be assigned the same reference characters as those of the first embodiment.

In the aforesaid first embodiment, as the actuator operation FB target value for the driving/braking device 3A, the aforesaid FB target n-th wheel brake driving/braking force Fxfbdmd_n, which means a correction required value (a correction required value for bringing the state amount errors γerr and βerr close to zero) of the driving/braking force to be applied to the n-th wheel Wn(n=1, 2, 3, 4) by an operation of the braking device of the driving/braking device 3A, has been determined. In place of this, according to the present embodiment, an FB target n-th wheel brake moment Mfbdmd_n (n=1, 2, 3, 4) is determined as the actuator operation FB target value for the driving/braking device 3A. The FB target n-th wheel brake moment Mfbdmd_n means the correction required value (the correction required value for bringing the state amount errors γerr and βerr close to zero) of a moment in the yaw direction generated about a center-of-gravity point G of the actual vehicle 1 by a road surface reaction force (more specifically, the resultant force of a driving/braking force and a lateral force) to be applied to the wheels W1 to W4 by operating the braking device of the driving/braking device 3A. Further, according to the present embodiment, the FB target n-th wheel brake moment Mfbdmd_n is used to determine an actuator operation target value.

Thus, the present embodiment differs from the aforesaid first embodiment in the processing by an actuator operation FB target value determiner 20b of the FB distribution law 20 and the processing by an actuator operation target value synthesizer 24. And, the constructions and processing other than these are the same as those of the first embodiment.

The following will explain the processing by the actuator operation FB target value determiner 20b and the processing by the actuator operation target value synthesizer 24 in the present embodiment.

FIG. 22 is a functional block diagram illustrating the processing function of the actuator operation FB target value determiner 20b in the present embodiment. Referring to the figure, the actuator operation FB target value determiner 20b first carries out the same processing as that in the first embodiment by processors 220 and 221 to determine the aforesaid feedback yaw moment basic required value Mfbdmd and a dead-zone excess feedback yaw moment required value Mfbdmd_a, respectively. Alternatively, the processor 221 may be omitted, so that Mfbdmd_a=Mfbdmd applies.

Subsequently, the actuator operation FB target value determiner 20b carries out the processing by an actuator operation FB target value distribution processor 222 to determine an actuator operation FB target value. In this case, according to the present embodiment, each FB target n-th wheel brake moment Mfbdmd_n(n=1, 2, 3, 4) is determined through the intermediary of processors 222f_n and 222g_n. Further, an active steering FB target lateral force Fyfbdmd_f is determined by a processor 222e. The processing by the processor 222e is the same as that in the aforesaid first embodiment. Incidentally, the processor 222e may be omitted.

Each FB target n-th wheel brake moment Mfbdmd_n (n=1, 2, 3, 4) is determined as follows. Basically, the FB target n-th wheel brake moment Mfbdmd_n(n=1, 2, 3, 4) is determined such that, if Mfbdmd_a is positive, then the moment is generated by manipulating (correcting) the road surface reaction forces of the left wheels W1 and W3 of the actual vehicle 1, and if Mfbdmd_a is negative, then the moment is generated by manipulating (correcting) the road surface reaction forces of the right wheels W2 and W4 of the actual vehicle 1.

To be more specific, first, each n-th wheel distribution gain Kn is determined by the processor 222f_n(n=1, 2, 3, 4) associated with the wheels W1 to W4. The n-th wheel distribution gain Kn is determined in the same manner as that in the first embodiment. More specifically, K1 and K2 associated with the front wheels W1 and W2 are respectively determined as shown by, for example, the graph in the aforesaid FIG. 14(a) on the basis of the actual front wheel side slip angle βf_act as the front wheel gain adjustment parameter. Further, K3 and K4 associated with the rear wheels W3 and W4 are respectively determined as shown by, for example, the graph of the aforesaid FIG. 14(b) on the basis of the actual rear wheel side slip angle βr_act as the rear wheel gain adjustment parameter. Then, each processor 222f_n(n=1, 2, 3, 4) multiplies Mfbdmd_a by the n-th wheel distribution gain Kn thereby to determine an n-th wheel distribution moment basic value Mfb_n. The polarity (direction) of Mfb_n thus determined is the same as Mfbdmd_a. The n-th wheel distribution gain Kn may be determined in any one manner explained in the aforesaid first embodiment, besides it is determined as described above on the basis of βf_act or βr_act. And, in this case, the front wheel gain adjustment parameter and the rear wheel gain adjustment parameter may use parameters other than βf_act or βr_act, as with the aforesaid first embodiment.

Subsequently, the actuator operation FB target value distribution processor 222 passes each of the n-th wheel distribution moment basic values Mfb_n(n=1, 2, 3, 4), which has been determined as described above, through a limiter 222g_n associated with the n-th wheel Wn to determine each of the FB target n-th wheel brake moments Mfbdmd_n.

Here, the graphs of the limiters 222g_n(n=1, 2, 3, 4) in FIG. 22 are graphs illustrating the relationships between Mfb_n and Mfbdmd_n, the values in the direction of the axis of abscissas related to the graphs being the values of Mfb_n, while the values in the direction of the axis of ordinates being the values of Mfbdmd_n.

Among the limiters 222g_n, the limiters 222g_1 and 222g_3 associated with the first wheel W1 and the third wheel W3 directly output Mfb_n as Mfbdmd_n without processing it only if the values of Mfb_n(n=1, 3) supplied thereto are zero or positive values. If Mfb_n is a negative value, then the value of Mfbdmd_n to be output is set to zero regardless of the value of Mfb_n. In other words, Mfbdmd_n is determined by placing a restriction on Mfb_n by setting zero as the lower limit value.

Meanwhile, the limiters 222g_2 and 222g_4 associated with the second wheel W2 and the fourth wheel W4 directly output Mfb_n as Mfbdmd_n without processing it only if the values of Mfb_n(n=2, 4) supplied thereto are zero or negative values. If Mfb_n is a positive value, then the value of Mfbdmd_n to be output is set to zero regardless of the value of Mfb_n. In other words, Mfbdmd_n is determined by placing a restriction on Mfb_n by setting zero as the upper limit value.

By determining the FB target n-th wheel brake moment Mfbdmd_n(n=1, 2, 3, 4) as described above, if Mfbdmd_a>0, then the road surface reaction forces of the left wheels W1 and W3 of the actual vehicle 1 are corrected thereby to determine Mfbdmd_n such that a moment in the yaw direction that is substantially equal to Mfbdmd_a is generated about the center-of-gravity point G of the actual vehicle 1. In this case, Mfbdmd_1 and Mfbdmd_3 of the first wheel W1 and the third wheel W3, respectively, will be proportional to Mfbdmd_a (a value obtained by multiplying Mfbdmd_a by K1 or K3). As a result, the relationship between changes in Mfbdmd_a and changes in Mfbdmd_1 and Mfbdmd_3 will be a proportional relation. Further, the first wheel distribution gain K1 as the front wheel gain and the third wheel distribution gain K3 as a rear wheel gain in the proportional relationship will change on the basis of a front wheel gain adjustment parameter (βf_act in the present embodiment) and a rear wheel gain adjustment parameter (βr_act in the present embodiment), respectively.

If Mfbdmd_a<0, then Mfbdmd_n is determined such that a moment in the yaw direction that is substantially equal to Mfbdmd_a is generated about the center-of-gravity point G of the actual vehicle 1 by correcting the road surface reaction forces of the right wheels W2 and W4 of the actual vehicle 1 by an operation of the braking device of the driving/braking device 3A. In this case, Mfbdmd_2 and Mfbdmd_4 of the second wheel W2 and the fourth wheel W4, respectively, will be proportional to Mfbdmd_a (a value obtained by multiplying Mfbdmd_a by K2 or K4). As a result, the relationship between changes in Mfbdmd_a and changes in Mfbdmd_2 and Mfbdmd_4 will be a proportional relation. Further, the second wheel distribution gain K2 as the front wheel gain and the fourth wheel distribution gain K4 as a rear wheel gain in the proportional relation will change on the basis of a front wheel gain adjustment parameter (βf_act in the present embodiment) and a rear wheel gain adjustment parameter (βr_act in the present embodiment), respectively.

The limiters 222g_n(n=1, 3) associated with the first wheel W1 and the third wheel W3 may determine Mfbdmd_n by placing a restriction on Mfb_n by setting a value that is slightly smaller than zero as the lower limit value of Mfbdmd_n. Similarly, the limiters 222g_n(n=2, 4) associated with the second wheel W2 and the fourth wheel W4 may determine Mfbdmd_n by placing a restriction on Mfb_n by setting a value that is slightly larger than zero as the upper limit value of Mfbdmd_n.

The above has explained in detail the processing by the actuator operation FB target value determiner 20b in the present embodiment.

Supplementally, in the present embodiment, the FB target n-th wheel brake moment Mfbdmd_n(n=1, 2, 3, 4) corresponds to the feedback control input in the present invention. In other words, Mfbdmd_n has a meaning as the target value of a moment in the yaw direction generated about the center-of-gravity point G of the actual vehicle 1 due to the manipulation of the driving/braking force of the wheel Wn thereby.

The processing by the actuator operation target value synthesizer 24 in the present embodiment will now be explained with reference to FIG. 23 and FIG. 24. FIG. 23 is a functional block diagram illustrating the processing function of the actuator operation target value synthesizer 24, and FIG. 24 is a flowchart illustrating the processing by an optimum target n-th driving/braking force determiner of the processing function.

Referring to FIG. 23, the actuator operation target value synthesizer 24 in the present embodiment is equipped with an optimum target n-th driving/braking force determiner 241b_n(n=1, 2, 3, 4) which determines a target n-th wheel driving/braking force Fxcmd_n and a target n-th wheel slip ratio Scmd_n and an optimum active steering angle determiner 247 which determines a target front wheel steering angle δfcmd.

The processing by the optimum active steering angle determiner 247 is the same as that in the first embodiment. Meanwhile, the processing by the optimum target n-th driving/braking force determiner 241b_n differs from that in the first embodiment. Further, as with the aforesaid first embodiment, the actuator operation target value synthesizer 24 outputs an FF target first wheel driving system driving/braking force, an FF target second wheel driving system driving/braking force, and an FF target transmission reduction gear ratio of the actuator operation FF target value determined by the aforesaid FE law 22 as a target first wheel driving system driving/braking force, a target second wheel driving system driving/braking force, and a target transmission reduction gear ratio, respectively.

In the present embodiment, each of the optimum target n-th driving/braking force determiners 241b_n(n=1, 2) associated with the front wheels W1 and W2 receives an FF total target n-th wheel driving/braking force FFtotal_n, which is the sum of an FF target n-th wheel brake driving/braking force and an FF target n-th wheel driving system driving/braking force (this is determined by an adder 240, as with the first embodiment) of the actuator operation FF target value determined by the FE law 22, and an FB target n-th wheel brake moment Mfbdmd_n of the actuator operation FB target value determined by the actuator operation FB target value determiner 20b. The optimum target n-th driving/braking force determiners 241b_n(n=1, 2) associated with the front wheels W1 and W2 receive a latest value (a current time value) of the actual front wheel side slip angle βf_act and a latest value (a current time value) of an estimated friction coefficient μestm, as with the first embodiment. In addition, although not shown, a latest value (a current time value) of the actual front wheel steering angle δf_act is also input to the optimum target n-th driving/braking force determiner 241b_n(n=1, 2).

Further, each of the optimum target n-th driving/braking force determiners 241b_n(n=3, 4) associated with the rear wheels W3 and W4 receives an FF target n-th wheel brake driving/braking force of the actuator operation FF target value determined by the FF law 22 as the FF total target n-th wheel driving/braking force FFtotal_n and also receives an FB target n-th wheel brake moment Mfbdmd_n of the actuator operation FB target value determined by the actuator operation FB target value determiner 20b. Each of the optimum target n-th driving/braking force determiners 241b_n (n=3, 4) associated with the rear wheels W3 and W4 also receives a latest value (a current time value) of the actual rear wheel side slip angle βr_act and a latest value (a current time value) of an estimated friction coefficient μestm, as with the case of the first embodiment.

Then, each of the optimum target n-th driving/braking force determiners 241b_n(n=1, 2, 3, 4) determines the target n-th wheel driving/braking force Fxcmd_n and the target n-th wheel slip ratio Scmd_n on the basis of the supplied inputs, and outputs the determined results.

The following will explain the processing by each of the optimum target n-th driving/braking force determiners 241b-n(n=1, 2, 3, 4) with reference to FIG. 24.

First, in S200, it is preconditioned that the side slip angle of the n-th wheel Wn (n=1, 2, 3, 4) is an actual side slip angle (more specifically, the actual front wheel side slip angle βf_act if n=1 or 2 and the actual rear wheel side slip angle βr_act if n=3 or 4), and a road surface friction coefficient (the coefficient of friction between the n-th wheel Wn and a road surface) is the estimated friction coefficient μestm. Then, based on the precondition, a slip ratio Sff_n associated with the FF total target n-th wheel driving/braking force FFtotal_n is determined. More specifically, based on the precondition, the value of the slip ratio associated with a driving/braking force that agrees with or is closest to FFtotal_n in the driving/braking force that can be generated in the n-th wheel Wn is determined as Sff_n. In this case, the slip ratio associated with FFtotal_n may be determined on the basis of, for example, the map used for the processing in S100 of FIG. 19 in the aforesaid first embodiment, and the determined slip ratio may be determined as Sff_n. If a slip ratio associated with FFtotal_n has two kinds of values, then the slip ratio that is closer to zero is determined as Sff_n. In other words, in the relationship between the slip ratio of the n-th wheel Wn and the driving/braking force (the relationship based on the aforesaid wheel characteristics relationship), Sff_n is determined within the range between the value of the slip ratio, at which the driving/braking force reaches a peak value (extremal value), and zero. If FFtotal_n deviates from the range of values of the driving/braking forces that can be generated in the n-th wheel Wn under the aforesaid precondition, then the value of the slip ratio associated with the value of a driving/braking force closest to FFtotal_n is determined as Sff_n.

Subsequently, the procedure proceeds to S202 wherein a lateral force Fyff_n of the n-th wheel Wn when the slip ratio of the n-th wheel Wn is Sff_n is determined. In this case, the lateral force Fyff_n may be determined from the value of the actual side slip angle βf_act or βr_act of the n-th wheel Wn, the value of the estimated road surface friction coefficient μestm, and the value of Sff_n on the basis of, for example, a map which is prepared in advance and which illustrates the relationship among the side slip angle, the road surface friction coefficient, the slip ratio, and the lateral force of the n-th wheel Wn (the relationship based on the aforesaid wheel characteristics relationship). Incidentally, the map may include an actual ground contact load Fzact_n of the n-th wheel Wn as a variable parameter.

Subsequently, the procedure proceeds to S204 wherein a moment Mff_n in the yaw direction that is generated about the center-of-gravity point G of the actual vehicle 1 due to the resultant vector of FFtotal_n, which is the driving/braking force of the n-th wheel Wn, and Fyff_n, which is the lateral force of the n-th wheel Wn, when the slip ratio is Sff_n is determined. To be more specific, if the n-th wheel Wn is the front wheel W1 or W2 (n=1 or 2), then a position vector (a position vector on a horizontal plane) of the center-of-gravity point G of the actual vehicle 1 observed from the n-th wheel Wn is determined on the basis of the actual front wheel steering angle δf_act. Then, the outer product (vector product) of the position vector and the aforesaid resultant vector may be calculated so as to determine Mff_n. Further, if the n-th wheel Wn is the rear wheel W3 or W4 (n=3 or 4), then the outer product (vector product) of the position vector (a position vector on a horizontal plane, which is set in advance) of the center-of-gravity point G of the actual vehicle 1 observed from the n-th wheel Wn and the aforesaid resultant force vector may be calculated so as to determine Mff_n. The Mff_n may alternatively be determined according to a map, which is prepared beforehand, from FFtotal_n, Fyff_n and the actual front wheel steering angle δf_act (if n=1 or 2) or from FFtotal_n and Fyff_n (if n=3 or 4). The Mff_n thus determined corresponds to the feedforward required moment (a required moment when Mfbdmd_n=0) of the n-th wheel.

Subsequently, the procedure proceeds to S206 wherein the Mff_n determined as described above and the FB target brake moment Mfbdmd_n are added up thereby to calculate a temporary target moment candidate Mcand_n, which is a temporary target value of a moment (a moment in the yaw direction) about the center-of-gravity point G of the actual vehicle 1 by a road surface reaction force of the n-th wheel Wn. This Mcand_n means a moment in the yaw direction which should be generated about the center-of-gravity point G of the actual vehicle 1 on the basis of a control request in the n-th wheel Wn. Further, if the n-th wheel Wn is regarded as the k-th wheel in the present invention, then the Mcand_n corresponds to the unlimited k-th wheel required moment in the present invention.

Subsequently, the procedure proceeds to S208 wherein an n-th wheel slip ratio at the generation of a maximum moment Smmax_n is determined on a precondition that the side slip angle of the n-th wheel Wn (n=1, 2, 3, 4) is an actual side slip angle (more specifically, the actual front wheel side slip angle βf_act if n=1 or 2 and the actual rear wheel side slip angle βr_act if n=3 or 4), and a road surface friction coefficient (the coefficient of friction between the n-th wheel Wn and a road surface) is the estimated friction coefficient μestm. This processing is carried out in the same manner as that for determining the n-th wheel slip ratio at the generation of a maximum moment Smmax_n in S102 of FIG. 19 in the aforesaid first embodiment. However, Smmax_n is determined such that the moment (maximum moment) generated about the center-of-gravity point G of the actual vehicle 1 by the resultant force of the driving/braking force and the lateral force produced in the n-th wheel Wn in response thereto reaches a maximum value thereof toward the polarity (direction) of the feedback yaw moment basic required value Mfbdmd. The Smmax_n determined as described above means the slip ratio associated with the k-th wheel driving/braking force at the generation of a maximum moment in the present invention.

Subsequently, the procedure proceeds to S210 wherein the slip ratio Scand_n when a moment in the yaw direction agrees with the Mcand_n or becomes closest to Mcand_n determined in S206 between the value of Smmax_n determined as described above and zero is determined.

The processing in S210 may exploratively determine Scand_n on the basis of, for example, the map which is prepared in advance and which illustrates the relationship among the actual side slip angle, the road surface friction coefficient, the slip ratio, the driving/braking force, and the lateral force of the n-th wheel Wn (the relationship based on the wheel characteristics relationship) and the actual front wheel steering angle δf_act (if n=1 or 2), or according to the map (if n=3 or 4) under the aforesaid precondition.

Subsequently, the target n-th wheel slip ratio Scmd_n is determined by the processing in S212 to S216. In this case, Scmd_n is determined such that the absolute value of the driving/braking force (the driving/braking force in the braking direction) associated with Scmd_n does not become smaller than the absolute value of the FF total target n-th wheel driving/braking force FFtotal_n if both Scand_n and Sff_n are positive values (in other words, if the driving/braking forces of the n-th wheels Wn associated with Scand_n and Sff_n, respectively, are both the driving/braking forces in the braking direction).

To be more specific, it is determined in S212 whether Scand_n>Sff_n>0 applies, and if the determination result is YES, then the procedure proceeds to S214 wherein the value of Scand_n is substituted into Scmd_n. If the determination result in S212 is NO, then the procedure proceeds to S216 wherein the value of Sff_n is substituted into Scmd_n.

Subsequently, the procedure proceeds to S218 wherein the driving/braking force of the n-th wheel Wn associated with the Scmd_n determined as described above is determined as a target n-th wheel driving/braking force Fxcmd_n. In this case, Fxcmd_n associated with the value of the Scmd_n is determined on the basis of, for example, a map which illustrates the relationship between slip ratios and driving/braking forces and which is prepared beforehand.

The above has described the processing by the optimum target n-th driving/braking force determiner 242b-n in the present embodiment.

Supplementally, the present embodiment uses, in place of the condition (3) in the aforesaid first embodiment, a condition that the target n-th wheel driving/braking force Fxcmd_n takes a value within the range of values of driving/braking forces that can be generated in the n-th wheel Wn according to the aforesaid wheel characteristics relationship (the wheel characteristics relationship that holds on the basis of a precondition that the side slip angle of the n-th wheel Wn is the actual side slip angle βf_act or βr_act and the road surface friction coefficient is the estimated friction coefficient μestm) and a moment in the yaw direction generated about the center-of-gravity point G of the actual vehicle 1 by a road surface reaction force that has a driving/braking force component equal to Fxcmd_n among the road surface reaction forces that can be generated in the n-th wheel Wn according to the wheel characteristics relationship agrees with or is close to the aforesaid Mcand_n as much as possible (the absolute value of a difference from Mcand_n is minimized). In addition, among this condition (hereinafter referred to as condition (3)') and the aforesaid conditions (1) and (2), the aforesaid condition (1) is defined as the highest-priority condition and the condition (2) is defined as the next-rank condition, and then the target n-th wheel driving/braking force Fxcmd_n is determined such that the conditions (1), (2), and (3)' are satisfied according to the order of priority. In this case, Fxcmd_n is determined by the processing up to S210 described above such that condition (3)' is satisfied as much as possible within a range in which condition (2) is eventually satisfied. More specifically, if the driving/braking force associated with Scand_n determined by the processing in S210 (the driving/braking force associated with Scmd_n obtained when the determination result in S212 is YES) is determined as the target n-th wheel driving/braking force Fxcmd_n, then the Fxcmd_n will satisfy conditions (2) and (3)' while condition (2) being treated as the preferential condition. Further, Fxcmd_n is determined such that the highest-priority condition (1) is satisfied by carrying out the processing in S212 to S216.

The following will explain some modifications of the first to the third embodiments described above.

The following will explain some modifications of the first to the third embodiments described above.

[Modification 1]

In the first to the third embodiments described above, the reference yaw rate γd and the reference vehicle center-of-gravity point side slip angle βd have been used as the reference state amounts; alternatively, however, the following may be applied. For example, only the reference yaw rate γd may be sequentially determined as a reference state amount by a reference dynamic characteristics model. Then, the reference dynamic characteristics model and the actuator devices 3 of the actual vehicle 1 may be manipulated to approximate the state amount error γerr, which is a difference between the actual yaw rate γact and the reference yaw rate γd thereof, to zero. In this case, in place of the reference dynamic characteristics model 16 represented by the aforesaid expression 01, a reference dynamic characteristics model 56 shown in FIG. 28, for example, may be used to sequentially determine the reference yaw rate γd.

The following will explain in detail the reference dynamic characteristics model 56 in FIG. 28. The reference dynamic characteristics model 56 sequentially receives, at each control processing cycle, a steering angle θh, an actual traveling velocity Vact, and a virtual external force moment (a moment in the yaw direction) Mvir as a control input for manipulating the reference dynamic characteristics model 56 (a control input for approximating γerr to zero). Incidentally, θh and Vact take latest values (current time values) and Mvir takes a last time value.

Then, the reference dynamic characteristics model 56 first determines a stabilization target yaw rate γ∞ from the input θh and Vact according to a map for determining stabilization target values 56a. The stabilization target yaw rate γ∞ means a convergence value of a yaw rate of a model vehicle (a vehicle on the reference dynamic characteristics model 56 in the present embodiment) when the θh and Vact are steadily maintained at their input values. Incidentally, the map for determining stabilization target values 56a is desirably set beforehand on the basis of the estimated friction coefficient μestm.

Subsequently, the last time value of the reference yaw rate γd (the value determined at the last time control processing cycle from the reference dynamic characteristics model 56) and the stabilization target yaw rate γ∞ are input to a flywheel follow-up law 56b. Then, a flywheel FB moment Mfb is determined by the flywheel follow-up 56b. Here, according to the present embodiment, a rotational motion of the model vehicle in the yaw direction thereof is expressed in terms of a rotational motion of a horizontal flywheel (a flywheel whose rotational axis is an axis in the vertical direction). Then, the rotational angular velocity of the flywheel is output as a reference yaw rate γd.

Then, the flywheel follow-up law 56b determines the flywheel FB moment Mfb as a moment to be input to the flywheel (a control input of the dimension of an external force to be input to the flywheel) according to a feedback control law (e.g., a proportional law or a proportional-derivative law) such that the rotational angular velocity of the flywheel, that is, the reference yaw rate γd, is converged to the stabilization target yaw rate γ∞.

Subsequently, the reference dynamic characteristics model 56 adds the virtual external force moment Mvir to the Mfb by an adder 56c to determine an input (moment) to the flywheel. Then, the input moment is divided by an inertial moment J of the flywheel in a processor 56d thereby to determine a rotational angular acceleration of the flywheel. Further, a value obtained by integrating the rotational angular acceleration (the integration is expressed by an operator "1/s" in the figure) is output as a reference yaw rate γd.

The value of the inertial moment J of the flywheel may be set to a value which is the same or substantially the same as, for example, the value of an inertial moment about the center-of-gravity point G of the actual vehicle 1. Alternatively, a value identified while the actual vehicle 1 is traveling may be used.

The above has explained the details of the processing by the reference dynamic characteristics model 56.

Supplementally, the processing other than that by the reference dynamic characteristics model 56 in this modification 1 may be the same as, for example, the aforesaid first embodiment. However, in the processing by the virtual external force determiner 20a of the aforesaid first embodiment, Mvir is determined by setting, for example, βerr, βda, and βover to zero, and the Mvir is fed back to the reference dynamic characteristics model 56. In this case, regarding γda, the value of a yaw rate of the vehicle on the reference dynamic characteristics model 56 after predetermined time may be predicted from, for example, the current time values of Vact and θh and a temporary value Mvirtmp of Mvir based on γerr, and the predicted value may be used as γda. Alternatively, for example, the current time value of γact or the linearly coupled value of γact and γd may be used as γda. Further, in the processing by an actuator operation FB target value determiner 20b, the processing explained in the aforesaid first embodiment is carried out by setting βerr to zero. In this modification 1, the processing by the reference manipulated variable determiner 14 is unnecessary. The rest may be the same as the processing explained in the aforesaid first embodiment.

[Modification 2]

In the first to the third embodiments described above, the vehicle center-of-gravity point side slip angle β and the yaw rate γ have been used as the basal state amount related to the translational motion in the lateral direction of the vehicle (the actual vehicle 1 and the model vehicle) and the basal state amount related to a rotational motion (as the first state amounts in the present invention); alternatively, however, other state amounts may be used. More specifically, the description of a vehicle motion may be transformed from a system based on β and γ into a system based on a set of other state amounts by an appropriate transformation matrix.

For example, a vehicle side slip velocity Vy, which is the side slip velocity (a lateral component of the traveling velocity Vact) of the center-of-gravity point of the vehicle, may be used in place of a vehicle center-of-gravity point side slip angle β. Supplementally, if a change in the traveling velocity Vact of the vehicle is slow as compared with the vehicle center-of-gravity point side slip angle β or the yaw rate γ and the traveling velocity Vact can be regarded as being constant, then β and dβ/dt (a temporal differential value of β) can be converted into Vy and dVy/dt (a temporal differential value of Vy), respectively, according to the following expressions 50a and 50b.

$$Vy = Vact \cdot \beta \qquad \text{Expression 50a}$$

$$dVy/dt = Vact \cdot d\beta/dt \qquad \text{Expression 50b}$$

Further, for example, a vehicle side slip acceleration αy, which is a side slip acceleration of the center-of-gravity point of the vehicle (a temporal change rate of Vy) and the yaw rate γ may be used as the basal state amounts.

Supplementally, the vehicle side slip acceleration αy denotes the temporal differential value of the vehicle side slip velocity Vy=Vact·β. In other words, the following expression 51 holds.

$$\alpha y = d(Vact \cdot \beta)/dt = dVact/dt \cdot \beta + Vact \cdot d\beta/dt \qquad 51$$

Further, if a change in the traveling velocity Vact of the vehicle is slow as compared with the side slip angle β or the yaw rate γ, and Vact can be regarded as being constant (if it can be regarded as dVact/dt≈0), then the following expression 52 approximately holds on the basis of the aforesaid expression 01 and expression 51.

$$\alpha y = Vact \cdot d\beta/dt = a11 \cdot Vact \cdot \beta + a12 \cdot Vact \cdot \gamma \qquad \text{Expression 52}$$

Hence, a system using β and γ as its bases is transformed into a system using αy and γ as its bases according to a transformation expression indicated by the following expression 53.

[Mathematical expression 9]

$$\begin{bmatrix} \alpha y \\ \gamma \end{bmatrix} = \begin{bmatrix} a11 \cdot Vact & a12 \cdot Vact \\ 0 & 1 \end{bmatrix} \cdot \begin{bmatrix} \beta \\ \gamma \end{bmatrix} \qquad \text{Expression 53}$$

As described above, the description of a vehicle motion can be transformed from a system using β and γ as its bases into a system using Vy and γ as its bases, a system using αy and γ as its bases, or the like by an appropriate matrix. And, when the bases of vehicle motions are transformed as described above, the respective element values of a matrix related to a state amount (a yaw rate and a vehicle center-of-gravity point side slip angle) explained in the aforesaid first to third embodiments will be different from those in the embodiments, but for the rest, "the vehicle center-of-gravity point side slip angle" in each of the aforesaid embodiments may be reread to "the vehicle side slip velocity Vy" or "the vehicle side slip acceleration." Thus, an embodiment that uses a pair of Vy and γ or a pair of αy and γ as a state amount can be constructed in the same manner as that of the aforesaid first to third embodiments.

In place of the vehicle side slip acceleration αy, a lateral acceleration αy'(=αy+Vact·γ) obtained by adding a centripetal acceleration of the vehicle (=Vact·γ) to the vehicle side slip acceleration αy may be used.

Further, a side slip angle, a side slip velocity, a side slip acceleration or a lateral acceleration of the vehicle at a position other than the center-of-gravity point (e.g., a position on a rear wheel) may be used in place of the side slip angle β or the side slip velocity Vy at the center-of-gravity point of the vehicle. In this case also, the description of a vehicle motion can be transformed from a system using the vehicle centerof-gravity point side slip angle β and the yaw rate γ as its bases into a system using the side slip angle or a side slip velocity, a side slip acceleration or a lateral acceleration of the vehicle at a position other than the center-of-gravity point of the vehicle, and the yaw rate γ as its bases by an appropriate matrix.

Further, for a restriction object amount in the FB distribution law 20, a predicted value or a current time value (a latest value) or a filtered value of a side slip velocity or a side slip acceleration or a lateral acceleration of the center-of-gravity point may be used in place of the vehicle center-of-gravity point side slip angle β of the actual vehicle 1 or the model vehicle. Further, a predicted value or a current time value (a latest value) or a filtered value of a side slip angle or a side slip velocity, a side slip acceleration or a lateral acceleration of the vehicle at a position other than the center-of-gravity point of the vehicle may be used as a restriction object amount.

[Modification 3]

In the first to the third embodiments described above, the virtual external forces Mvir and Fvir have been used as the control inputs for manipulating the model for bringing the state amount errors γerr and βerr close to zero; however, the control inputs for manipulating the vehicle model are not limited to virtual external forces. For example, all wheels of the model vehicle may be steering control wheels regardless of whether the actual vehicle 1 is equipped with a steering device that permits steering of all the wheels W1 to W4. And, the steering angles of the steering control wheels of the model vehicle and the driving/braking forces of the wheels of the model vehicle may be manipulated such that a compensation amount (a correction required amount) of a road surface reaction force corresponding to a virtual external force is produced in the model vehicle (so as to eventually approximate state amount errors to zero). In this case, if the reference dynamic characteristics model is a linear system (a system that exhibits no saturation characteristics in road surface reaction force on the reference dynamic characteristics model), then an advantage equivalent to that obtained by imparting a virtual external force to a model vehicle can be provided by manipulating the steering angles of the steering control wheels of the model vehicle and the driving/braking forces of the wheels of the model vehicle.

For example, expression 60 given below may be used instead of the aforesaid expression 01 as the expression representing the dynamic characteristics of a reference dynamic characteristics model.

[Mathematical expression 10]

$$\frac{d}{dt}\begin{bmatrix} \beta d \\ \gamma d \end{bmatrix} = \begin{bmatrix} a11 & a12 \\ a21 & a22 \end{bmatrix} \cdot \begin{bmatrix} \beta d \\ \gamma d \end{bmatrix} + \begin{bmatrix} b1 \\ b2 \end{bmatrix} \cdot$$

$$(\delta f\_ltd2 + \delta f\_fb) + \begin{bmatrix} b3 \\ b4 \end{bmatrix} \cdot \delta r\_fb +$$

$$b5 \cdot \begin{bmatrix} 0 \\ Fx2fb - Fx1fb \end{bmatrix} + b6 \cdot \begin{bmatrix} 0 \\ Fx4fb - Fx3fb \end{bmatrix}$$

Expression 60

The reference dynamic characteristics model represented by this expression 60 is a model which uses a compensation amount of a steering angle of a front wheel δf_fb, a compensation amount (a correction required amount) of a steering angle of a rear wheel δr_fb, and compensation amounts (correction required amounts) of the driving/braking forces of the first to the fourth wheels Fx1fb, Fx2fb, Fx3fb, and Fx4fb of the model vehicle as the feedback control inputs for manipulating the model. Incidentally, a11, a12, a21, a22, b1, and b2 in expression 60 may be the same as those given in the note of the expression 01. Further, b3 and b4 may be, for example, b3=2·Kr/(m·Vd) and b4=2·Lr·Kr/I. The fourth term of the right side of expression 60 indicates a moment generated about the center-of-gravity point of the model vehicle by the compensation amounts Fx1fb and Fx2fb of the driving/braking forces of the front wheels of the model vehicle (this means a moment generated about the center-of-gravity point of the model vehicle when the driving/braking force of Fx1fb is generated in the front wheel W1 of the model vehicle provided with the four wheels W1 to W4 as shown in the aforesaid FIG. 13 and the driving/braking force of Fx2fb is generated in the front wheel W2). Further, the fifth term indicates a moment generated about the center-of-gravity point of the model vehicle by the compensation amounts Fx3fb and Fx4fb of the driving/braking forces of the rear wheels of the model vehicle (this means a moment generated about the center-of-gravity point of the model vehicle when the driving/braking force of Fx3fb is generated in the rear wheel W3 of the model vehicle provided with the four wheels W1 to W4 as shown in the aforesaid FIG. 13 and the driving/braking force of Fx4fb is generated in the rear wheel W4). Hence, coefficients b5 and b6 of the fourth term and the fifth term are coefficients defined on the basis of at least the tread of the front wheels and the tread of the rear wheels, respectively, of the model vehicle. The coefficients may be corrected on the basis of the steering angles of the front wheels or the steering angles of the rear wheels of the model vehicle.

When the reference dynamic characteristics model represented by such expression 60 is used, the compensation amount of a steering angle of a front wheel δf_fb and the compensation amount of a steering angle of a rear wheel δr_fb may be determined by using, for example, expressions 61a and 61b shown below. Expression 61a is an expression corresponding to the expression 15 and expression 61b is an expression corresponding to the expressions 17, 18a, and 18b.

[Mathematical expression 11]

$$\begin{bmatrix} \delta f\_fbtmp \\ \delta r\_fbtmp \end{bmatrix} = \begin{bmatrix} Kmdlstrtmp11 & Kmdlstrtmp12 \\ Kmdlstrtmp21 & Kmdlstrtmp22 \end{bmatrix} \cdot \begin{bmatrix} \beta err \\ \gamma err \end{bmatrix}$$

Expression 61a $$\begin{bmatrix} \delta f\_fb \\ \delta r\_fb \end{bmatrix} = \begin{bmatrix} \delta f\_fbtmp \\ \delta r\_fbtmp \end{bmatrix} -$$

$$\begin{bmatrix} Kmdlstrov11 & Kmdlstrov12 \\ Kmdlstrov21 & Kmdlstrov22 \end{bmatrix} \cdot \begin{bmatrix} \beta over \\ \gamma over \end{bmatrix}$$

Expression 61b

δf_fbtmp and δr_fbtmp mean the temporary value of a compensation amount of a front wheel steering angle and a temporary value of a compensation amount of a rear wheel steering angle, respectively, and Herr, γerr, βover, and γover are the same as those explained in the aforesaid first embodiment.

Further, the compensation amounts (the correction required amounts) of the driving/braking forces of the first to the fourth wheels Fx1fb, Fx2fb, Fx3fb, and Fx4fb of the model vehicle or a difference in the compensation amount of the driving/braking forces between the front wheels (Fx2fb−Fx1fb) and a difference in the compensation amount of the driving/braking forces between the rear wheels (Fx4fb−Fx3fb) may be set to, for example, zero.

[Other Modifications]

In the first to the third embodiments described above, the processing by each optimum target n-th driving/braking force determiner 241$a\_n$ or 241$b\_n$(n=1, 2, 3, 4) of the actuator operation target value synthesizer 24 has used the actual front wheel side slip angle $\beta f\_act$ and the actual rear wheel side slip angle $\beta r\_act$. Instead of them, however, the actual vehicle center-of-gravity point side slip angle $\beta act$ may be used. Alternatively, instead of $\beta f\_act$ and $\beta r\_act$, respectively, the front wheel side slip angle $\beta f\_d$ and the rear wheel side slip angle $\beta r\_d$, respectively, of the model vehicle may be used, or instead of $\beta f\_act$ and $\beta r\_act$, the vehicle center-of-gravity point side slip angle $\beta d$ of the model vehicle may be used. Alternatively, the weighted mean values of $\beta f\_act$ and $\beta r\_act$, respectively, of the actual vehicle 1 and $\beta f\_d$ and $\beta r\_d$, respectively, of the model vehicle may be used in place of $\beta f\_act$ and $\beta r\_act$, respectively, or a weighted mean value of $\beta act$ of the actual vehicle 1 and $\beta d$ of the model vehicle may be used in place of $\beta f\_act$ and $\beta r\_act$. In this case, the weights may be provided with a frequency characteristic (e.g., a frequency characteristic that functions as a phase compensating element).

Input values and output values (detected values, estimated values, target values, and the like) to and from the processors in the first to the third embodiments described above may be passed through filters (low-pass filters, high-pass filters, phase compensating elements, or the like) as necessary.

Further, the processing function sections of the controller 10 may transform processing or change the order of processing such that they may be equivalent or approximately equivalent to the first to the third embodiments.

The limiters whose input/output relationships are indicated by polygonal line graphs may be replaced by limiters whose input/output relationships are indicated by, for example, S-shaped graphs.

In order to enhance the accuracy of the reference dynamic characteristics models, the models may be constructed by taking air resistance or the slope angles of road surfaces or the like into account.

The respective gains used in the aforesaid embodiments are desirably changed as necessary according to the actual traveling velocity Vact, the estimated friction coefficient $\mu estm$, and the like.

In the first to the third embodiments described above, the vehicle on the reference dynamic characteristic model 16 is operated on the basis of the state amount errors $\gamma err$ and $\beta err$ (first state amount errors). However, the state amount errors $\gamma err$ and $\beta err$ may not be fed back to the reference dynamic characteristic model 16. In this case, the reference dynamic characteristic model 16 may successively determine reference state amounts by always setting Mvir and Fvir of the aforesaid expression (1) to zero or by an expression which omits the terms related to Mvir and Fvir of expression (1).

Further, in the first and the second embodiments described above, the target n-th wheel driving/braking force Fxcmd_n and the target n-th wheel slip ratio Scmd_n have been determined such that conditions (1), (2) and (3) are satisfied according to the priority ranks thereof. Alternatively, however, Fxcmd_n and Scmd_n may be determined such that, for example, only condition (3) is satisfied. In this case, Fxcand_n and Scand_n determined in S100 of FIG. 1B may be determined as Fxcmd_n and Scmd_n, respectively. Further, Fxcmd_n and Scmd_n may be determined such that conditions (1) and (3) are satisfied according to the priority orders thereof. In this case, the processing in S102, S104 and S108 of FIG. 19 may be omitted. Further, Fxcmd_n and Scmd_n may be determined such that conditions (1) and (2) are satisfied according to the priority orders thereof. In this case, the processing in S110 and S112 of FIG. 19 may be omitted.

Similarly, in the aforesaid third embodiment, Fxcmd_n and Scmd_n may be determined such that only condition (3)' is satisfied instead of determining Fxcmd_n and Scmd_n such that conditions (1), (2) and (3)' are satisfied according to the priority ranks thereof. In this case, for example, a slip ratio associated with a pair of a driving/braking force and a lateral force that permits the generation of a moment in the yaw direction which agrees with or becomes closest to Mcand_n determined in S206 of FIG. 24 described above in the range between a slip ratio at which a driving/braking force reaches a peak value and zero in the aforesaid wheel characteristic relationship may be determined as Scmd_n, and the driving/braking force associated therewith may be determined as Fxcmd_n. Further, Fxcmd_n and Scmd_n may be determined such that conditions (1) and (3)' are satisfied according to the priority ranks thereof. In this case, instead of the processing in S210 of FIG. 24, a slip ratio associated with a pair of a driving/braking force and a lateral force that permits the generation of a moment in the yaw direction which agrees with or becomes closest to Mcand_n determined in S206 of FIG. 24 described above in the range between a slip ratio at which a driving/braking force reaches a peak value and zero in the aforesaid wheel characteristic relationship may be determined as Scand_n. Alternatively, Fxcmd_n and Scmd_n may be determined such that conditions (1) and (2) are satisfied according to the priority ranks thereof. In this case, the processing in S212 and S216 of FIG. 24 may be omitted.

Further, regarding the range that limits the driving/braking forces or slip ratios of the wheels W1 to W4 to satisfy the aforesaid condition (1) or (2), instead of specifying "xx or less" (xx means a certain boundary value), the range may be specified by "not more than a value obtained by multiplying xx by C1." Here, C1 means a correction coefficient and C1 is set to a value in the vicinity of 1.

The first to the third embodiments described above have been explained by taking the four-wheeled vehicle 1 as an example; the present invention, however, can be applied also to a vehicle, such as a two-wheeled motor vehicle.

INDUSTRIAL APPLICABILITY

As is obvious from the above explanation, the present invention is usefully applied to allow motions of an automobile or a two-wheeled motor vehicle to be controlled to desired motions with high robustness.

BRIEF DESCRIPTION OF THE DRAWINGS

[FIG. 17] A functional block diagram illustrating the processing by an FF law in the first embodiment.

Figure 1:
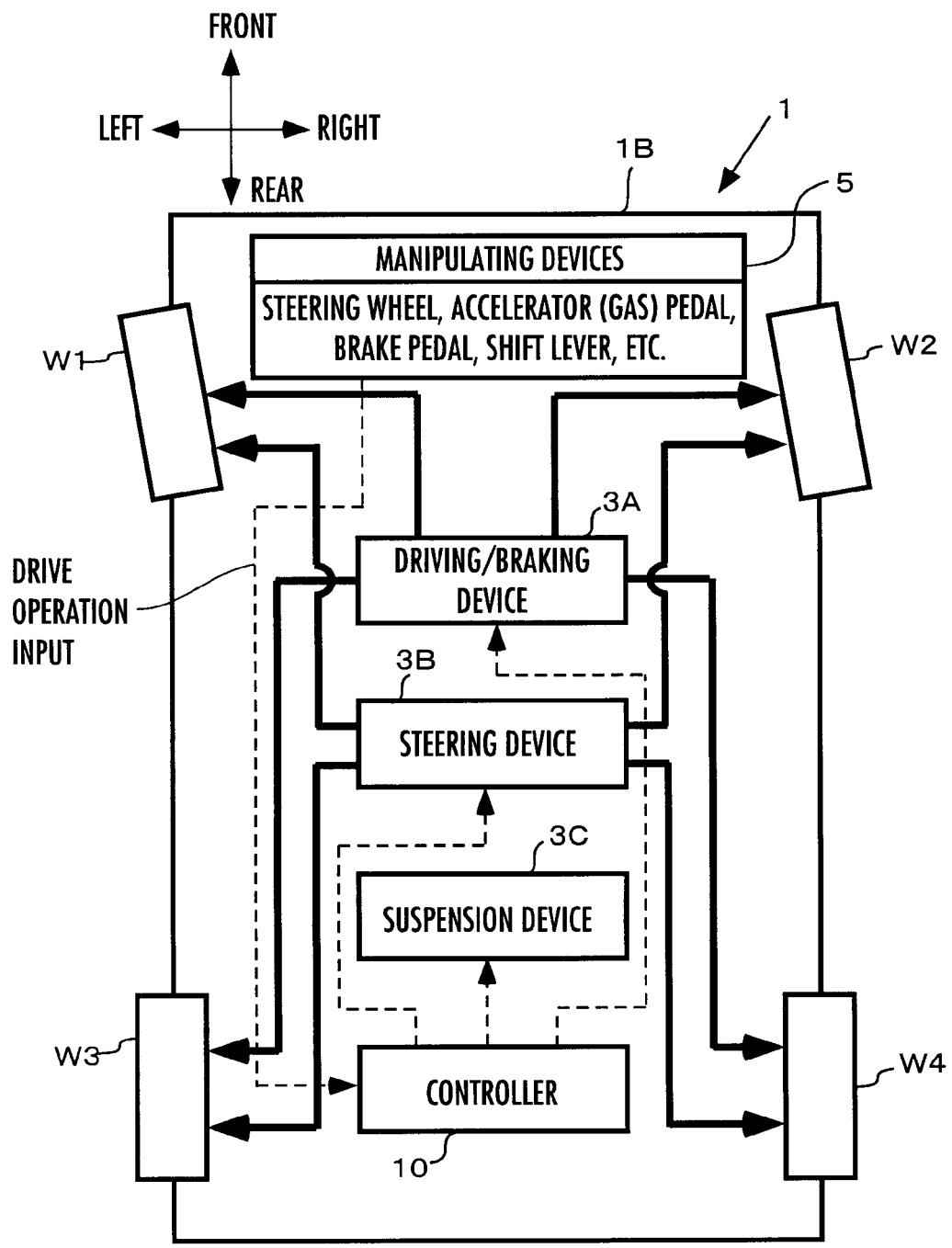
[FIG. 1] A block diagram illustrating a schematic construction of a vehicle in an embodiment of the present invention.
Figure 2:
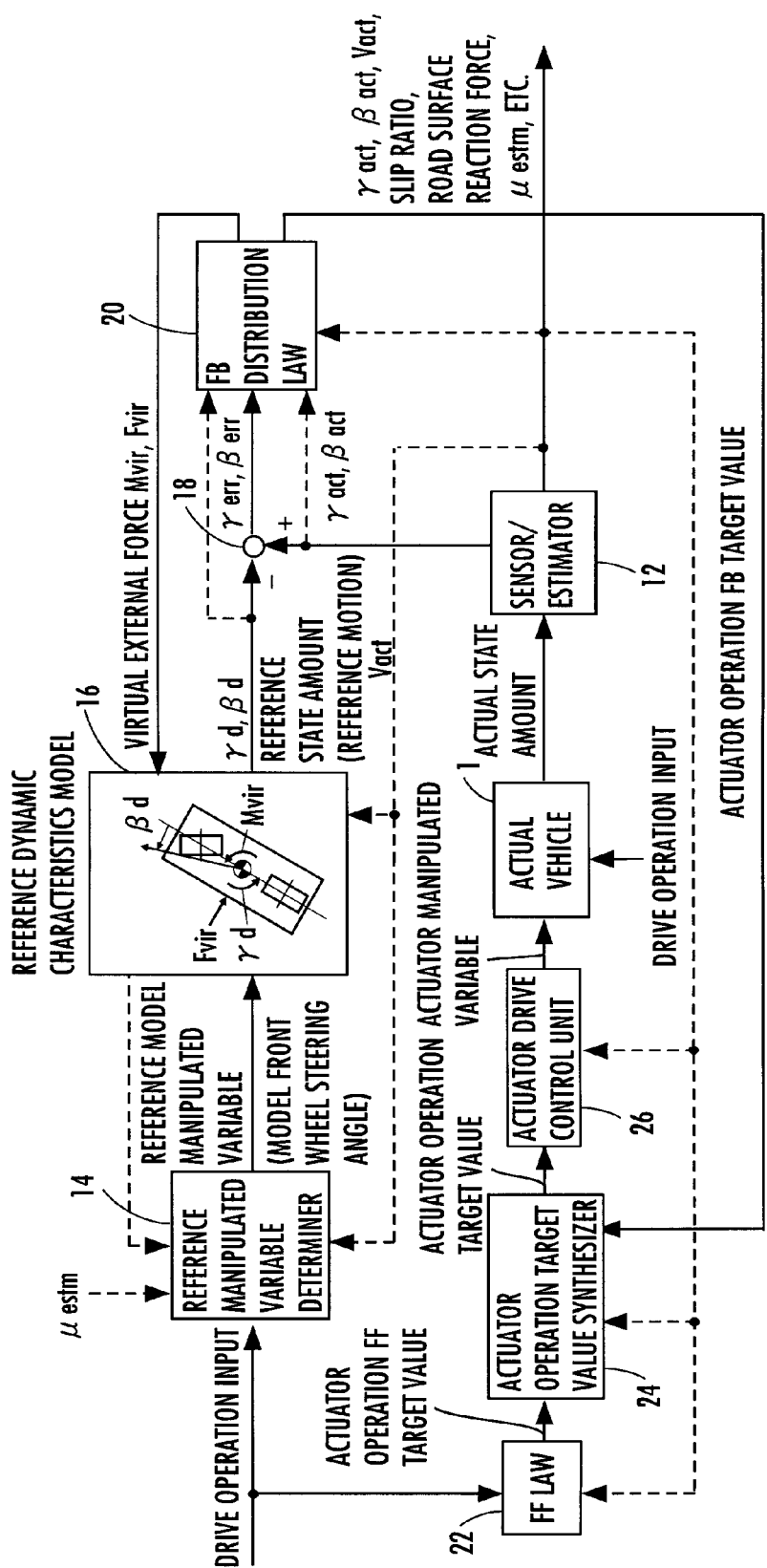
[FIG. 2] A functional block diagram schematically illustrating an overall control processing function of a controller provided in a vehicle in a first embodiment of the present invention.
Figure 3:
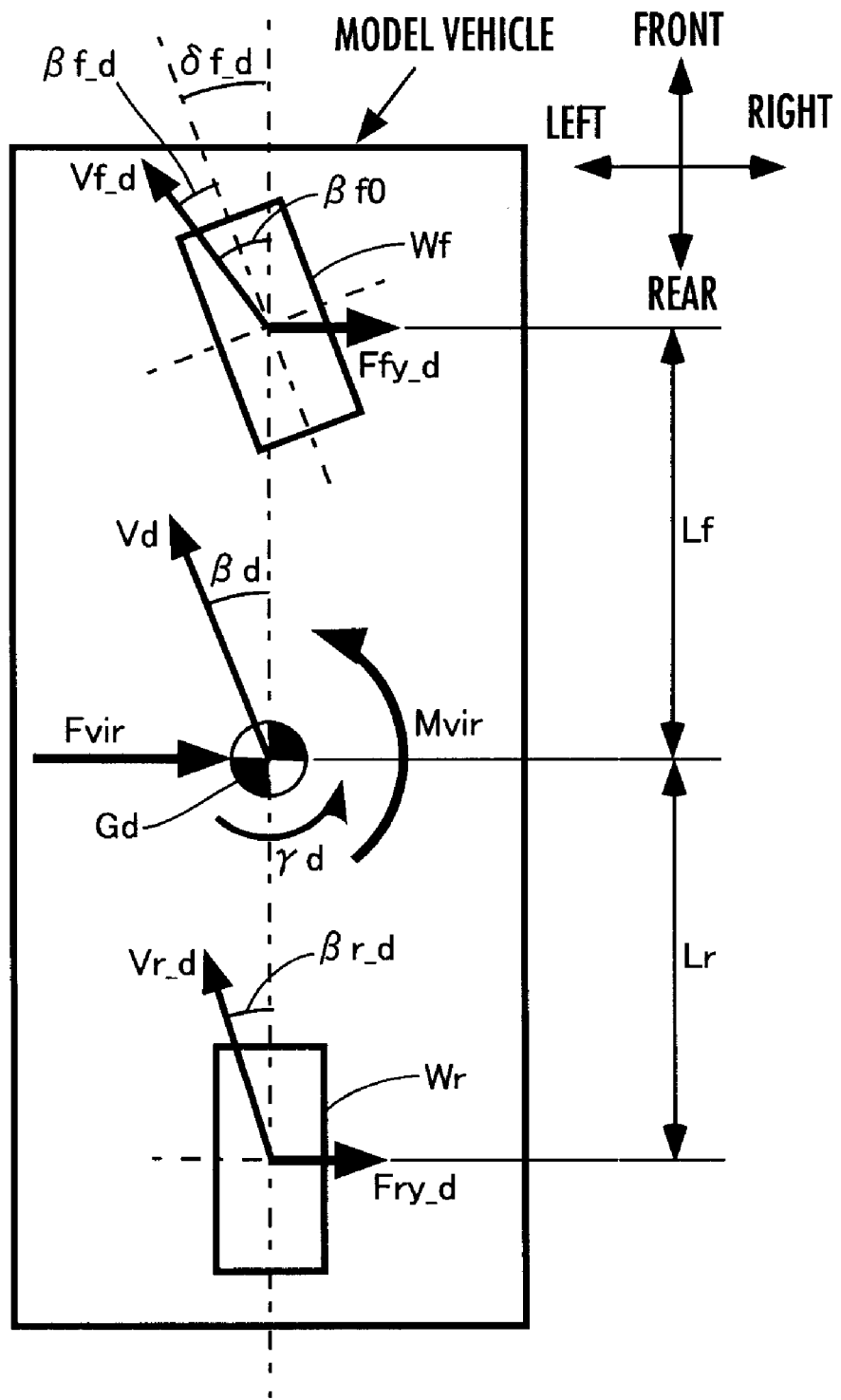
[FIG. 3] A diagram illustrating the structure of a vehicle on a reference dynamic characteristics model (vehicle model) in the first embodiment.
Figure 4:
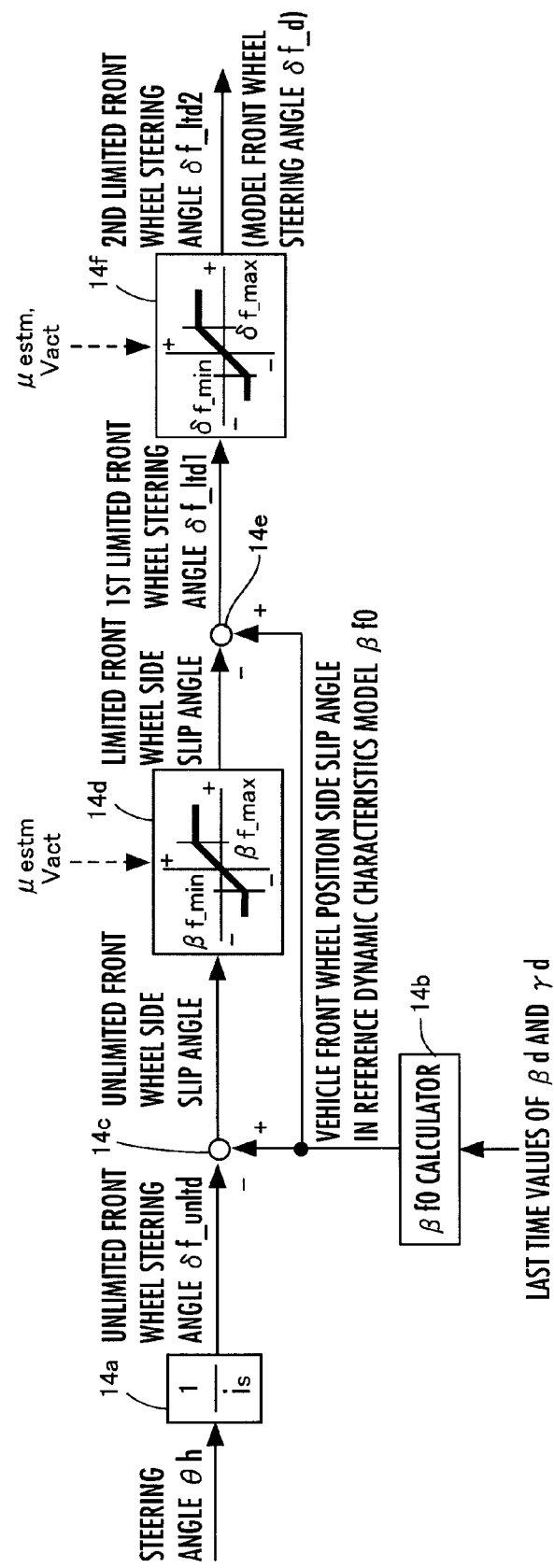
[FIG. 4] A functional block diagram illustrating the details of a processing function of a reference manipulated variable determiner in the first embodiment.
Figure 5A:
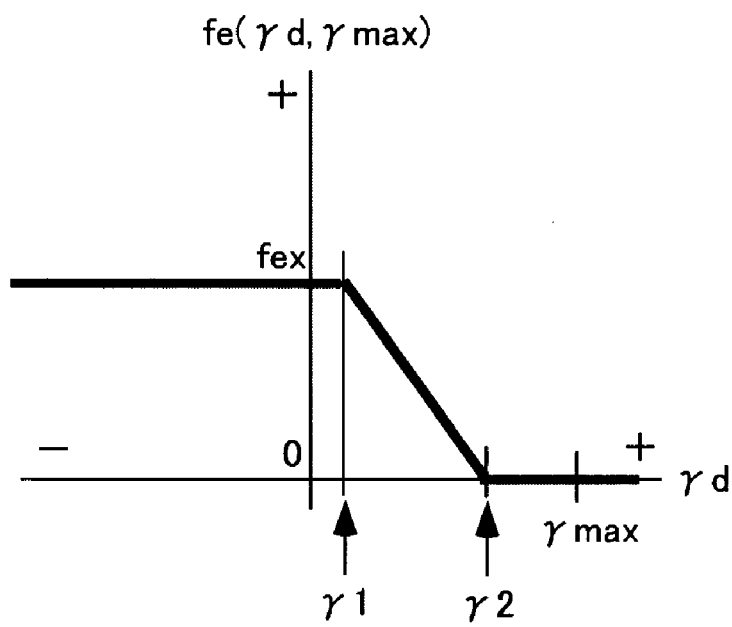
[FIG. 5] A graph for explaining the processing by a limiter for preventing excessive centrifugal forces, which is provided in the reference manipulated variable determiner in the first embodiment.
Figure 5B:
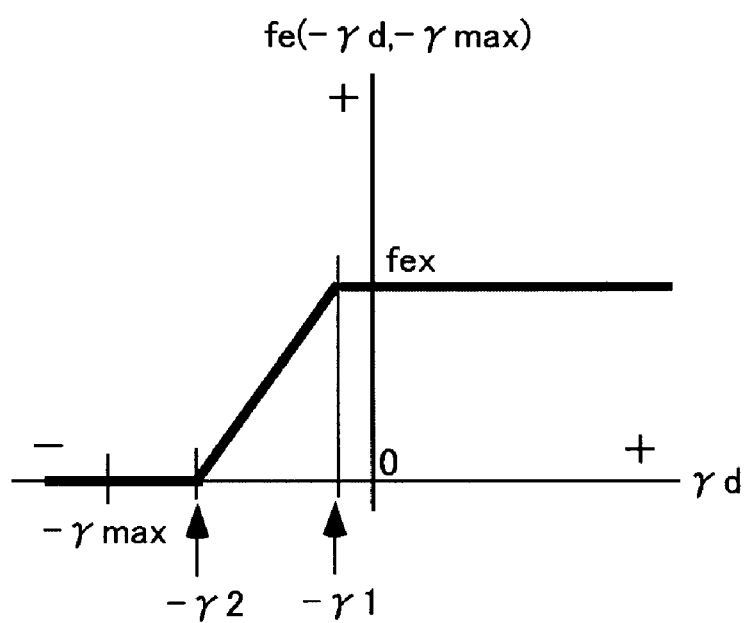
Figure 6:
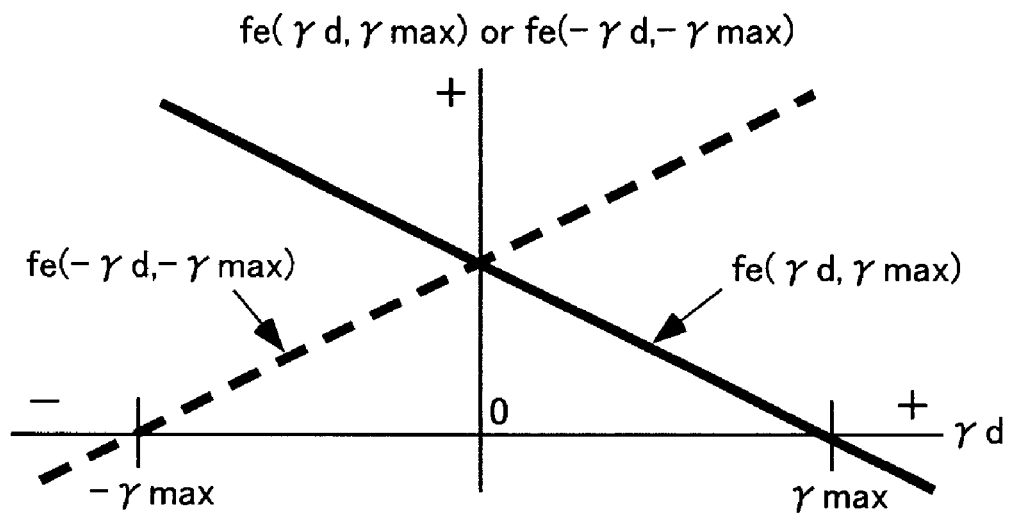
[FIG. 6] A graph for explaining another example of the processing by the limiter for preventing excessive centrifugal forces in the first embodiment.
Figure 7:
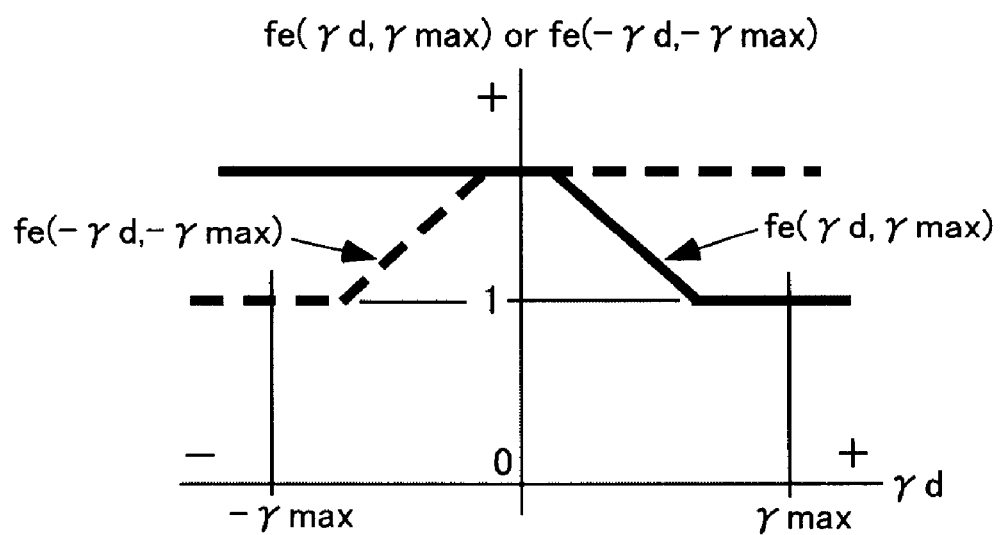
[FIG. 7] A graph for explaining still another example of the processing by the limiter for preventing excessive centrifugal forces in the first embodiment.
Figure 8:
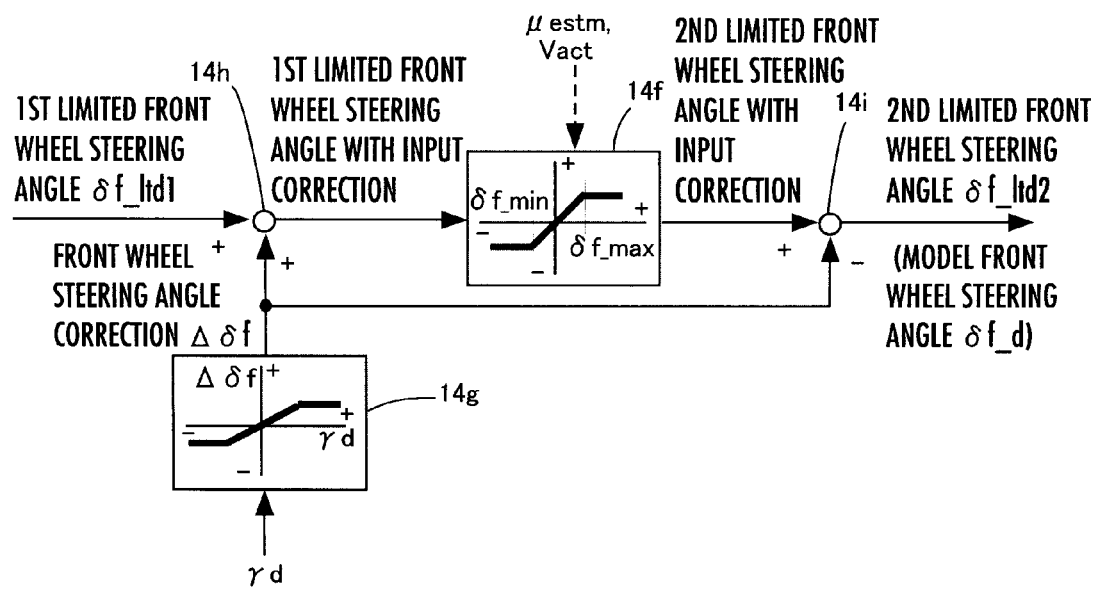
[FIG. 8] A functional block diagram illustrating another example of processing for determining a second limited front wheel steering angle δf_ltd2 in the reference manipulated variable determiner in the first embodiment.
Figure 9:
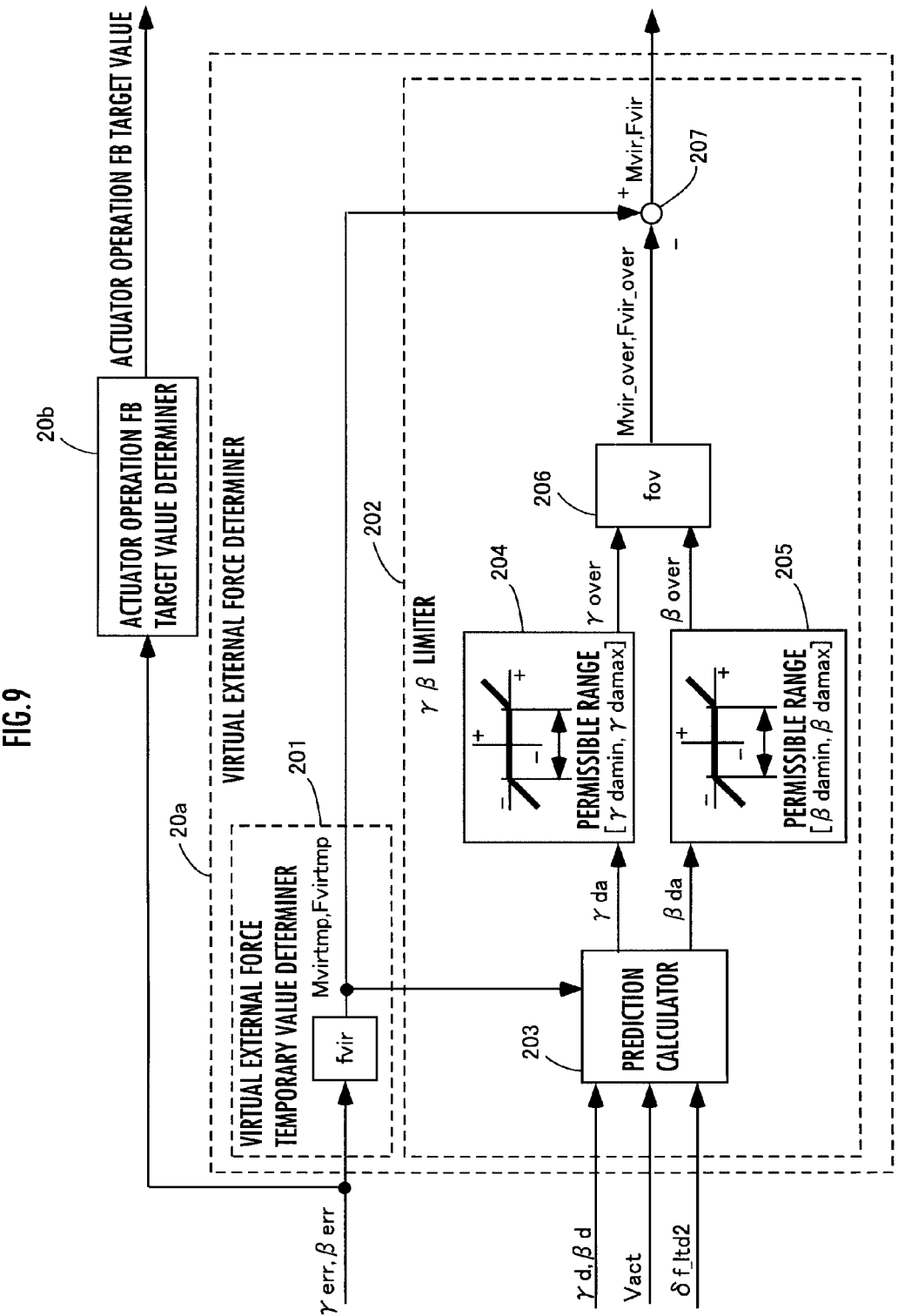
[FIG. 9] A functional block diagram illustrating the processing function of an FB distribution law in the first embodiment.
Figure 10:
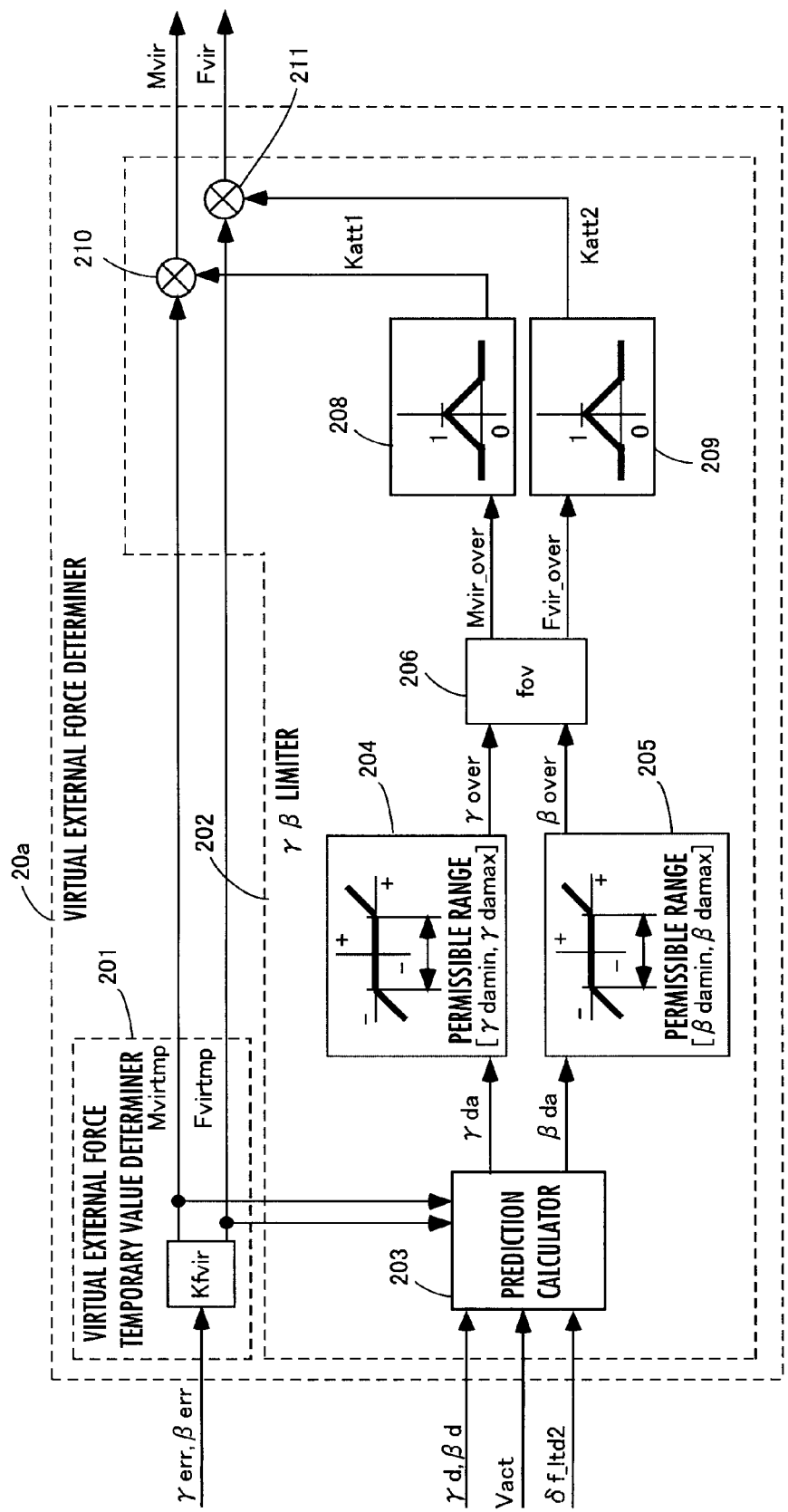
[FIG. 10] A functional block diagram illustrating another example of the processing by a virtual external force determiner in the first embodiment.
Figure 11:
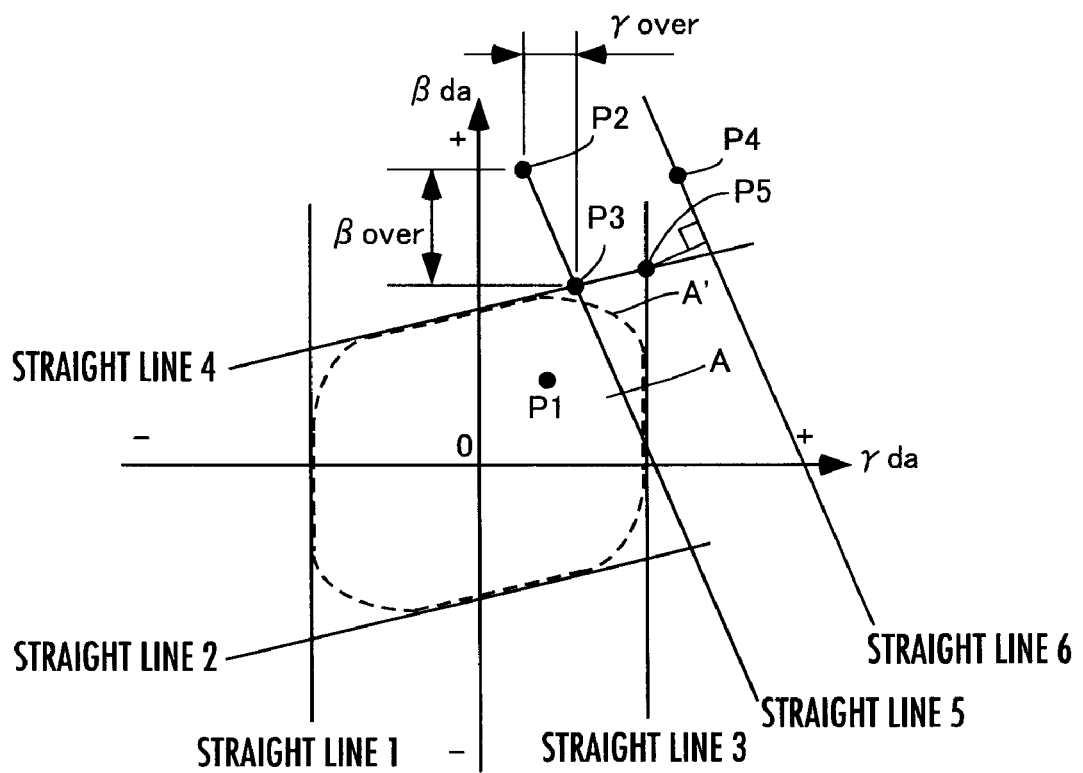
[FIG. 11] A graph for explaining another example of the processing by γβ limiter in the first embodiment.
Figure 12:
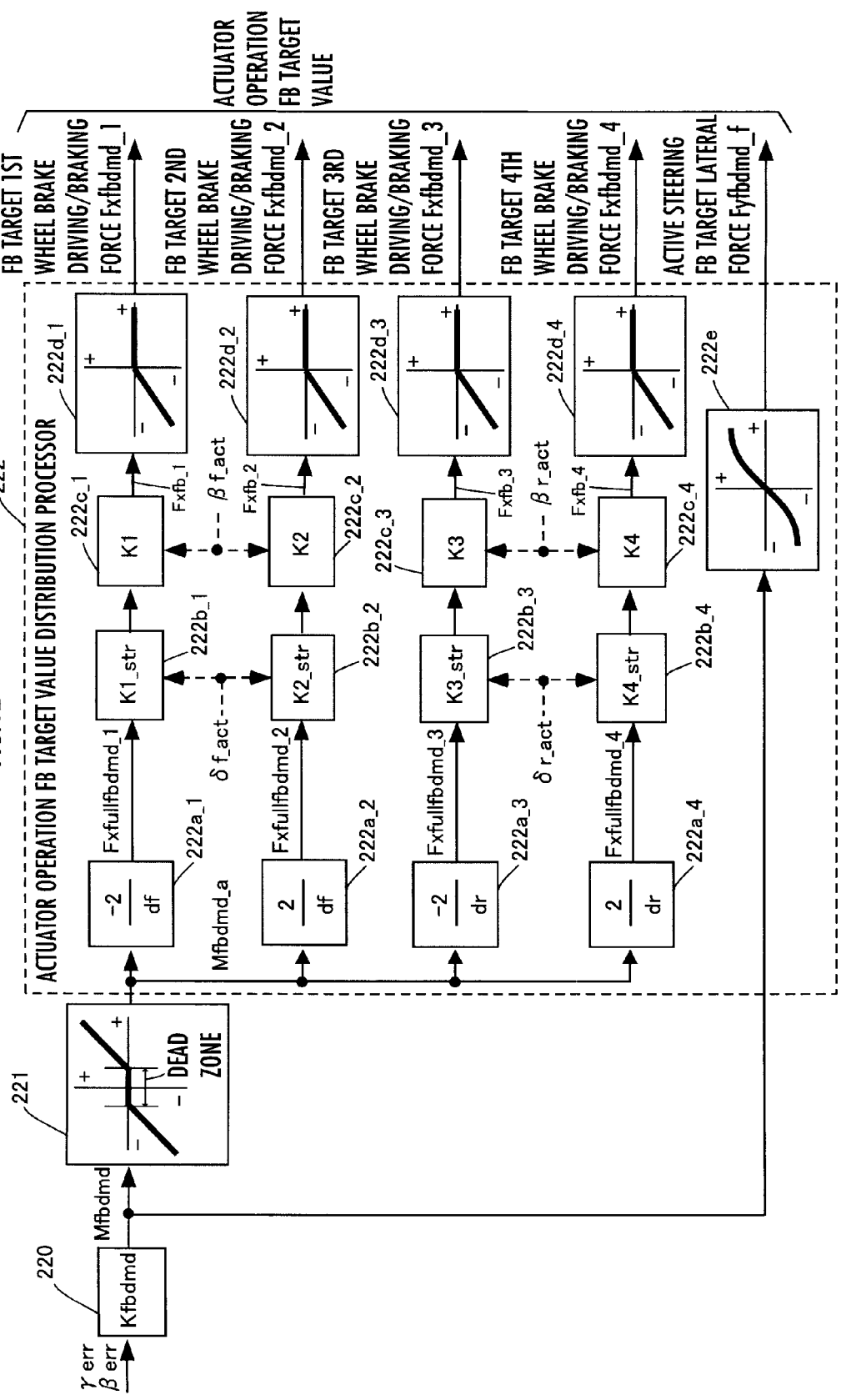
[FIG. 12] A functional block diagram illustrating the processing by an actuator operation FB target value determiner in the first embodiment.
Figure 13:
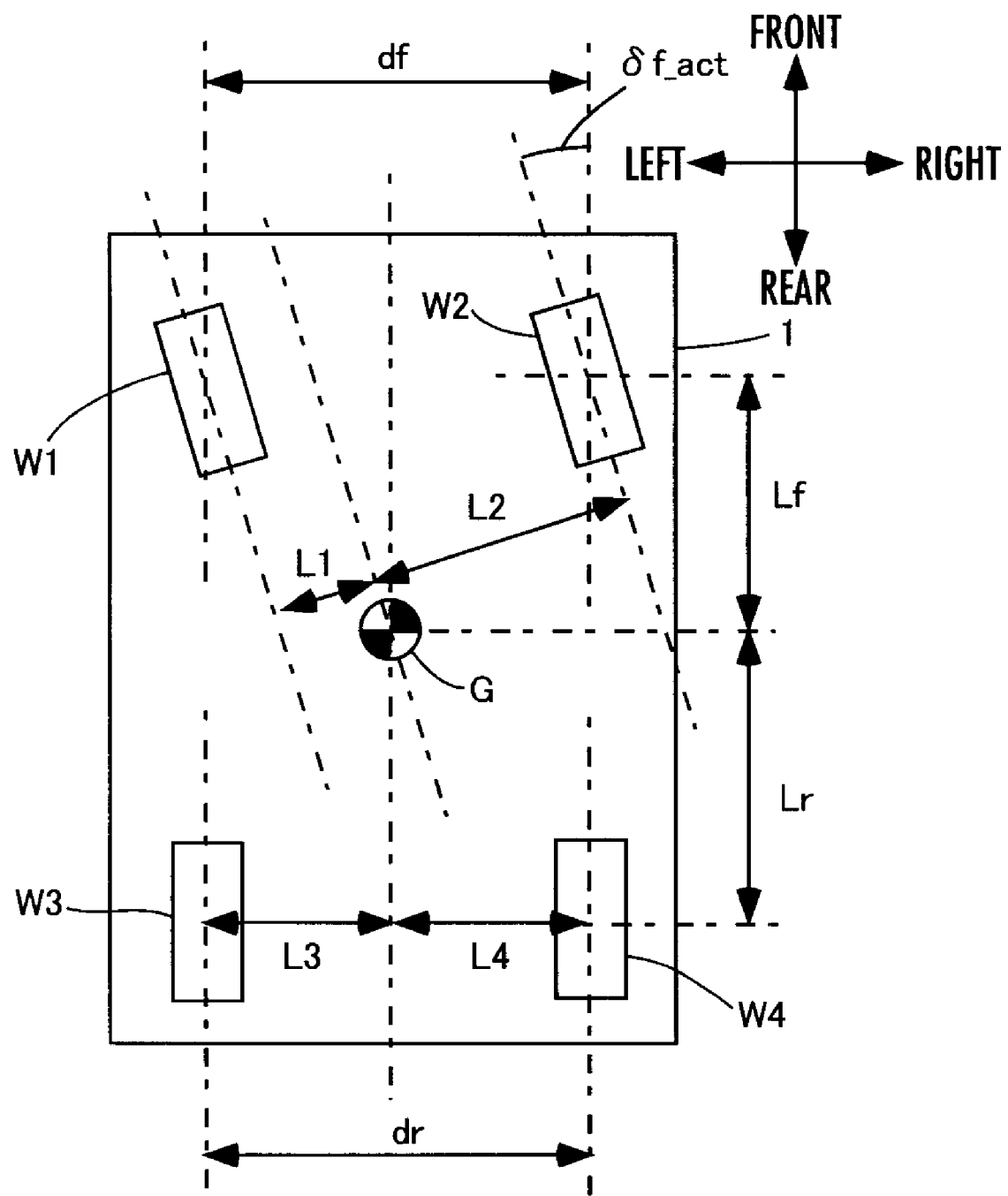
[FIG. 13] A diagram for explaining a variable used in the processing by the actuator operation FB target value determiner in the first embodiment.
Figure 14A:
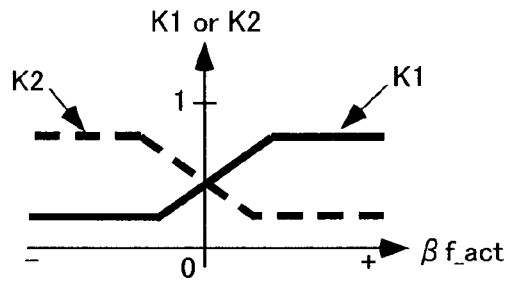
FIGS. 14(a) and (b) are graphs illustrating distribution gain setting examples used in the processing by the actuator operation FB target value determiner in the first embodiment.
Figure 14B:
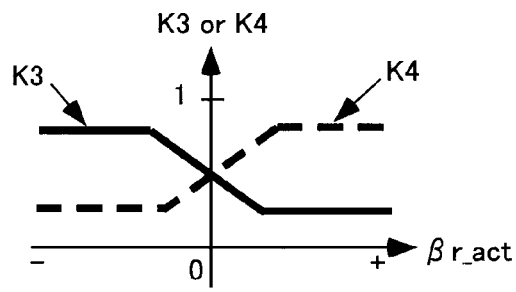
Figure 15A:
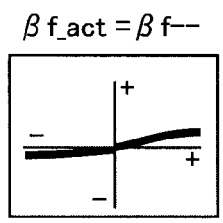
FIGS. 15(a) to (e) are diagrams illustrating the maps used with another example of the processing by the actuator operation FB target value determiner in the first embodiment.
Figure 15B:
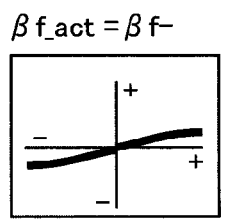
Figure 15C:
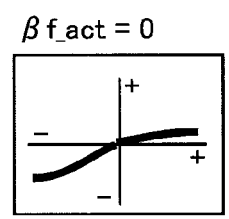
Figure 15D:
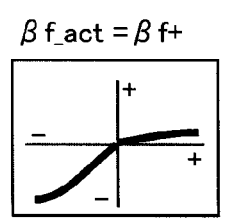
Figure 15E:
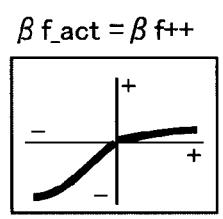
Figure 16A:
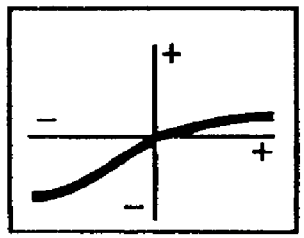
FIGS. 16(a) to (e) are diagrams illustrating the maps used with still another example of the processing by the actuator operation FB target value determiner in the first embodiment.
Figure 16B:
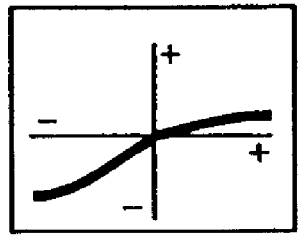
Figure 16C:
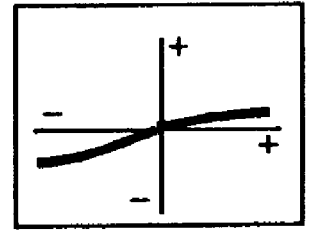
Figure 16D:
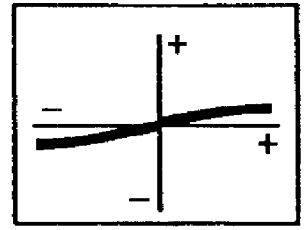
Figure 16E:
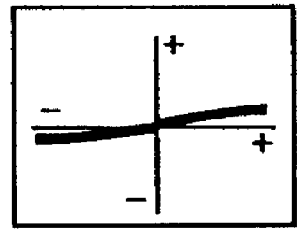
Figure 18:
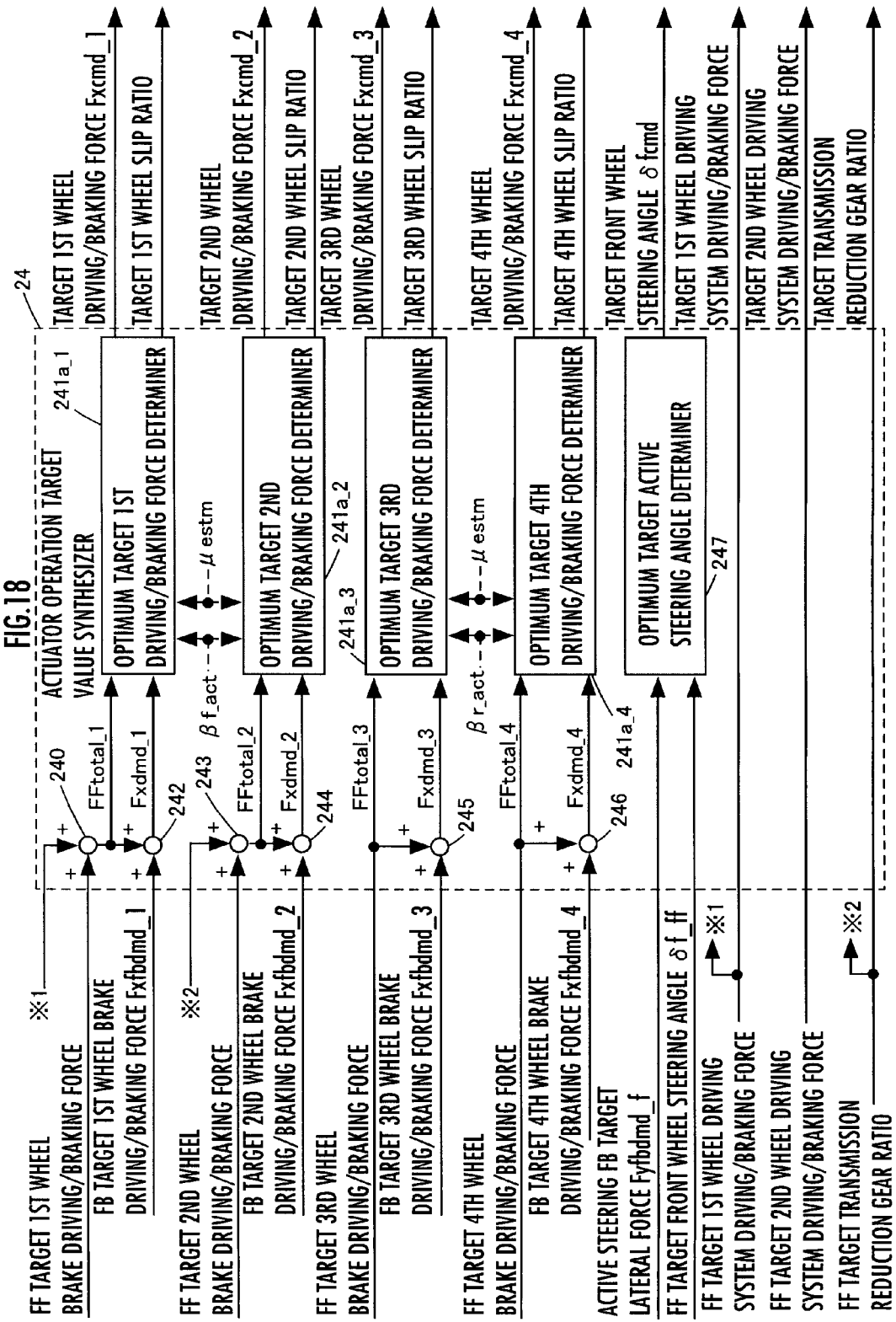
[FIG. 18] A functional block diagram illustrating the processing by an actuator operation target value synthesizer in the first embodiment.
Figure 19:
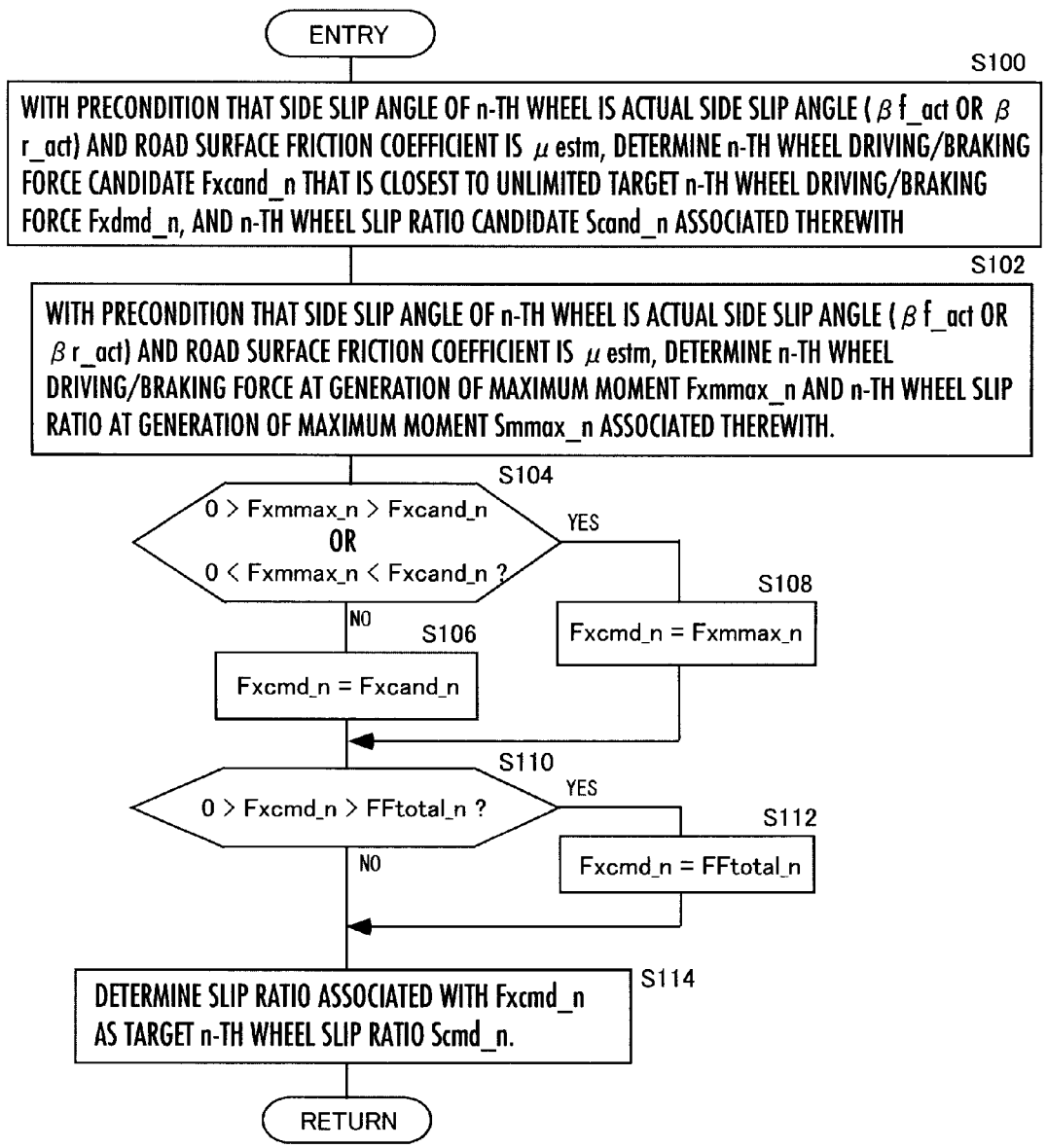
[FIG. 19] A flowchart illustrating the processing by an optimum target n-th wheel driving/braking force determiner provided in the actuator operation target value synthesizer in the first embodiment.
Figure 20:
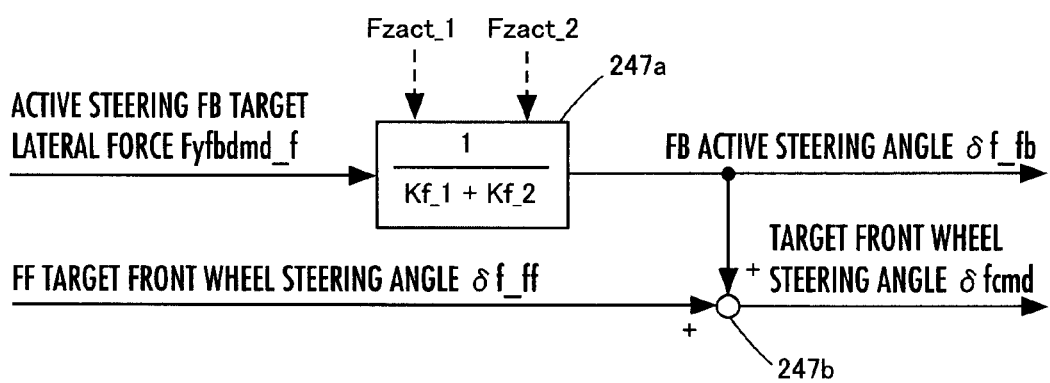
[FIG. 20] A functional block diagram illustrating the processing by an optimum target active steering angle determiner provided in the actuator operation target value synthesizer in the first embodiment.
Figure 21:
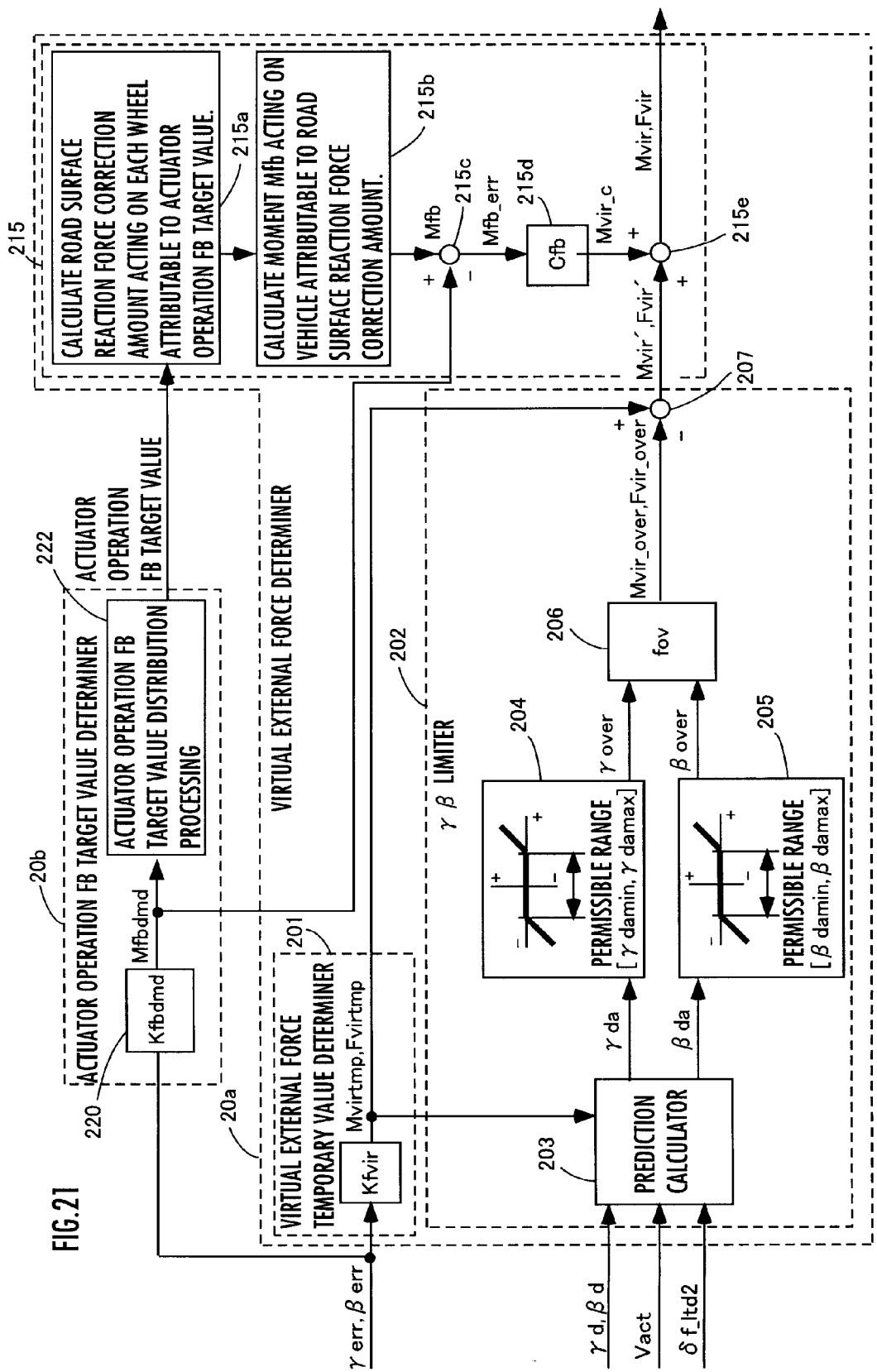
[FIG. 21] A functional block diagram illustrating the processing by a virtual external force determiner of an FB distribution law in a second embodiment.
Figure 22:
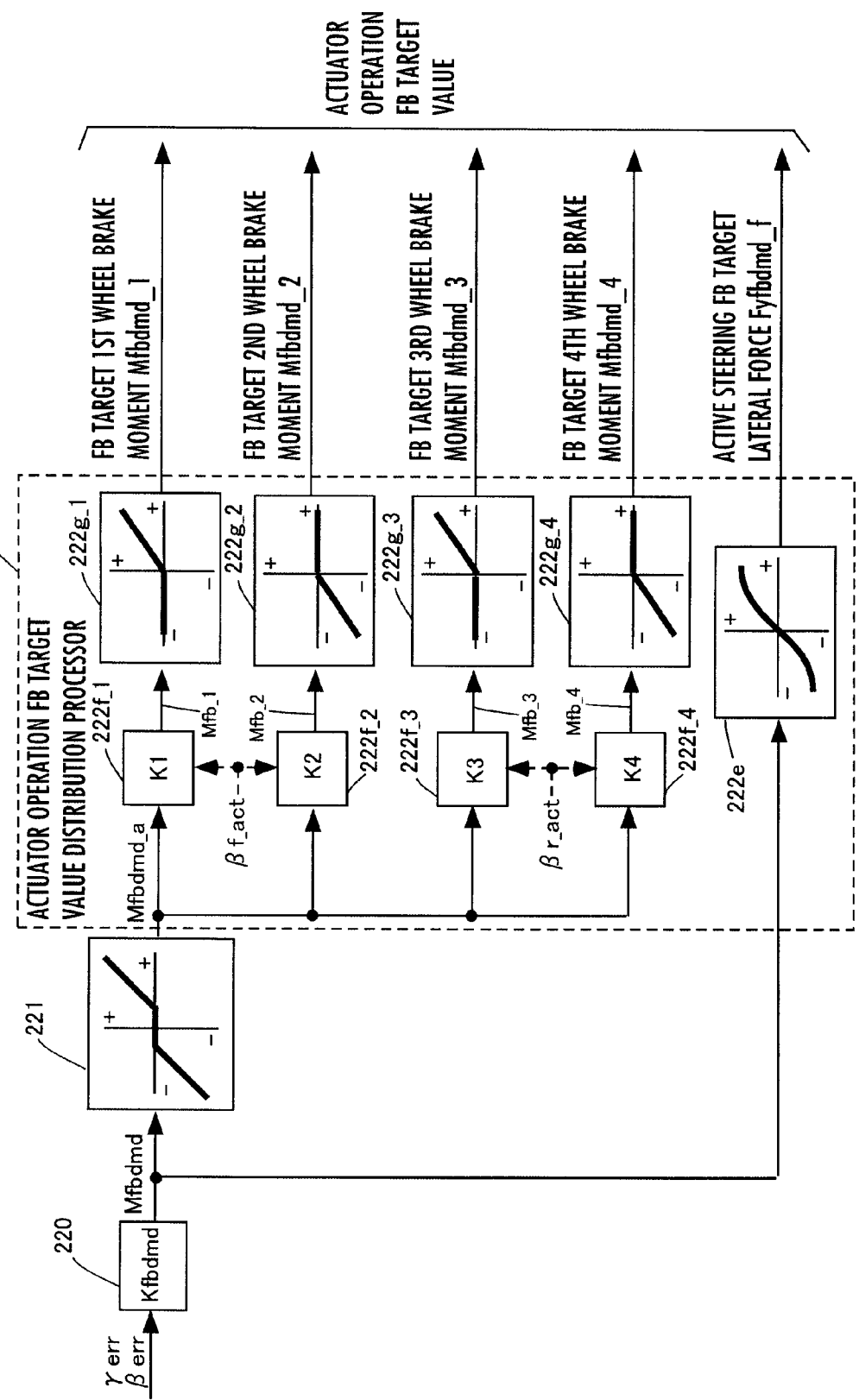
[FIG. 22] A functional block diagram illustrating the processing by an actuator operation FB target value determiner in a third embodiment.
Figure 23:
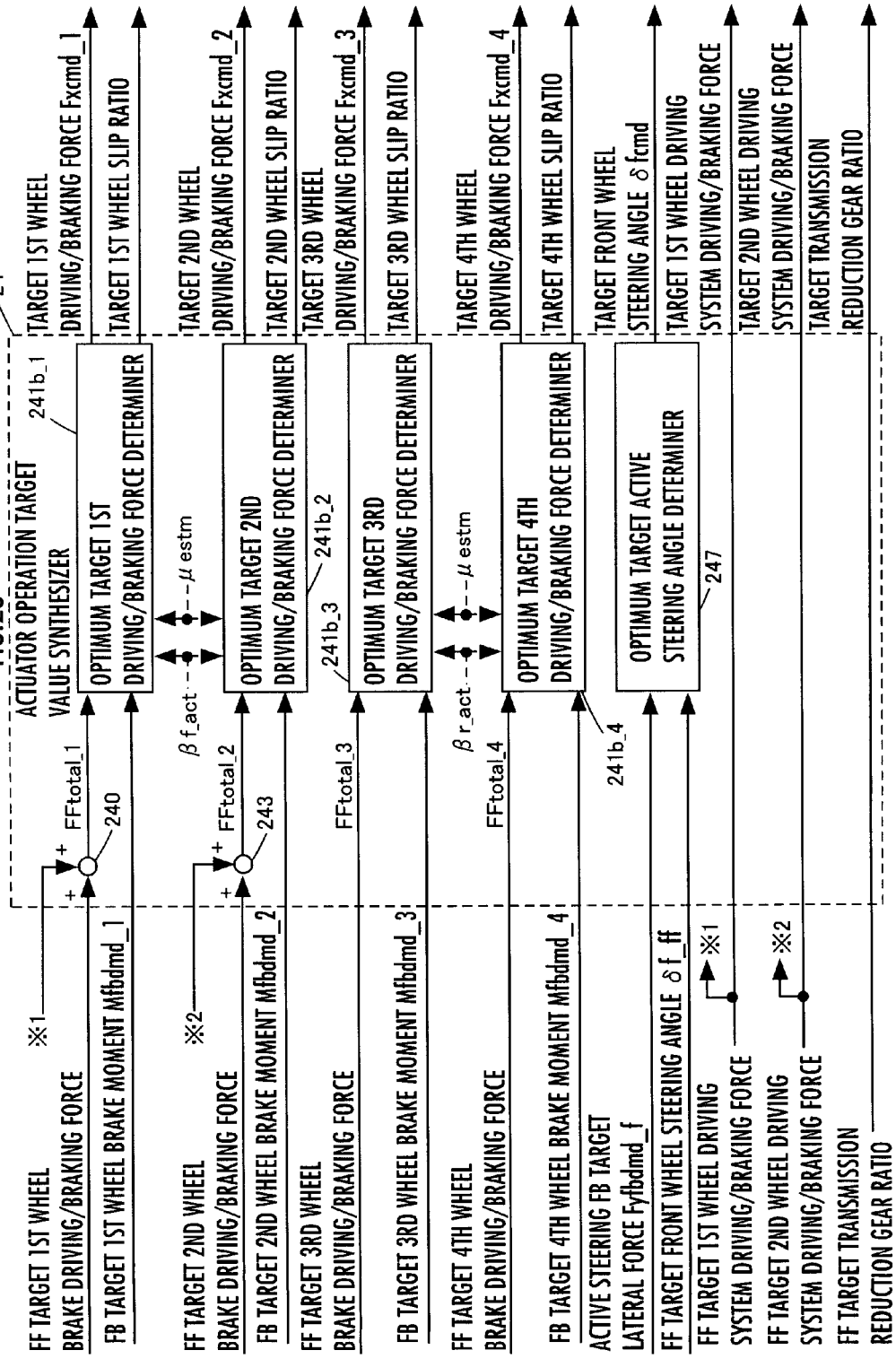
[FIG. 23] A functional block diagram illustrating the processing by an actuator operation target value synthesizer in the third embodiment.
Figure 24:
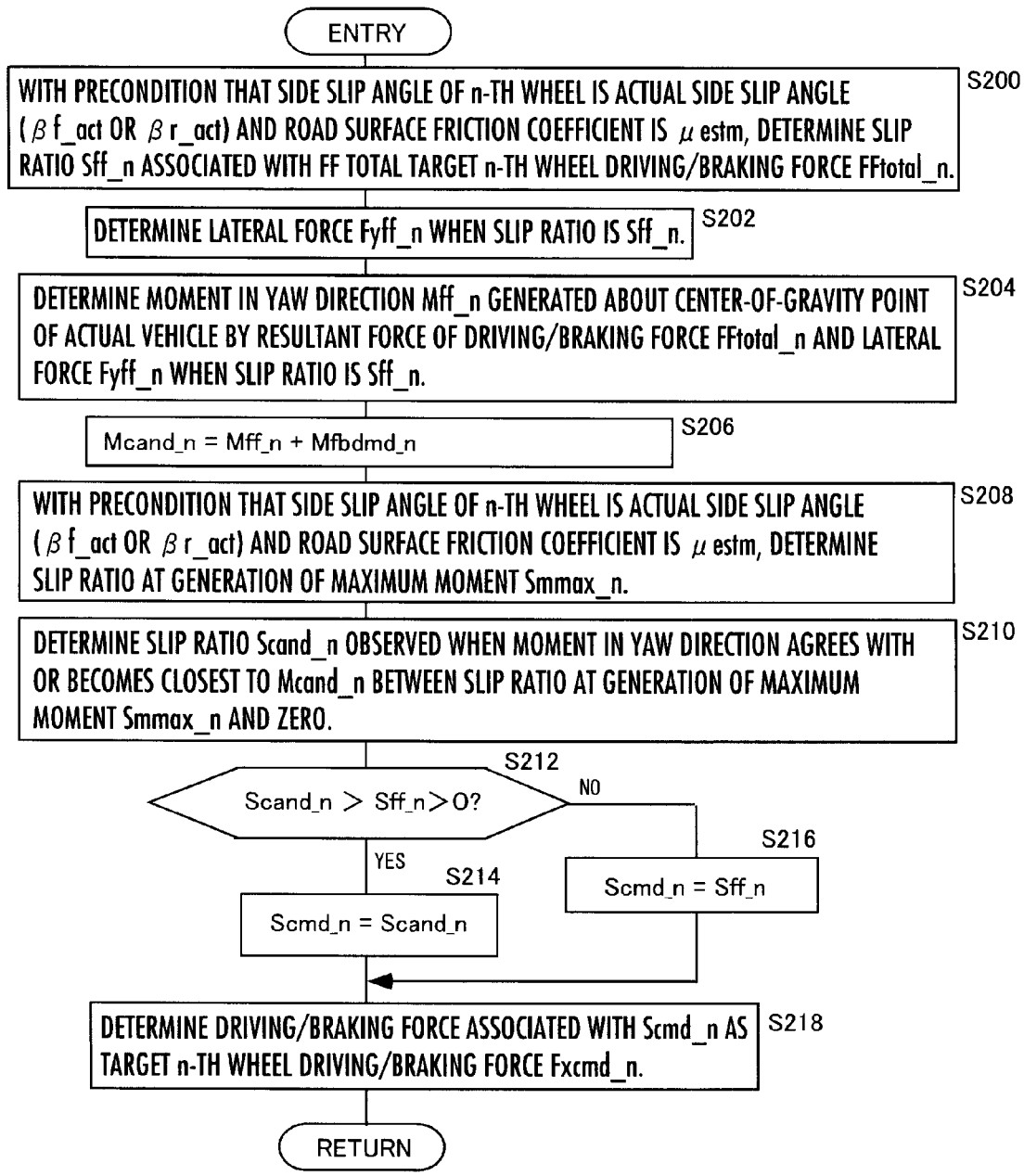
[FIG. 24] A flowchart illustrating the processing by an optimum target n-th wheel driving/braking force determiner provided in the actuator operation target value synthesizer in the third embodiment.
Figure 25:
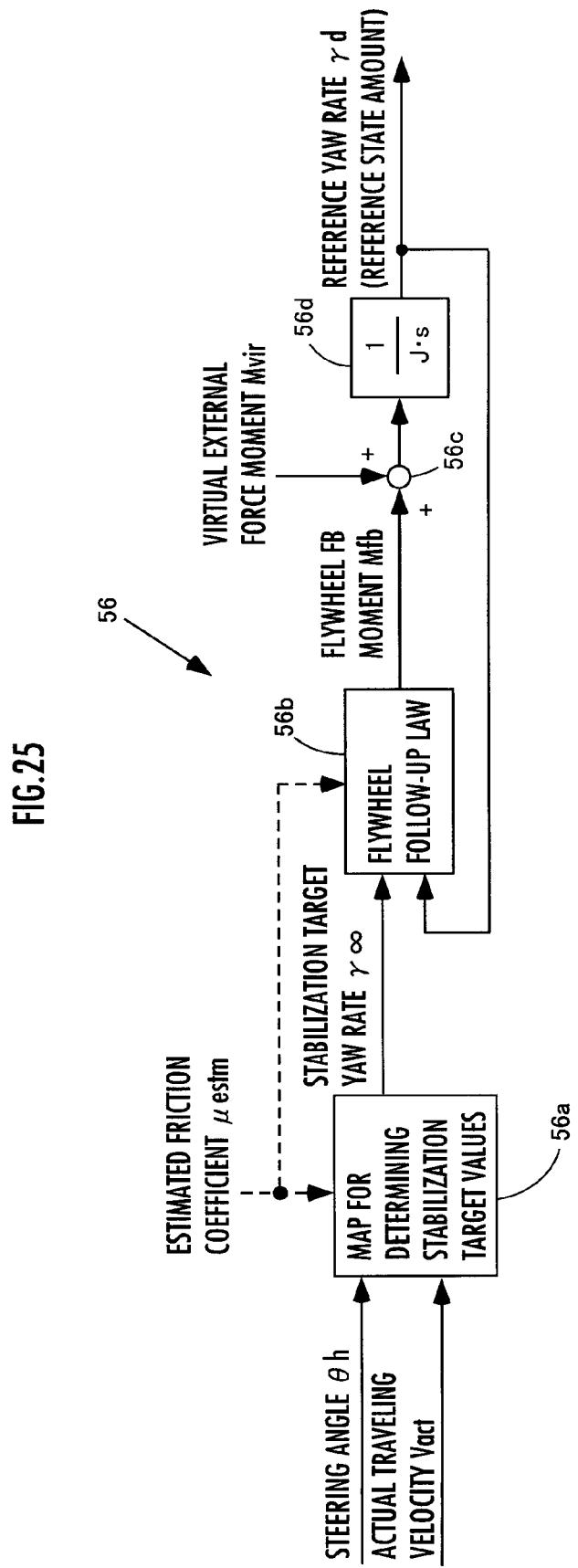
[FIG. 25] A functional block diagram illustrating the processing by a reference dynamic characteristics model in modification 1 of the embodiments of the present invention.

The invention claimed is:

1. A vehicle control device equipped with a means for detecting a drive manipulated variable which detects a drive manipulated variable that indicates a drive operation state of a vehicle driven by a driver of the vehicle having a plurality of wheels, an actuator device provided in the vehicle so as to permit the manipulation of at least the driving/braking force of each wheel of the vehicle, and means for controlling the actuator device which sequentially controls an operation of the actuator device, the vehicle control device comprising:

means for grasping an actual state amount which detects or estimates a first actual state amount, which is a value of a predetermined first state amount related to a predetermined motion including at least a rotational motion in a yaw direction of an actual vehicle;

means for grasping an actual side slip angle which detects or estimates a side slip angle of at least one wheel of the actual vehicle;

means for estimating a friction characteristic which estimates the characteristic of friction between a wheel of the actual vehicle and a road surface;

means for determining a reference state amount which determines a first reference state amount, which is a reference value of the first state amount, on the basis of at least the detected drive manipulated variable;

means for calculating a state amount error which calculates a first state amount error, which is a difference between the detected or estimated first actual state amount and the determined first reference state amount; and means for determining an actual vehicle actuator operation control input which determines an actual vehicle actuator operation control input, which is a control input for operating the actuator device and which includes a driving/braking force manipulation control input defining a target driving/braking force of each wheel of the actual vehicle, on the basis of at least the detected drive manipulated variable and the calculated first state amount error, wherein the means for controlling the actuator device is a means which controls the operation of the actuator device on the basis of the determined actual vehicle actuator operation control input, and the means for determining the actual vehicle actuator operation control input comprises:

a means which determines a feedback control input for manipulating the driving/braking force of each wheel for bringing the first state amount error close to zero on the basis of at least the calculated first state amount error;

a means which determines a feedforward control input defining a feedforward target value of the driving/braking force of each wheel on the basis of at least the detected drive operation input; and a means which defines, for a k-th wheel, which is one or more particular wheels of the plurality of wheels, a predetermined required condition related to a relationship among a road surface reaction force that may act from a road surface on the k-th wheel under a precondition that at least the side slip angle of the k-th wheel agrees with the detected or estimated side slip angle and the characteristic of friction between the k-th wheel and the road surface agrees with the estimated friction characteristic, the feedforward control input of the k-th wheel, the feedback control input of the k-th wheel, and the driving/braking force manipulation control input of the k-th wheel as a first required condition, defines a predetermined required condition related to a relationship between the feedforward target value defined by the determined feedforward control input of the k-th wheel and the driving/braking force manipulation control input of the k-th wheel as a second required condition, defines the second required condition out of the first required condition and the second required condition as a priority condition, and determines the driving/braking force manipulation control input of the k-th wheel such that at least either the first required condition or the second required condition is satisfied, wherein the second required condition is a condition that, in the case where a target k-th wheel driving/braking force, which is a target driving/braking force specified by the driving/braking force manipulation control input of the k-th wheel, is a driving/braking force in the braking direction, and a feedforward target value of a driving/braking force specified by a feedforward control input of the k-th wheel is a driving/braking force in the braking direction, the absolute value of the target k-th wheel driving/braking force is not less than the absolute value of a feedforward target value of a driving/braking force of the k-th wheel.

2. The vehicle control device according to claim 1, wherein the feedback control input is a control input which specifies the target value of a manipulated variable of a driving/braking force of each wheel, and in the case where the total sum of the target value of the manipulated variable of the driving/braking force specified by a feedback control input of the k-th wheel and the feedforward target value of a driving/braking force specified by a feedforward control input of the k-th wheel is defined as an unlimited k-th wheel required driving/braking force, the first required condition is a condition that the target driving/braking force specified by the driving/braking force manipulation control input of the k-th wheel takes a value in a range of the values of the driving/braking force components of the road surface reaction forces that may act from a road surface on the k-th wheel under the precondition and that the absolute value of a difference from the unlimited k-th wheel required driving/braking force is minimized.

3. The vehicle control device according to claim 1, wherein the feedback control input is a control input which defines the target value of a moment in the yaw direction generated about the center-of-gravity point of an actual vehicle caused by the manipulation of the driving/braking force of each wheel by the feedback control input, and in the case where the total sum of a moment in the yaw direction generated about the center-of-gravity point of the actual vehicle by a road surface reaction force which has a driving/braking force component among the road surface reaction forces that may act from a road surface on the k-th wheel under the precondition and which leads to a minimum absolute value of the difference from the feedforward target value of a driving/braking force specified by a feedforward control input of the k-th wheel and the target value of a moment in the yaw direction specified by a feedback control input of the k-th wheel is defined as an unlimited k-th wheel required moment, the first required condition is a condition that the target driving/braking force specified by a driving/braking force manipulation control input of the k-th wheel takes a value in a range of the values of the driving/braking force components of road surface reaction forces that may act from a road surface on the k-th wheel under the precondition and that the absolute value of the difference between the moment in the yaw direction generated about the center-of-gravity point of the actual vehicle by a road surface reaction force having a driving/braking force component equivalent to a target driving/braking force of the k-th wheel among the road surface reaction forces that may act from a road surface on the k-th wheel under the precondition and the unlimited k-th wheel required moment is minimum.

4. The vehicle control device according to claim 1, further comprising a vehicle model established beforehand as a model that expresses the dynamic characteristics of the vehicle and a means for determining a vehicle model operation control input which determines a vehicle model operation control input for operating a motion which includes at least a rotational motion in the yaw direction of a vehicle on the vehicle model on the basis of at least the calculated first state amount error such that the first state amount error is approximated to zero, wherein the means for determining the reference state amount is a means which inputs at least the detected drive operation input and the determined vehicle model operation control input into the vehicle model to determine a first state amount related to the predetermined motion including the rotational motion in the yaw direction of the vehicle on the vehicle model as the first reference state amount.

5. The vehicle control device according to claim 4, wherein the means for grasping the actual side slip angle is a means which presumes either the side slip angle of at least one wheel of the vehicle on the vehicle model or the side slip angle at a predetermined position of the vehicle on the vehicle model as the side slip angle of at least one wheel of the actual vehicle.

6. The vehicle control device according to claim 1, wherein the means for grasping the actual side slip angle is a means which presumes the side slip angle at a predetermined position of the vehicle as the side slip angle of at least one wheel.

7. A vehicle control device equipped with a means for detecting a drive manipulated variable which detects a drive manipulated variable that indicates a drive operation state of a vehicle driven by a driver of the vehicle having a plurality of wheels, an actuator device provided in the vehicle so as to permit the manipulation of at least the driving/braking force of each wheel of the vehicle, and means for controlling an actuator device which sequentially controls an operation of the actuator device, the vehicle control device comprising:

means for grasping an actual state amount which detects or estimates a first actual state amount, which is a value of a predetermined first state amount related to a predetermined motion including at least a rotational motion in a yaw direction of an actual vehicle;

means for grasping an actual side slip angle which detects or estimates a side slip angle of at least one wheel of the actual vehicle;

means for estimating a friction characteristic which estimates the characteristic of friction between a wheel of the actual vehicle and a road surface;

means for determining a reference state amount which determines a first reference state amount, which is a reference value of the first state amount, on the basis of at least the detected drive manipulated variable;

means for calculating a state amount error which calculates a first state amount error, which is a difference between the detected or estimated first actual state amount and the determined first reference state amount; and means for determining an actual vehicle actuator operation control input which determines an actual vehicle actuator operation control input, which is a control input for operating the actuator device and which includes a driving/braking force manipulation control input defining a target driving/braking force of each wheel of the actual vehicle, on the basis of at least the detected drive manipulated variable and the calculated first state amount error, wherein the means for controlling the actuator device is a means which controls the operation of the actuator device on the basis of the determined actual vehicle actuator operation control input, and the means for determining the actual vehicle actuator operation control input comprises:

a means which determines a feedback control input for manipulating the driving/braking force of each wheel for bringing the first state amount error close to zero on the basis of at least the calculated first state amount error;

a means which determines a feedforward control input defining the feedforward target value of the driving/braking force of each wheel on the basis of at least the detected drive operation input; and a means which defines, for a k-th wheel, which is one or more specific wheels of the plurality of wheels, a predetermined required condition related to a relationship among a road surface reaction force that may act from a road surface on the k-th wheel under a precondition that at least the side slip angle of the k-th wheel agrees with the detected or estimated side slip angle and the characteristic of friction between the k-th wheel and the road surface agrees with the estimated friction characteristic, the feedforward control input of the k-th wheel, the feedback control input of the k-th wheel, and the driving/braking force manipulation control input of the k-th wheel as a first required condition, defines a predetermined required condition related to a relationship between a driving/braking force at the generation of a maximum moment, which is a driving/braking force component of a road surface reaction force that is maximized in the same direction as the direction of a moment in the yaw direction generated about the center-of-gravity point of the actual vehicle due to the manipulation of the driving/braking force of the k-th wheel based on the feedback control input of the k-th wheel by a moment in the yaw direction generated about the center-of-gravity point of the actual vehicle by a road surface reaction force, in the road surface reaction force that can act from a road surface on the k-th wheel under at least the precondition, and the driving/braking force manipulation control input of the k-th wheel as a second required condition, defines a predetermined required condition related to a relationship between the feedforward target value specified by the determined feedforward control input of the k-th wheel and the driving/braking force manipulation control input of the k-th wheel as a third required condition, defines the third required condition out of the first required condition, the second required condition and the third required condition as a priority condition of the highest rank, defines the second required condition as the priority condition of the next rank, and determines the driving/braking force manipulation control input of the k-th wheel such that at least one of the first required condition, the second required condition, and the third required condition is satisfied, wherein the third required condition is a condition that, in the case where a target k-th wheel driving/braking force, which is a target driving/braking force specified by the driving/braking force manipulation control input of the k-th wheel, is a driving/braking force in the braking direction, and a feedforward target value of a driving/braking force specified by a feedforward control input of the k-th wheel is a driving/braking force in the braking direction, the absolute value of the target k-th wheel driving/braking force is not less than the absolute value of a feedforward target value of a driving/braking force of the k-th wheel.

8. The vehicle control device according to claim 7, wherein the feedback control input is a control input which specifies the target value of a manipulated variable of a driving/braking force of each wheel, and in the case where the total sum of the target value of the manipulated variable of the driving/braking force specified by a feedback control input of the k-th wheel and the feedforward target value of a driving/braking force specified by a feedforward control input of the k-th wheel is defined as an unlimited k-th wheel required driving/braking force, the first required condition is a condition that the target driving/braking force specified by the driving/braking force manipulation control input of the k-th wheel takes a value in a range of the values of the driving/braking force components of the road surface reaction forces that may act from a road surface on the k-th wheel under the precondition and that the absolute value of a difference from the unlimited k-th wheel required driving/braking force is minimized.

9. The vehicle control device according to claim 7, wherein the feedback control input is a control input which defines the target value of a moment in the yaw direction generated about the center-of-gravity point of the actual vehicle caused by the manipulation of the driving/braking force of each wheel by the feedback control input, and in the case where the total sum of a moment in the yaw direction generated about the center-of-gravity point of the actual vehicle by a road surface reaction force which has a driving/braking force component among the road surface reaction forces that may act from a road surface on the k-th wheel under the precondition and which leads to a minimum absolute value of the difference from the feedforward target value of a driving/braking force specified by a feedforward control input of the k-th wheel and the target value of a moment in the yaw direction specified by a feedback control input of the k-th wheel is defined as an unlimited k-th wheel required moment, the first required condition is a condition that the target driving/braking force specified by a driving/braking force manipulation control input of the k-th wheel takes a value in a range of the values of the driving/braking force components of road surface reaction forces that may act from a road surface on the k-th wheel under the precondition and that the absolute value of the difference between the moment in the yaw direction generated about the center-of-gravity point of the actual vehicle by a road surface reaction force having a driving/braking force component equivalent to a target driving/braking force of the k-th wheel among the road surface reaction forces that may act from a road surface on the k-th wheel under the precondition and the unlimited k-th wheel required moment is minimum.

10. The vehicle control device according to claim 7, wherein the second required condition is a condition that the direction of a target k-th wheel driving/braking force, which is a target driving/braking force specified by a driving/braking force manipulation control input of the k-th wheel, and the direction of the k-th wheel driving/braking force at the generation of a maximum moment are opposite from each other, or the absolute value of the target k-th wheel driving/braking force is not more than the absolute value of the k-th wheel driving/braking force at the generation of a maximum moment.

11. The vehicle control device according to claim 7, further comprising a vehicle model established beforehand as a model that expresses the dynamic characteristics of the vehicle and a means for determining a vehicle model operation control input which determines a vehicle model operation control input for operating a motion which includes at least a rotational motion in the yaw direction of a vehicle on the vehicle model on the basis of at least the calculated first state amount error such that the first state amount error is approximated to zero, wherein the means for determining the reference state amount is a means which inputs at least the detected drive operation input and the determined vehicle model operation control input into the vehicle model to determine a first state amount related to the predetermined motion including the rotational motion in the yaw direction of the vehicle on the vehicle model as the first reference state amount.

12. The vehicle control device according to claim 7, wherein the means for grasping the actual side slip angle is a means which presumes the side slip angle at a predetermined position of the vehicle as the side slip angle of at least one wheel.

13. The vehicle control device according to claim 11, wherein the means for grasping the actual side slip angle is a means which presumes either the side slip angle of at least one wheel of the vehicle on the vehicle model or the side slip angle at a predetermined position of the vehicle on the vehicle model as the side slip angle of at least one wheel of the actual vehicle.

\* \* \* \* \*